(12) United States Patent
Edelson et al.

(10) Patent No.: US 12,737,052 B2
(45) Date of Patent: Sep. 15, 2026

(54) MULTI-MODAL INPUTS FOR WEARABLE DEVICES, AND SYSTEMS AND METHODS OF USE THEREOF

(71) Applicant: Meta Platforms Technologies, LLC, Menlo Park, CA (US)

(72) Inventors: Zaina Edelson, New York, NY (US); Yasaman Sheri, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/909,860

(22) Filed: Oct. 8, 2024

(65) Prior Publication Data

US 2025/0123691 A1 Apr. 17, 2025

Related U.S. Application Data

(60) Provisional application No. 63/591,111, filed on Oct. 17, 2023.

(51) Int. Cl.
*G06F 3/01* (2006.01)
*G06F 3/16* (2006.01)

(52) U.S. Cl.
CPC .............. *G06F 3/017* (2013.01); *G06F 3/167* (2013.01)

(58) Field of Classification Search
CPC .......... G06F 3/017; G06F 3/167; G06F 3/013; G06F 3/014; G06F 3/015; G06F 3/016; G06F 2203/038; G06F 2203/0381; G06F 3/011; G06F 3/165; G06F 3/04817; G06F 3/0484; G06F 2203/011
See application file for complete search history.

(56) References Cited

U.S. PATENT DOCUMENTS

| | | | | |
|---|---|---|---|---|
| 8,823,603 B1 | 9/2014 | Kim et al. | | |
| 8,896,529 B2 * | 11/2014 | Immonen | .......... | H04M 1/72454 345/158 |
| 9,122,917 B2 * | 9/2015 | Ivanchenko | ............ | G06F 3/017 |
| 9,335,862 B1 * | 5/2016 | Kritt | ...................... | H04N 23/20 |

(Continued)

OTHER PUBLICATIONS

European Search Report for European Patent Application No. 24206644.7, dated Apr. 2, 2025, 7 pages.

(Continued)

*Primary Examiner* — Grant Sitta
(74) *Attorney, Agent, or Firm* — Morgan, Lewis & Bockius LLP

(57) ABSTRACT

A method of performing input gestures to control user interface elements is described. The method includes, at a first point in time while multi-modal gestures are available via at least two input devices associated with the artificial-reality headset, detecting a first input via an input device of the at least two input devices and performing an action at the artificial-reality headset. In response to detecting a second input via another input device of the at least two input devices, performing another action within a user interface presented via the artificial-reality headset. The method further includes, at a second point in time, after the first point in time, and while multi-modal gestures are no longer available via the at least two input devices associated with the artificial-reality headset, detecting the first input via the input device of the at least two input devices.

20 Claims, 28 Drawing Sheets

(56) References Cited

U.S. PATENT DOCUMENTS

| | | | | |
|---|---|---|---|---|
| 9,529,521 | B2 * | 12/2016 | Huang | G06F 3/0485 |
| 10,345,625 | B2 | 7/2019 | Howell et al. | |
| 10,861,242 | B2 | 12/2020 | Lacey et al. | |
| 12,217,545 | B2 * | 2/2025 | Xu | G06V 10/70 |
| 12,352,964 | B2 * | 7/2025 | Kaneko | H04M 1/72433 |
| 2012/0130822 | A1 * | 5/2012 | Patwa | G06Q 30/0273 705/14.69 |
| 2012/0302289 | A1 * | 11/2012 | Kang | G06F 3/016 455/557 |
| 2013/0229508 | A1 * | 9/2013 | Li | G06F 1/3287 348/77 |
| 2015/0026181 | A1 * | 1/2015 | Milton | G06F 16/2379 707/736 |
| 2015/0145653 | A1 * | 5/2015 | Katingari | H04W 4/00 340/12.3 |
| 2016/0026253 | A1 * | 1/2016 | Bradski | H04N 13/128 345/8 |
| 2018/0060706 | A1 * | 3/2018 | Allen | G06V 40/16 |
| 2018/0082482 | A1 * | 3/2018 | Motta | G02B 27/0093 |
| 2019/0362557 | A1 * | 11/2019 | Lacey | G06T 5/20 |
| 2020/0037059 | A1 | 1/2020 | Jenkins et al. | |
| 2020/0104194 | A1 | 4/2020 | Chalmers et al. | |
| 2021/0126985 | A1 | 4/2021 | Brush et al. | |
| 2022/0043278 | A1 | 2/2022 | Villalpando et al. | |
| 2022/0103948 | A1 | 3/2022 | Kumar et al. | |
| 2025/0093955 | A1 * | 3/2025 | Yamano | G06F 3/01 |

OTHER PUBLICATIONS

Non-Final Office Action mailed Dec. 15, 2025 for U.S. Appl. No. 19/096,536, filed Mar. 31, 2025, 17 pages.

Final Office Action mailed Apr. 13, 2026 for U.S. Appl. No. 19/096,536, filed Mar. 31, 2025, 19 pages.

* cited by examiner

MULTI-MODAL INPUTS FOR WEARABLE DEVICES, AND SYSTEMS AND METHODS OF USE THEREOF

RELATED APPLICATIONS

This application claim priority to U.S. Prov. App. No. 63/591,111, filed on Oct. 17, 2023, entitled "Multi-Modal Inputs for Wearable Devices, and Systems and Methods of Use thereof," which is hereby incorporated by reference in its entirety.

TECHNICAL FIELD

This relates generally to multi-modal gestures detected at an artificial-reality headset, including but not limited to techniques for performing one or more operations in a user interface based on one or more input tiers of multi-modal gestures.

BACKGROUND

Users of artificial reality have a limited capacity to remember input gestures performed at one or more devices owned by the user. For example, they can remember a few gestures without much difficulty and can learn a few additional gestures without difficulty. However, beyond a certain number of gestures, it is difficult for a user to learn them and remember them. Accordingly, there is a need to simplify user interface interaction options for a user but still allow them to perform a diverse number of operations at the user interface.

As such, there is a need to address one or more of the above-identified challenges. A brief summary of solutions to the issues noted above are described below.

SUMMARY

The methods, systems, and devices described herein allow users wearing an augmented-reality headset coupled to another device to engage in multi-modal gestures when multi-modal gestures are enabled at both devices. Creating a multi-tiered input gesture hierarchy allows the user to learn fewer gestures that can perform multiple operations depending on which part of the hierarchy they are in. For example, the user can perform a first gesture while multi-modal gestures are enabled which performs a first operation in a user interface. Then the user can perform that same first gesture while multi-modal gestures are disabled which performs a different operation at the head-wearable device not associated with the user interface (e.g., an audio control gesture such as changing the volume). In this example, the user only needs to know one input gesture but can perform multiple operations depending on whether multi-modal operations are available. Additional examples are provided below.

One method of controlling one or more user interface (UI) elements via gestures performed at one or more input devices is described below. The method includes, an artificial-reality headset worn by a user at a first point in time while multi-modal gestures are available via at least two input devices associated with the artificial-reality headset. The method further includes, in response to detecting a first input via a first input device of the at least two input devices, performing a first action at the artificial-reality headset. The method further includes, in response to detecting a second input via a second input device of the at least two input devices, performing a second action within a user interface presented via the artificial-reality headset. The method also includes, at a second point in time after the first point in time, multi-modal gestures are no longer available via the at least two input devices associated with the artificial-reality headset. The method further includes, in response to detecting the first input via the first input device of the at least two input devices, performing the second action within the user interface presented via the artificial-reality headset.

The features and advantages described in the specification are not necessarily all inclusive and, in particular, certain additional features and advantages will be apparent to one of ordinary skill in the art in view of the drawings, specification, and claims. Moreover, it should be noted that the language used in the specification has been principally selected for readability and instructional purposes.

Having summarized the above example aspects, a brief description of the drawings will now be presented.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 8A, 8B-1, 8B-2, and 8C illustrate example head-wearable devices, in accordance with some embodiments.

Figure 1A:
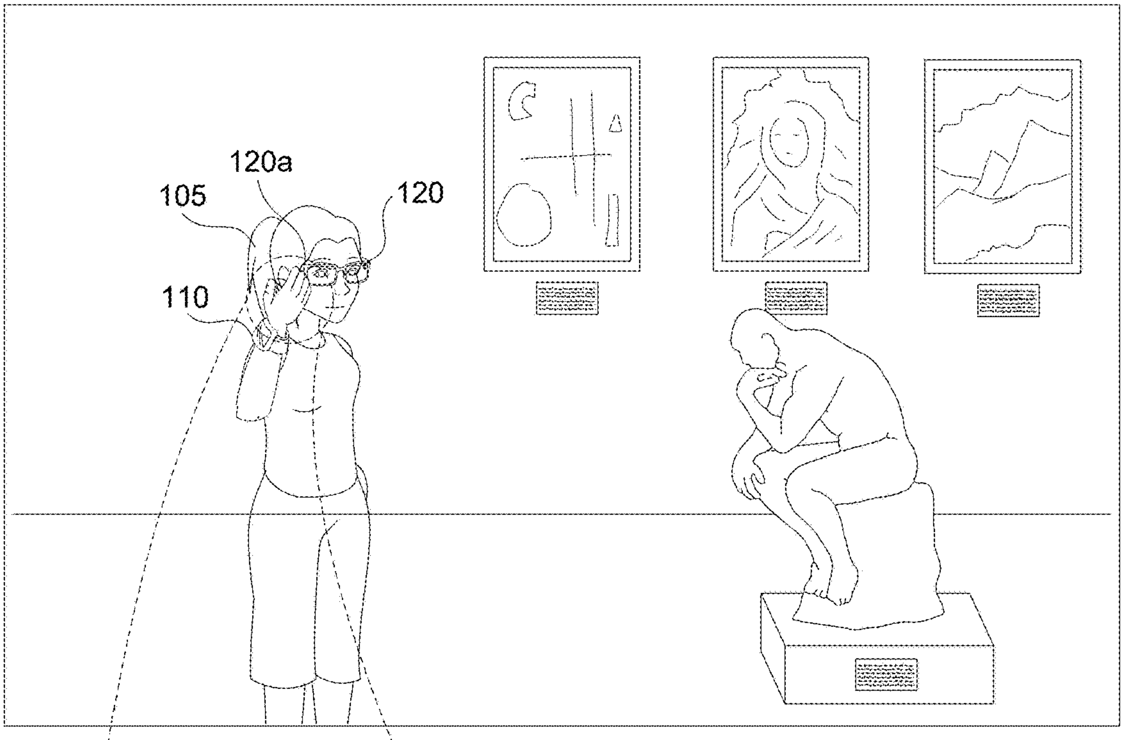
FIGS. 1A-1T illustrate a system configured to detect multi-modal input gestures at communicatively coupled devices, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Embodiments of this disclosure can include or be implemented in conjunction with various types or embodiments of artificial-reality systems. Artificial-reality (AR), as described herein, is any superimposed functionality and or sensory-detectable presentation provided by an artificial-reality system within a user's physical surroundings. Such artificial-realities can include and/or represent virtual reality (VR), augmented reality, mixed artificial-reality (MAR), or some combination and/or variation one of these. For example, a user can perform a swiping in-air hand gesture to cause a song to be skipped by a song-providing API providing playback at, for example, a home speaker. An AR environment, as described herein, includes, but is not limited to, VR environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

A hand gesture, as described herein, can include an in-air gesture, a surface-contact gesture, and or other gestures that can be detected and determined based on movements of a single hand (e.g., a one-handed gesture performed with a user's hand that is detected by one or more sensors 823A of a wearable device (e.g., electromyography (EMG) and/or inertial measurement units (IMU) s of a wrist-wearable device) and/or detected via image data captured by an imaging device of a wearable device (e.g., a camera of a head-wearable device)) or a combination of the user's hands. In-air means, in some embodiments, that the user hand does not contact a surface, object, or portion of an electronic device (e.g., a head-wearable device or other communicatively coupled device, such as the wrist-wearable device), in other words the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single or double finger tap on a table, on a user's hand or another finger, on the user's leg, a couch, a steering wheel, etc.). The different hand gestures disclosed herein can be detected using image data and/or sensor data (e.g., neuromuscular signals sensed by one or more biopotential sensors (e.g., EMG sensors) or other types of data from other sensors, such as proximity sensors, time-of-flight (ToF) sensors, sensors of an inertial measurement unit, etc.) detected by a wearable device worn by the user and/or other electronic devices in the user's possession (e.g., smartphones, laptops, imaging devices, intermediary devices, and/or other devices described herein).

Figure 1B:
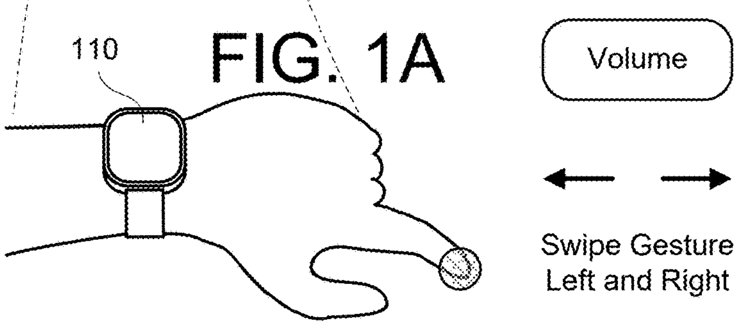
FIGS. 6A 6B, 6C-1, and 6C-2 illustrate example artificial-reality systems, in accordance with some embodiments.
Figure 1B:
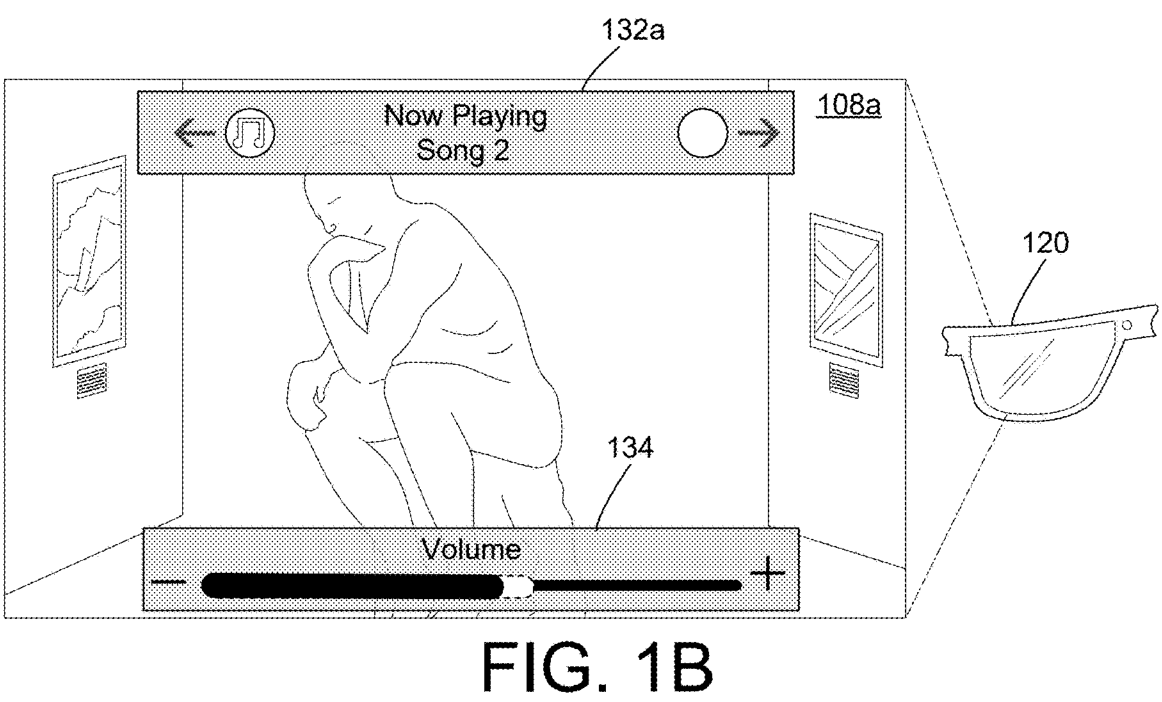
Figure 1C:
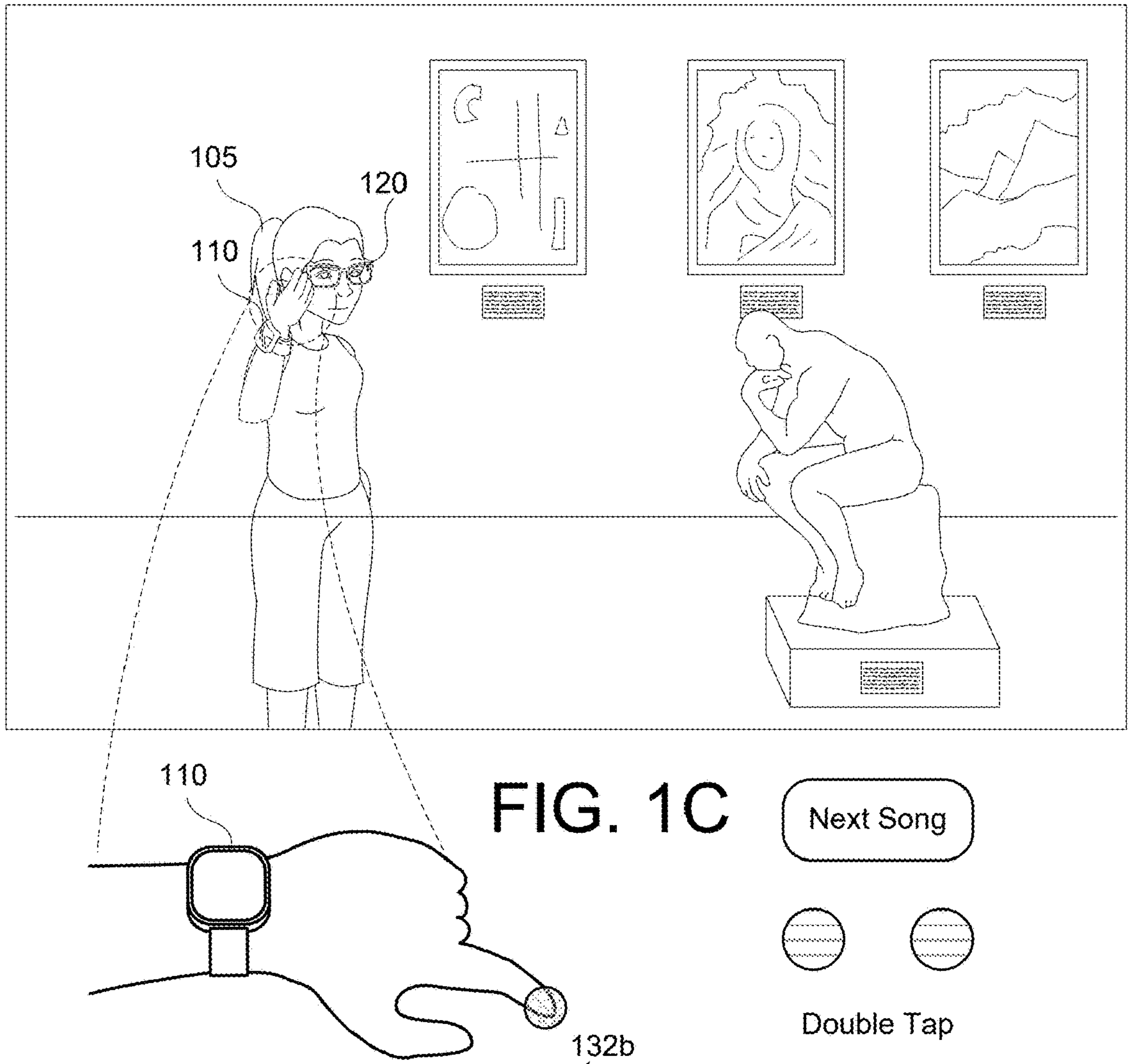
Figure 1D:
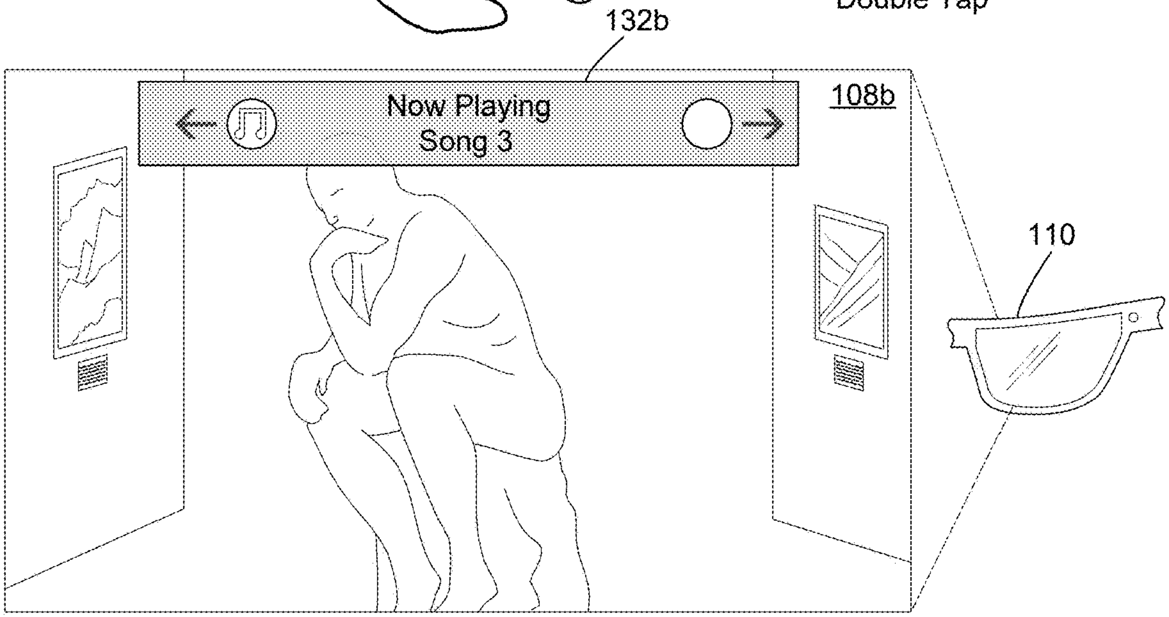
Figure 1E:
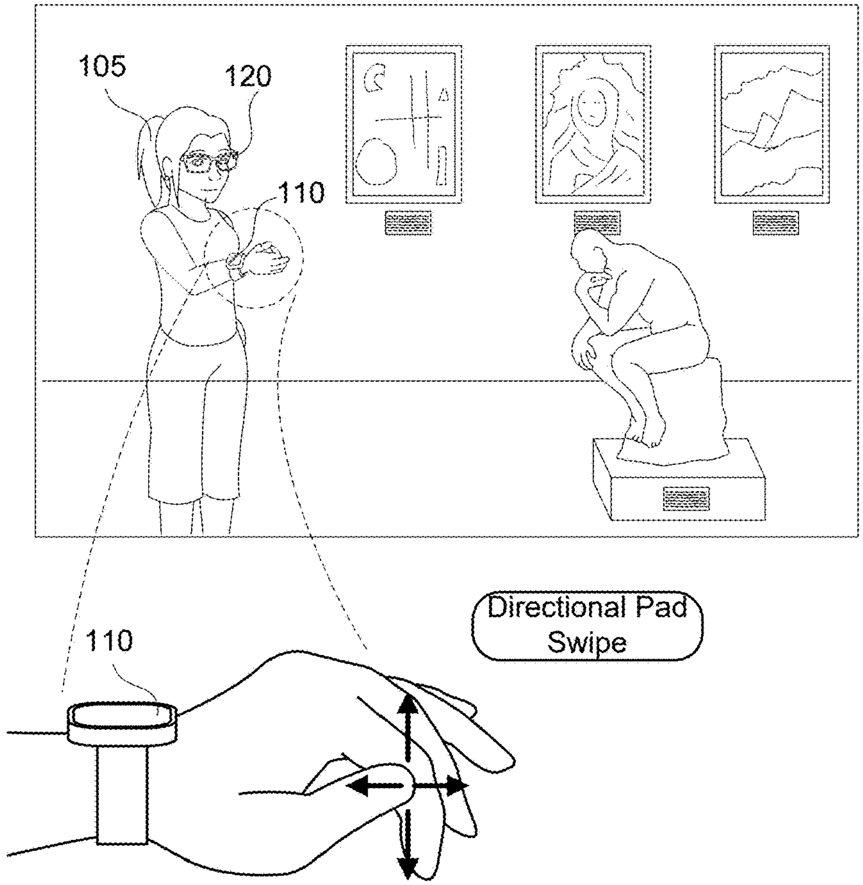
Figure 1F:
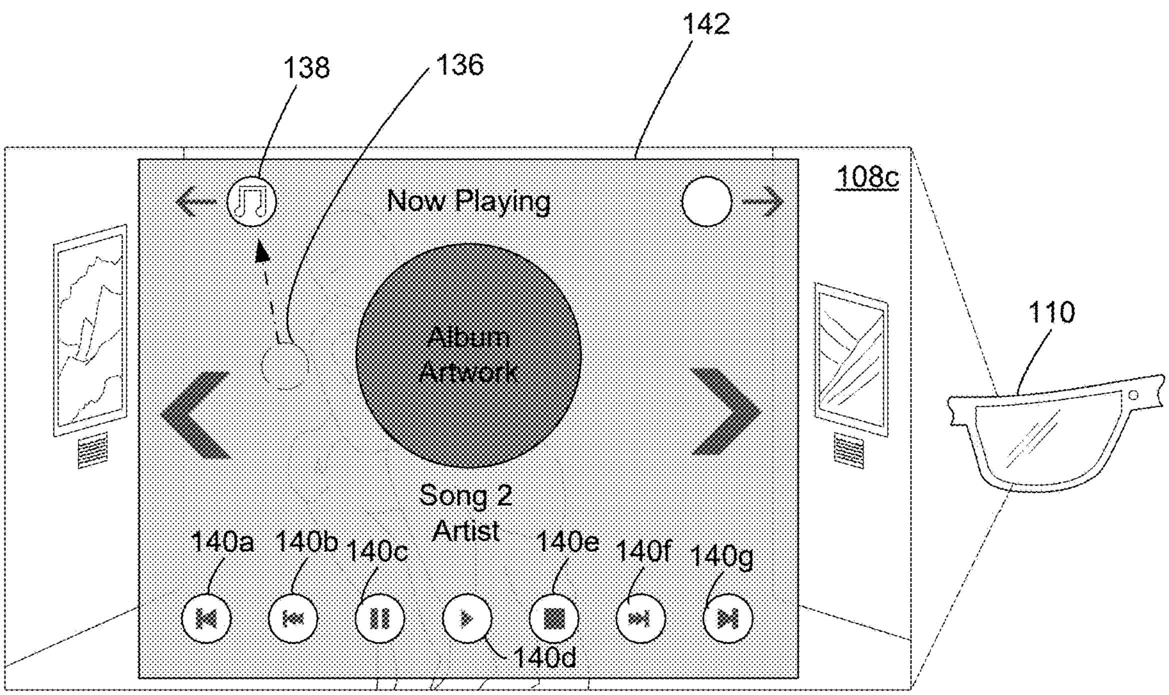
Figure 1G:
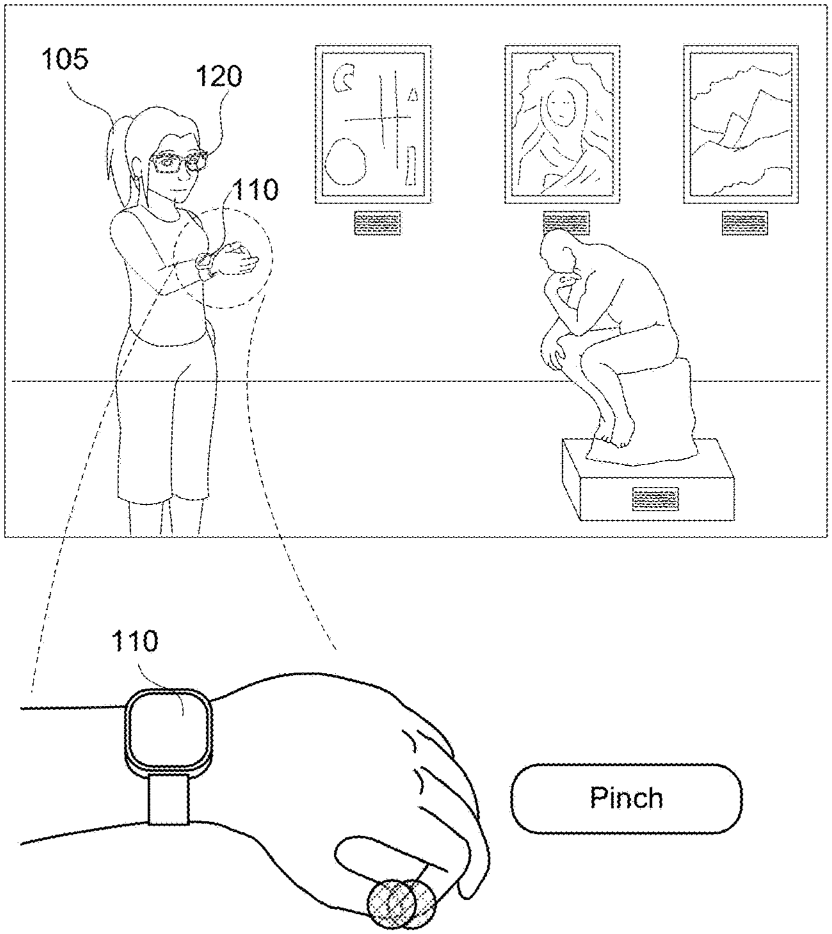
Figure 1H:
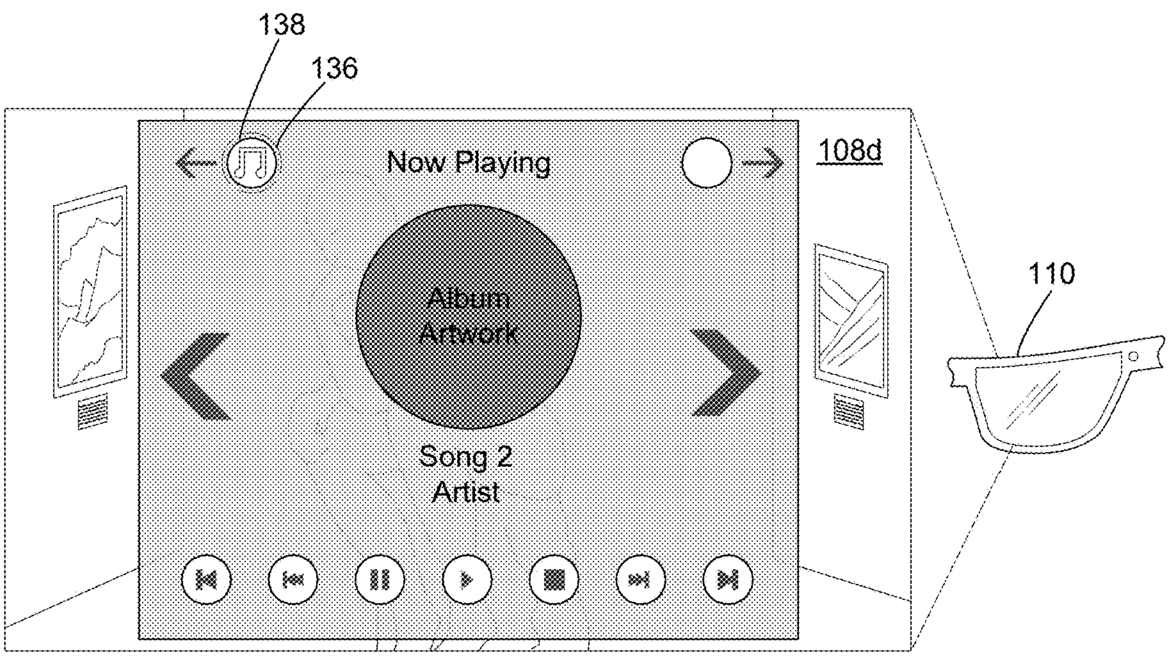
Figure 1I:
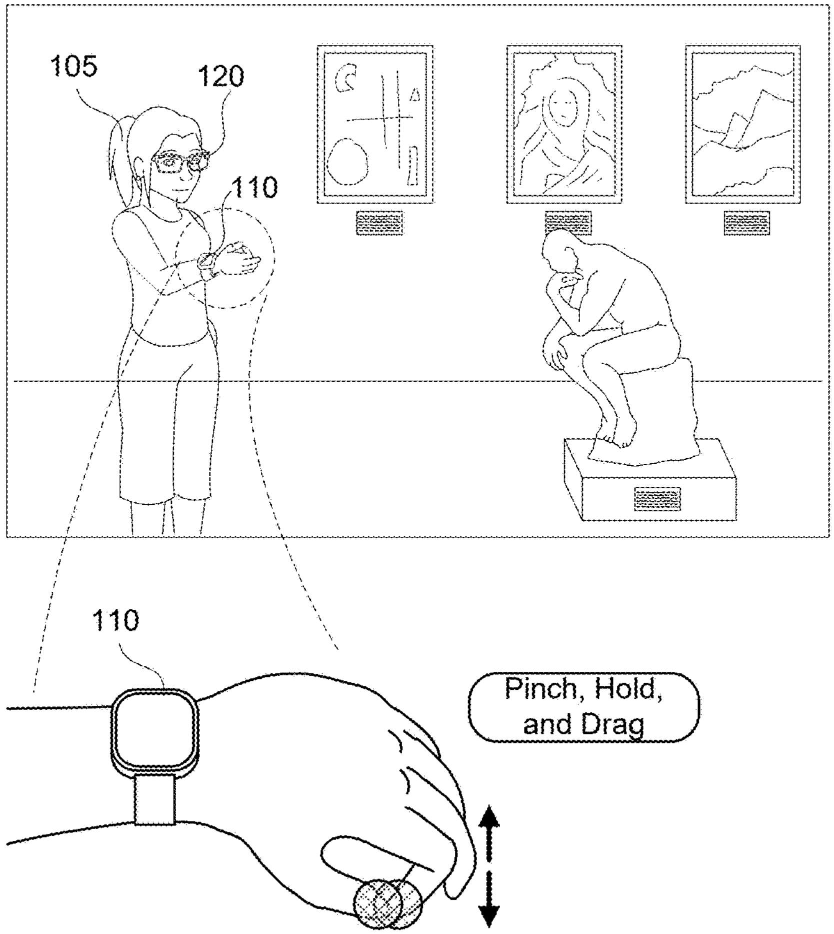
Figure 1J:
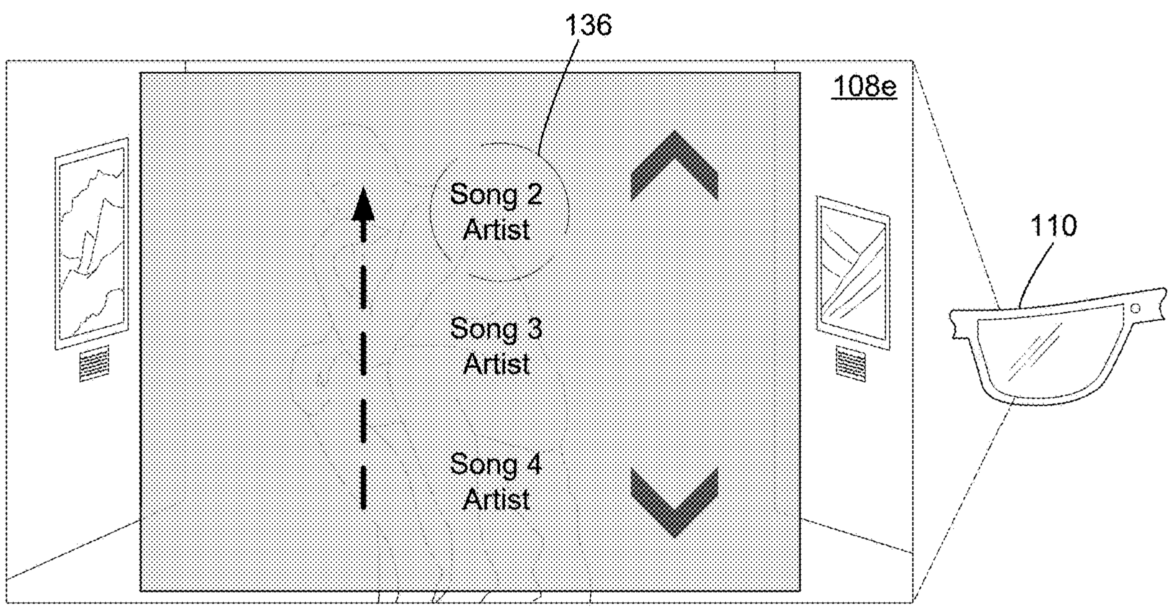
Figure 1K:
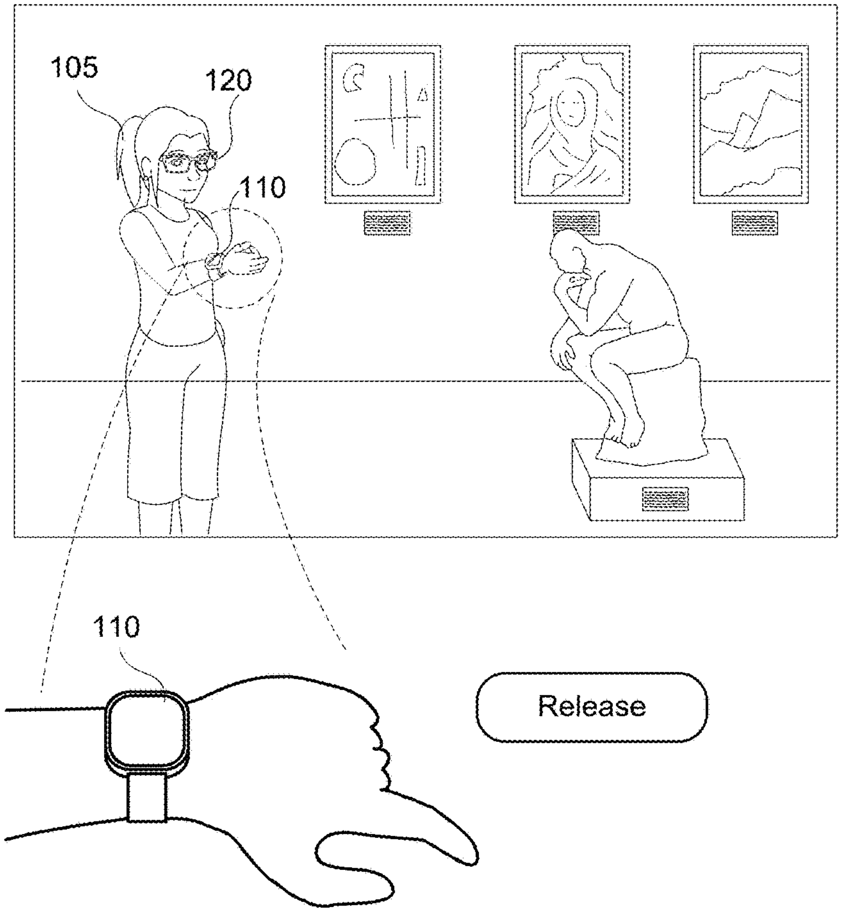
Figure 1L:
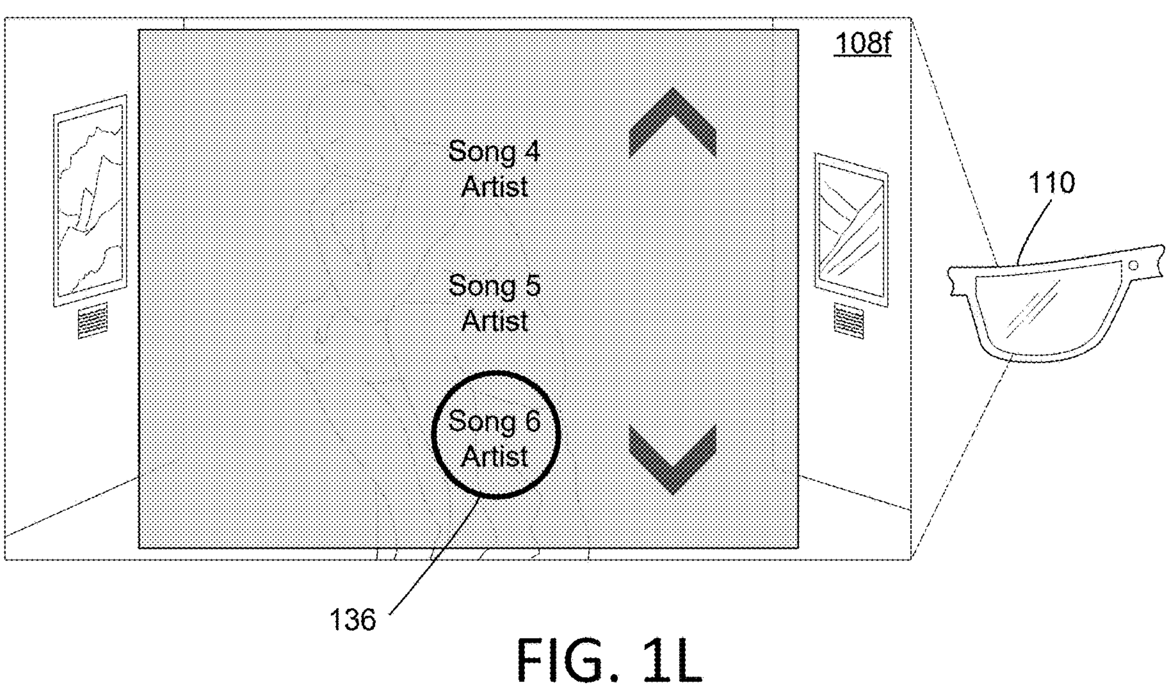
Figure 1M:
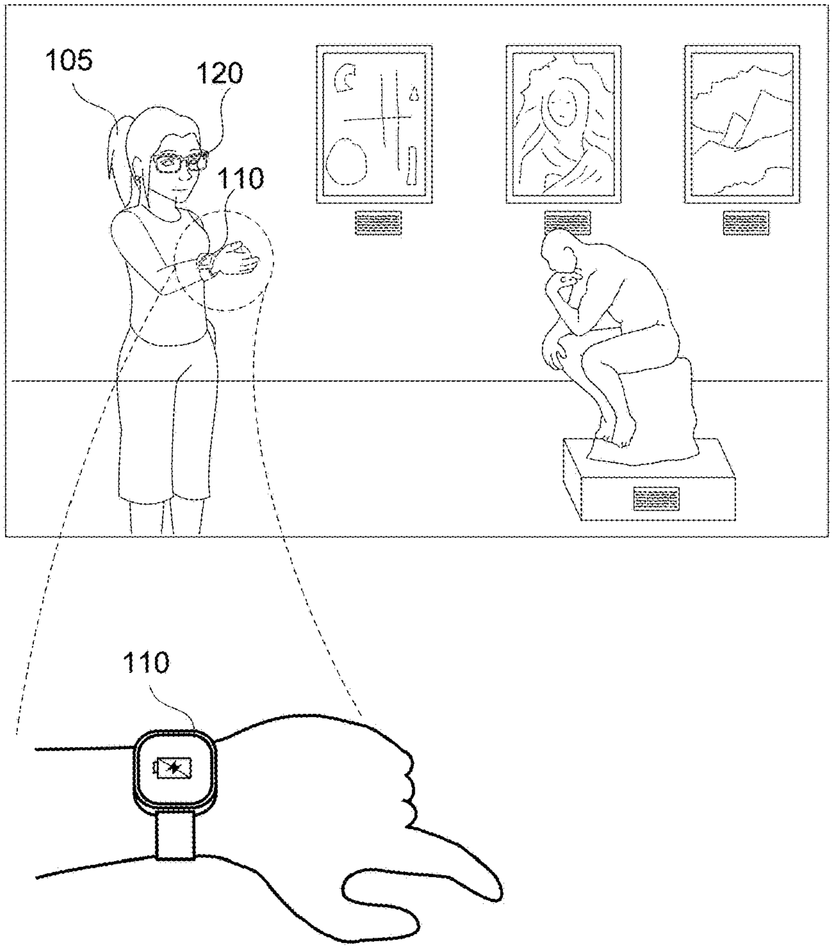
Figure 1N:
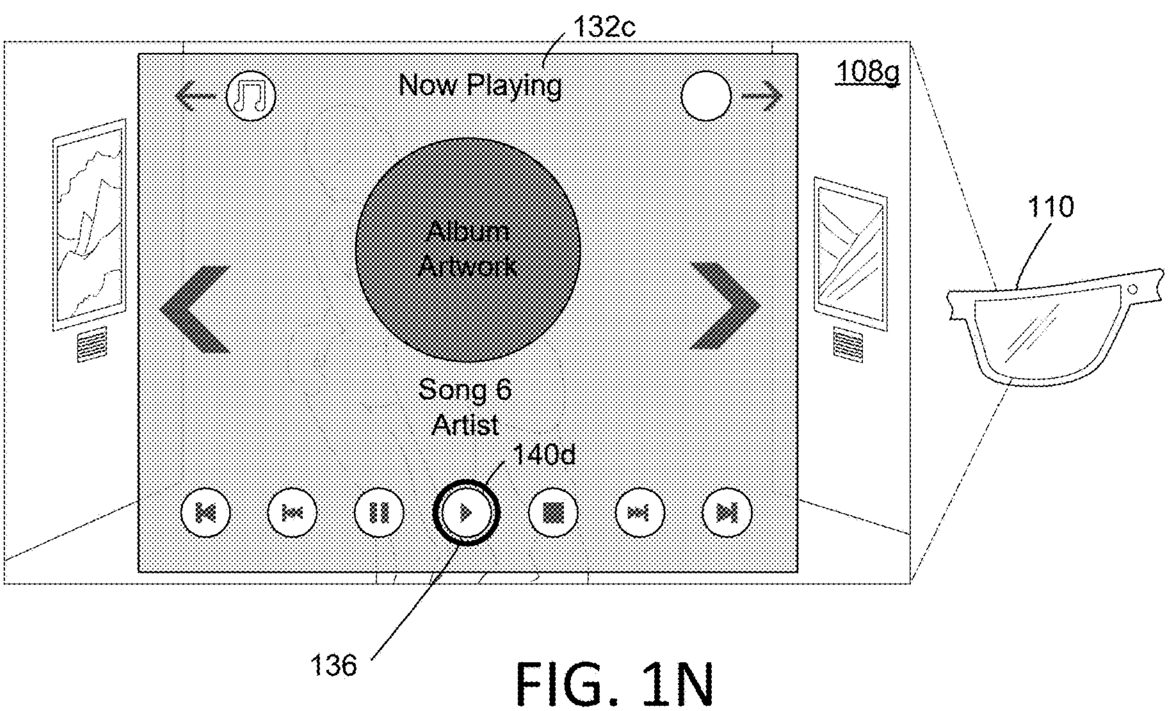
Figure 1O:
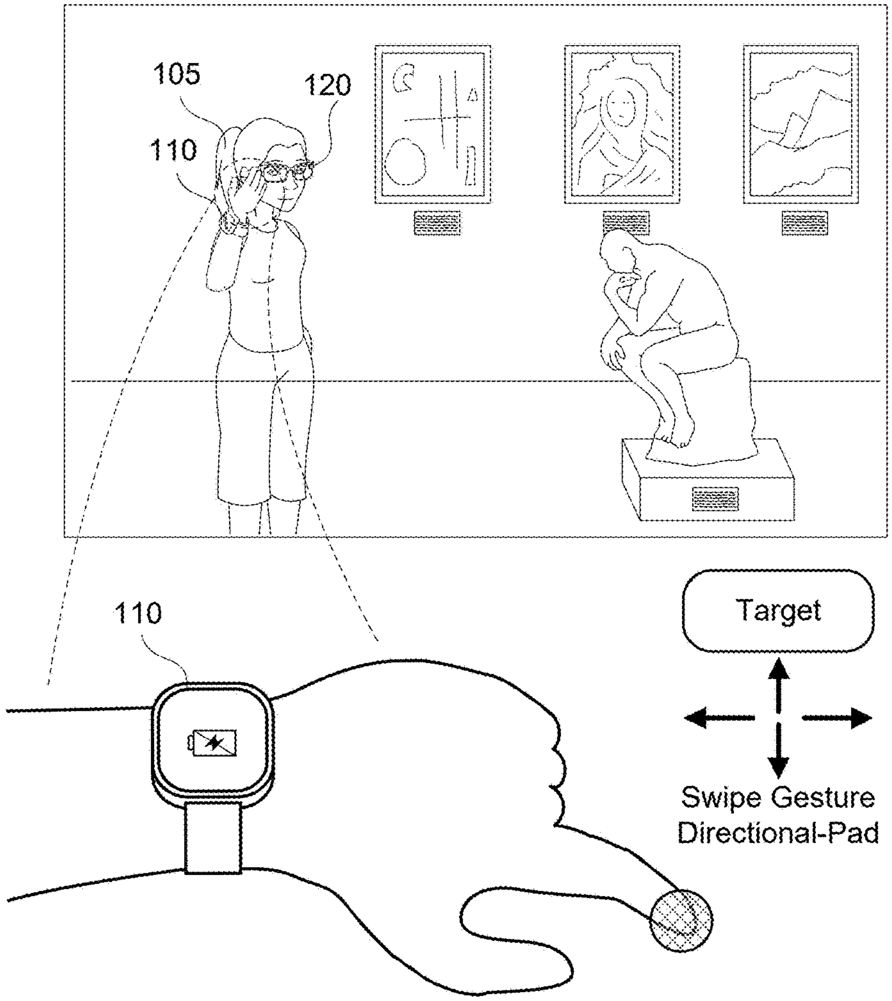
Figure 1P:
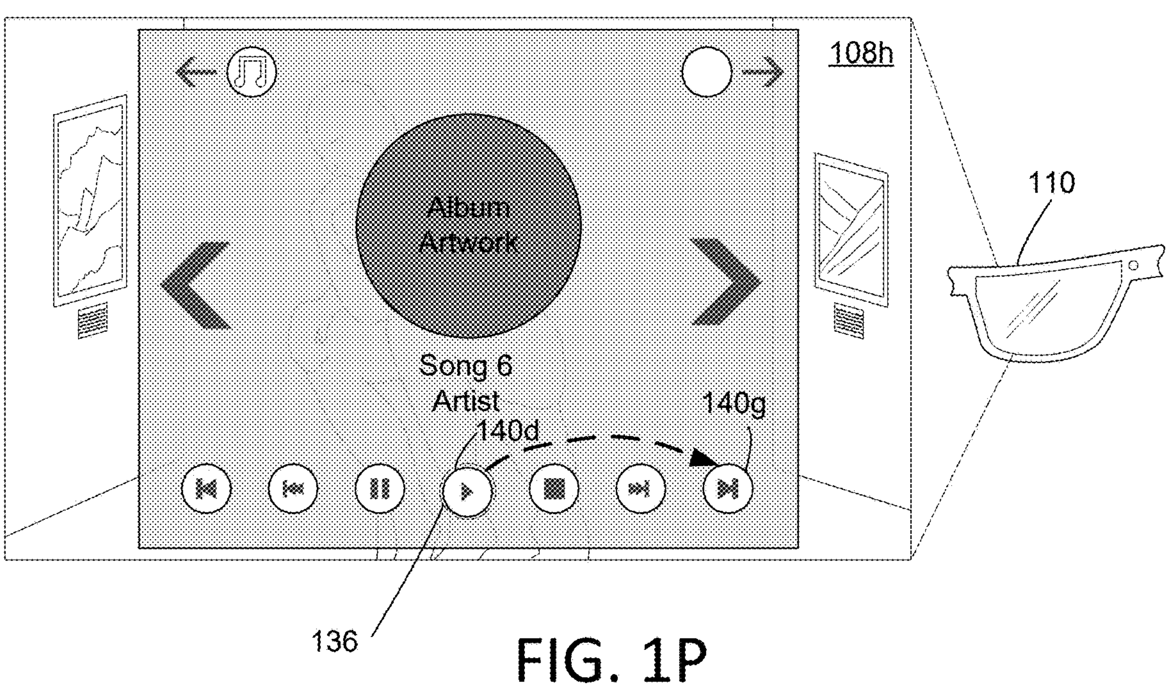
Figure 1Q:
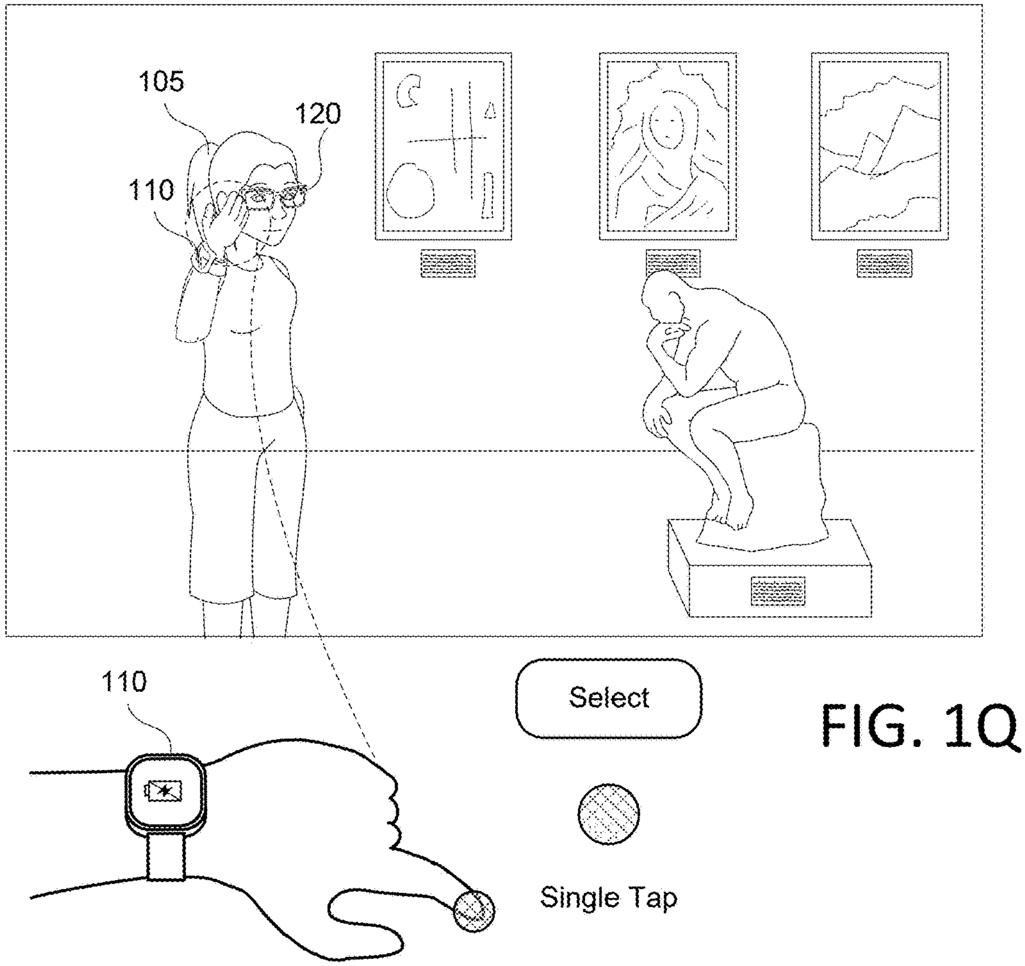
Figure 1R:
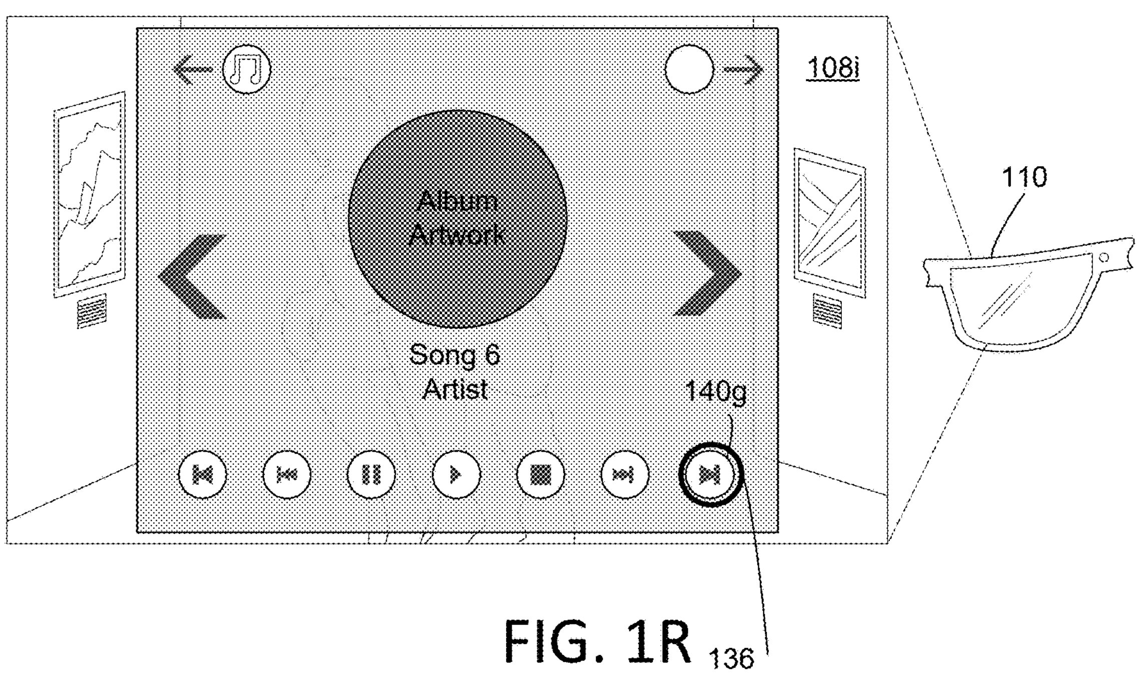
Figure 1S:
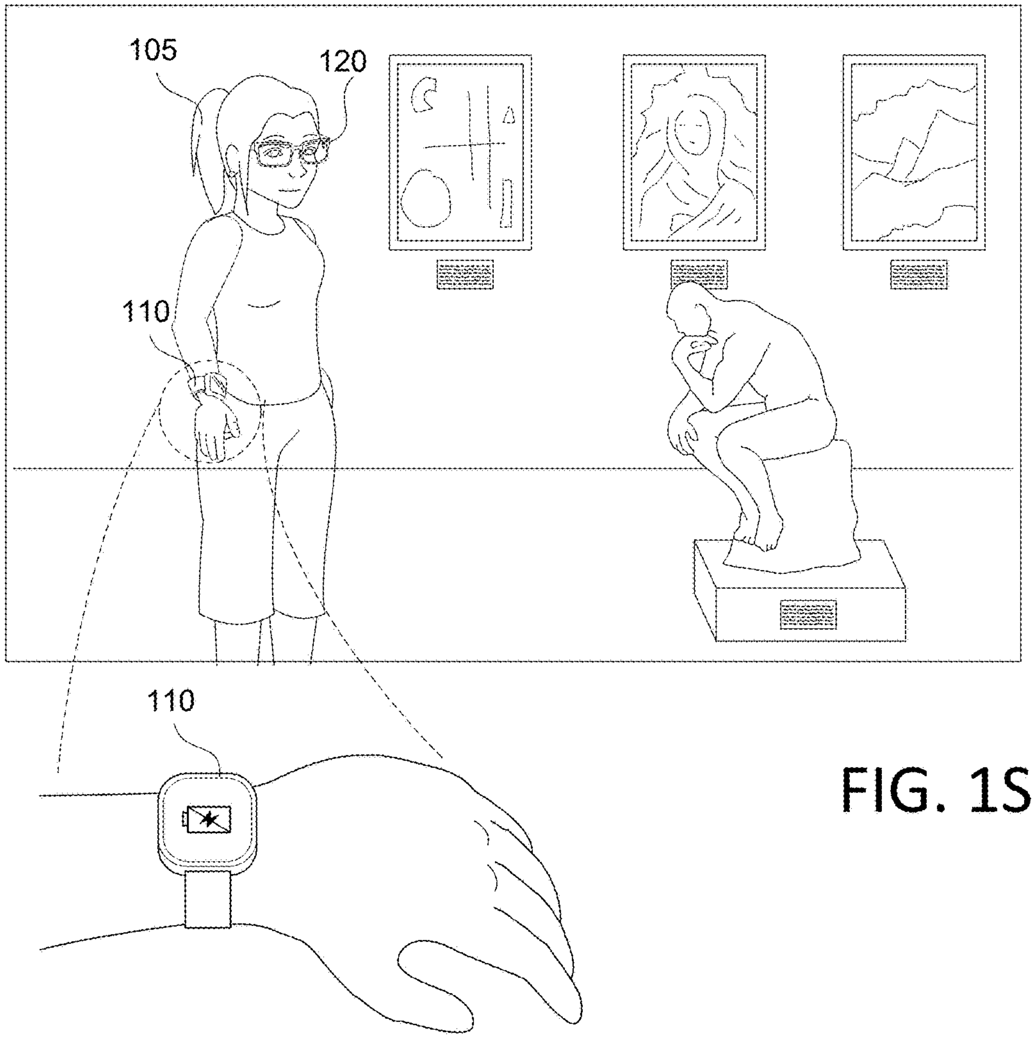
Figure 1T:
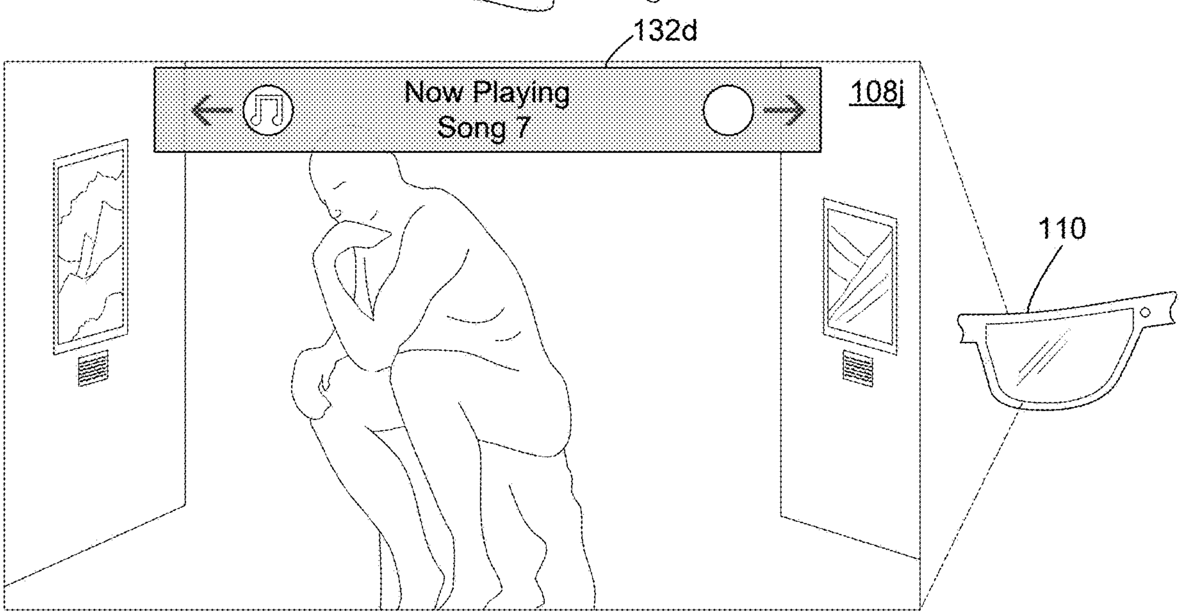

FIGS. 1A-1T illustrate a system configured to perform multi-modal inputs at communicatively coupled devices, in accordance with some embodiments. The system includes at least two communicatively coupled devices, such as a wrist-wearable device 110 and a head-wearable device 120. Each device has a respective input modality that allows a user 105 to perform one or more specific operations and/or specific controls via the device at which an input was detected. For example, the head-wearable device 120, in response to detecting an input performed by the user 105 at the head-wearable device 120 (e.g., at a touch-input surface, a voice command, gesture recognition, etc.), causes an operation to be performed at the head-wearable device 120 (e.g., an image capture). The system shown in FIGS. 1A-1T expands on the capabilities of the wrist-wearable device 110 and a head-wearable device 120 by enabling multi-modal inputs such that the respective input modalities of each device complement the operations performed by the at least two communicatively coupled devices.

FIG. 1A illustrates a user 105 wearing the wrist-wearable device 110 and the head-wearable device 120 performing an input gesture at the head-wearable device 120. The head-wearable device 120, in response to detecting the input gesture, is configured to cause the performance of a particular command and/or operation associated with the input gesture. The particular command and/or operation is based on the availability of multi-modal gestures. Specifically, if multi-modal gestures are available at the head-wearable device 120, the input gesture, when detected, causes the head-wearable device 120 to perform a first command; however, if multi-modal gestures are not available at the head-wearable device 120, the input gesture, when detected, causes the head-wearable device 120 to perform a second command, distinct from the first command. Example input gestures and associated commands are discussed below in reference to FIGS. 2A-3C.

Multi-modal gestures are available when at least two electronic devices are communicatively coupled. For example, in FIG. 1A, multi-modal gestures are available at the head-wearable device 120 and the wrist-wearable device 110 as the two devices are communicatively coupled. Alternatively or in addition, in some embodiments, multi-modal gestures are available in accordance with a determination that the at least two electronic devices are running the same application (e.g., a music application, a running application, a camera application, etc.), and/or in accordance with a determination that the at least two electronic devices are in proximity to one another (e.g., within 1 meter, in the same room, in the same building) and/or associated with the same user(s) and/or share the same application information (e.g., user account, family account, etc.). In some embodiments, multi-modal gestures are available in accordance with a determination that the at least two electronic devices share device profile information (e.g., device user accounts, email addresses, etc.) and/or share a network (e.g., a private home network).

Returning to FIG. 1A, the user 105 is walking in a museum while listening to music through speakers communicatively coupled with the head-wearable device 120 (e.g., speakers 836A (FIG. 8C), headphones, etc.). The wrist-wearable device 110 and the head-wearable device 120 worn by the user 105 are communicatively coupled, which enables multi-modal gestures such that a first input gesture performed by the user 105 at a first portion 120*a* of the head-wearable device 120 (e.g., a swiping gesture at a touch-input surface of the head-wearable device 120) causes the head-wearable device 120, in response to detecting the first input gesture, to perform a command and/or operation associated with a first input gesture of the multi-modal gestures. For example, when the user 105 performs the first input gesture at the first portion 120*a* of the head-wearable device 120 while the multi-modal gestures are available, the head-wearable device 120 causes the volume of the ongoing media (e.g., music) to change. Alternatively, if the user 105 had performed the first input gesture at the first portion 120*a* of the head-wearable device 120 while the multi-modal gestures were unavailable (as described below in reference to FIG. 1O), the head-wearable device 120 would have caused a user interface (UI) element to select a portion of a presented media application (e.g., directional-pad targeting of a UI element).

In some embodiments, the head-wearable device 120 detects one or more input gestures via touch-input surfaces (e.g., input detected by one or more capacitive sensors 828), buttons 834 coupled to the frame 804 of the head-wearable device 120, and/or through input gesture recognition using one or more cameras 839A-839D communicatively coupled with the head-wearable device 120. The wrist-wearable device 110 detects one or more input gestures via hand gestured detected by one or more biopotential sensors (e.g., EMG sensors 765; FIG. 7B), inputs at buttons 773 and/or 743 coupled to the wrist-wearable device 110, and/or touch inputs performed at a display 705 coupled with the wrist-wearable device 110.

Figure 8A:
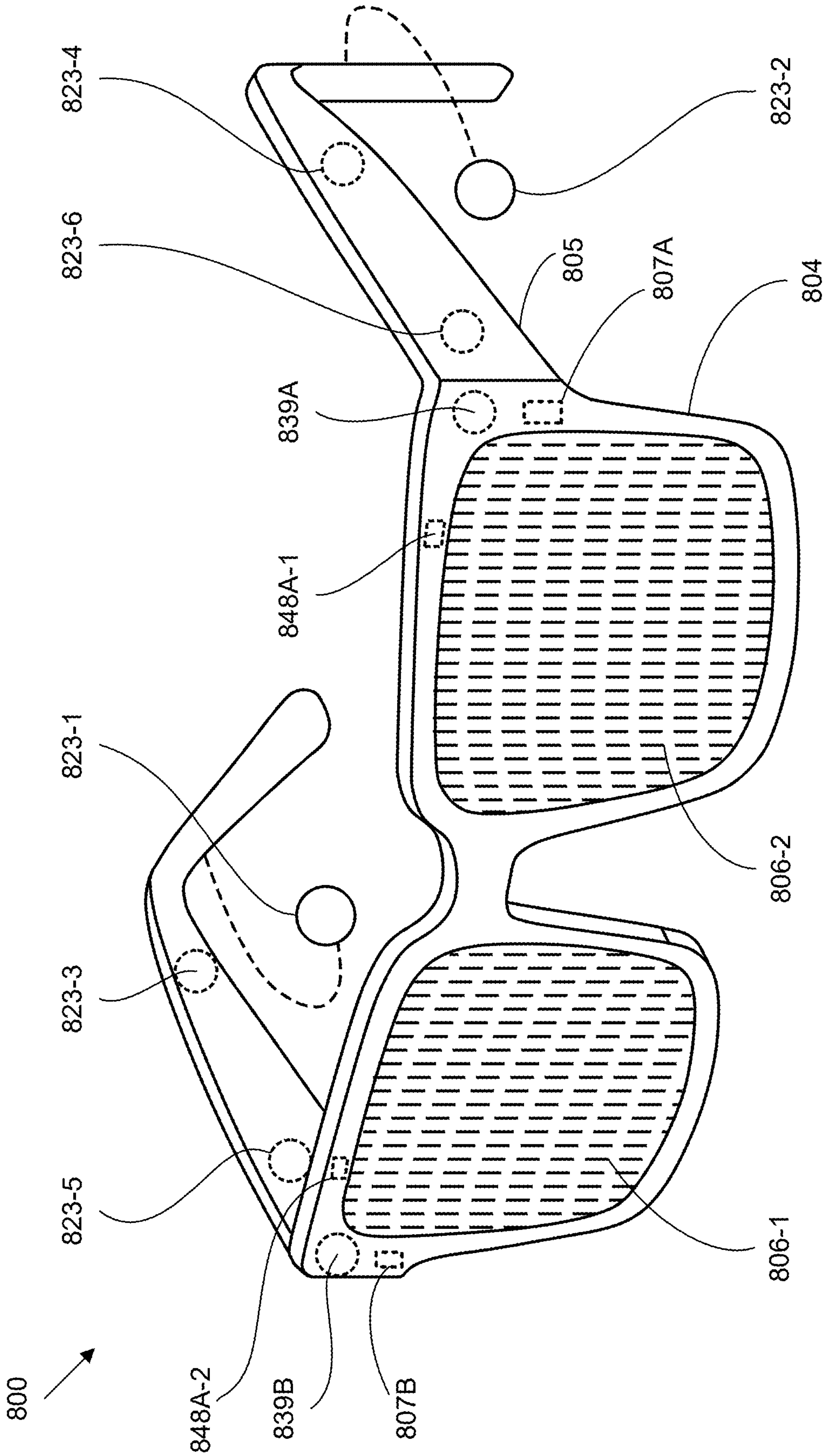

In some embodiments, the first portion 120*a* of the head-wearable device 120 is a temple arm 805 (e.g., the right or left temple arms 805; FIG. 8A) or side portion of the head-wearable device 120. The temple arm 805 can include one or more sensors 823A (e.g., one or more capacitive sensor 828, a proximity sensor 869, and/or other sensors described below in reference to FIGS. 8A-8C) for detecting user 105 contact with the temple arm 805, such that the temple arm operates as a touch-input surface. The touch-input surface of the head-wearable device 120 can be a first example input modality of the head-wearable device 120. The head-wearable device 120 can include more than one input modalities. For example, the head-wearable device 120 can also include one or more of the following input modalities: gesture recognition based on image data captured by one or more cameras (e.g., left and right cameras 839A and 839B; FIG. 8A) communicatively coupled and/or integrated into to the head-wearable device 120, voice inputs (including virtual assistant supported voice commands), gaze-detection based gestures, and/or inputs at an actuation device (e.g., buttons, switches, etc.). Additional input modalities for the head-wearable device 120 are discussed in FIGS. 8A-8C.

FIG. 1B illustrates a portion of a field of view of the user 105, which includes a first scene 108*a* through one or more lenses of a head-wearable device 120. The head-wearable device 120 presents, within the portion of the field of view of the user 105, a first visual cue 132*a* that shows a song is currently playing (e.g., the visual cue in FIG. 1B says "now playing song 2"). and a second visual cue 134 (e.g., a volume indicator). As shown in FIG. 1B, the second visual cue 134 changes in response to the user 105 performing the first input gesture at the first portion 120*a* of the head-wearable device 120 (e.g., the swiping gesture illustrated in FIG. 1A). In particular, in response to the first input gesture performed at the first portion 120*a* of head-wearable device 120 a volume of the audio data presented by the speakers communicatively coupled with the head-wearable device 120 is manipulated. For example, as shown in FIG. 1B, the user 105 swiping their pointer finger in a first direction (e.g., from right to left, or from left to right) at the first portion 120*a* of the head-wearable device 120 causes the head-wearable device to lower the volume of the music playing presented by the speakers communicatively coupled with the head-wearable device 120. In some embodiments, the user 105 swipes their finger in a second direction distinct from the first direction (e.g., opposite the first direction) causing the volume of the presented music to increase.

FIG. 1C illustrates the user 105 performing a second input gesture (e.g., a double tap input gesture with their finger (e.g., the user's pointer finger))) at the first portion 120*a* of the head-wearable device 120 at a second point in time. At the second point in time, the multi-modal gestures are available and the second input gesture at the first portion 120*a* of the head-wearable device 120 causes the head-wearable device 120 to perform a multi-modal specific command and/or operation. For example, as shown in Figures IC and ID, the second input gesture at the first portion 120*a* of the head-wearable device 120 causes a music application presented by the head-wearable device 120 to skip to the next song.

FIG. 1D illustrates a portion of the field of view of the user 105, which includes a second scene 108*b*. The head-wearable device 120 presents, within the portion of the field of view of the user 105, an updated first visual cue 132*b* in response to detection of the second input gesture. Specifically, the updated first visual cue 132*b* indicates the song has been changed from "song 2" as shown in FIG. 1B to "song 3."

FIG. 1E illustrates the user 105 performing a third input gesture at the wrist-wearable device 110 at a third point in time. At the third point in time, the multi-modal gestures are available and the third input gesture at wrist-wearable device 110 causes the head-wearable device 120 to perform a multi-modal specific command and/or operation (e.g., navigational command). In FIG. 1E, the wrist-wearable device 110 detects the third input gestures performed by the user 105 using one or more biopotential sensors (e.g., EMG sensors). Using biopotential sensors to detect input gestures can be a first input modality of the wrist-wearable device. Additional input modalities of the wrist-wearable device 110 can include detecting input gestures performed by the user at a touch display coupled and/or integrated into to the wrist-wearable device 110, detecting actuation of one or more buttons of the wrist-wearable device 110, and/or voice inputs detected via a microphone of the wrist-wearable device 110. The above-example input gesture modalities are non-exhaustive; additional input gesture modalities are discussed below in reference to FIGS. 7A and 7B.

FIG. 1E further illustrates the user 105 performing the third input gesture at the wrist-wearable device using a first phalange (e.g., the user's thumb) and a second phalange (e.g., the user's pointer finger). The third input gesture is a swipe gesture performed on a directional pad such that the movement of the first phalange correlates to the movement of a cursor 136 (e.g., the cursor shown in FIG. 1F) presented at the display of the head-wearable device 120. By performing the third input gesture at the wrist-wearable device 110 to control the UI presented at the head-wearable device 120, the user 105 is able to quickly select one or more UI elements and/or control applications connected to both devices. Specifically, the user 105 can perform quick hand gestures to navigate through a presented UI and/or control the devices instead of having to move their hand to one of the devices or retrieving another device (e.g., a smartphone) to control the UI.

FIG. 1F illustrates a portion of the field of view the user 105, which includes a third scene 108*c*. The head-wearable device 120 presents, within the portion of the field of view of the user 105 an updated location for the cursor 136, in response to the detection of the third input gesture (e.g., the third gesture performed in FIG. 1E). In FIG. 1F, the user 105 is navigating to the UI element which if selected sends the user 105 to a screen where they can select one or more additional songs. Specifically, FIG. 1F shows the user 105 moving the cursor 136 to the music UI element 138 (e.g., the music icon which returns the user 105 back to the song selection page). FIG. 1F further illustrates a different music application user interface 142 than the one illustrated in FIGS. 1B and 1D. In some embodiments, additional features are revealed in the active UI when an input gesture is performed at another device coupled to the head-wearable device 120. For example, while multi-modal gestures are enabled at the system and when the user 105 performs an input gesture at the wrist-wearable device 110, the music application user interface 142 (e.g., the active UI) further includes additional UI elements (e.g., audio controls 140*a*-140*g*) that can be selected with input gestures performed at either the wrist-wearable device 110 and/or the head-wearable device 120. In some embodiments, audio controls 140*a*-140*g* perform the following audio controls: (i) skip backward 140*a* skips backward 1 song, (ii) fast reverse 140*b* quickly skips through portions of the song in reverse at a first interval, (iii) pause 140*c* pauses the song but saves the place of where the song was paused, (iv) play 140*d* starts the song, (v) stop 140*e* stops the song but does not save the place of where the song was stopped, (vi) fast forward 140*f* quickly skips through portions of the song at a second interval, and (vii) skip forward 140*g* skips forward 1 song.

FIG. 1G further illustrates the user 105 performing a fourth input gesture (e.g., a pinch gesture) at the wrist-wearable device 110 at a fourth point in time. At the fourth point in time, the multi-modal gestures are available and the third input gesture at the wrist-wearable device 110 causes the head-wearable device 120 to perform a multi-modal specific command and/or operation (e.g., a navigational command). In FIG. 1G, the fourth input gesture is performed when the user 105 presses the first phalange (e.g., the user's thumb) and the second phalange (e.g., the user's pointer finger) and together (e.g., a pinch gesture). In some embodiments, the pinch gesture indicates a selection of a selected user interface element. For example, as illustrated in FIG. 1H, while the cursor 136 is over the music UI element 138 and in accordance with a determination that the user 105 performs the pinch gesture, this causes the music UI element 138 to be selected.

FIG. 1H illustrates a portion of the field of view of the user 105, which includes viewing a fourth scene 108*d*. The head-wearable device 120 presents, within the portion of the field of view of the user 105, an updated location on the cursor 136 in response to the detection of the fourth input gesture (e.g., a navigational gesture). As discussed above, FIG. 1F showed the user 105 moving the cursor 136 to the music UI element 138 (e.g., the music icon which returns the user 105 back to the song selection page). Specifically, FIG. 1H illustrates the cursor 136 over the music UI element 138.

FIG. 1I illustrates the user 105 performing fifth input gesture at the wrist-wearable device 110 at a fifth point in time (e.g., a pinch and drag input gesture; an additional navigation gesture). At the fifth point in time, the multi-modal gestures are available and the fifth input gesture at wrist-wearable device 110 causes the head-wearable device 120 to perform a multi-modal specific command and/or operation (e.g., navigational command). In FIG. 1I, in response to the user's performance of the fifth gesture, this causes the user interface scrolls through a plurality of UI elements (e.g., the plurality of songs in a playlist). To perform the fifth input gesture (e.g., the pinch and drag input gesture), the user 105 starts by holding the fourth input gesture (e.g., the pinch gesture) as described in FIG. 1G by continuously pressing the first and second phalange together. While holding the fourth input gesture (e.g., the pinch gesture), the user 105 simultaneously moves their hand in a first direction (e.g., moving to the left away from the user's body) or a second direction (e.g., moving to the right towards from the user's body) in order to scroll through one or more UI elements (e.g., one or more songs illustrated in FIG. 1J). For example, in FIG. 1I, the user 105 moves their hand in a first direction to scroll up through the plurality of songs to go from "song 2" to "song 6."

FIG. 1J illustrates a portion of the field of view of the user 105, which includes a fifth scene 108*c*. The head-wearable device 120 presents, within the portion of the field of view of the user 105 illustrates the user 105 actively scrolling through the plurality of UI elements (e.g., the plurality of songs) in response to the performance of the fifth input gesture (e.g., pinch, hold and drag input gesture) performed by the user 105 in FIG. 1I. In some embodiments, when the user 105 performs the fifth input gesture (e.g., pinch and hold input gesture), the cursor 136 highlights the currently selected object giving the user 105 a point of reference to scroll from. In FIG. 1J, as the user 105 moves the input gesture in the first direction, the cursor will continue to move down through the plurality of UI elements until one is selected.

FIG. 1K illustrates the user 105 performing a sixth input gesture (e.g., releasing the pinch and drag input gesture) at the wrist-wearable device 110 at a sixth point in time. At the sixth point in time, the multi-modal gestures are available and the third input gesture at wrist-wearable device 110 causes the head-wearable device 120 to perform a multi-modal specific command and/or operation (e.g., navigational command). Specifically, FIG. 1K illustrates in accordance with a determination that the user 105 the fifth input gesture, causing the UI of the head-wearable device 120 to select one of the plurality of UI elements (e.g., the plurality of songs in a playlist).

FIG. 1L illustrates a portion of the field of view of the user 105, which includes a sixth scene 108*f*. The head-wearable device 120 presents, within the portion of the field of view of the user 105, one of the UI elements being selected in accordance with a determination that the sixth input gesture is performed (e.g., when the user 105 released the input gesture) as illustrated in FIG. 1I. In some embodiments, the cursor 136 turns solid to indicate a UI element was selected and the sixth input gesture has ended.

FIG. 1M illustrates that the battery of the wrist-wearable device 110 is too low to continue receiving input gestures from the user 105 at a seventh point in time. At the seventh point in time, the multi-modal gestures are no longer available in accordance with a determination that no eligible devices (e.g., do not have multi-modal gestures enabled) are running the same application or in proximity to the head-wearable device 120 (e.g., a previously coupled device (e.g., the wrist-wearable device 110) runs out of battery). Therefore, FIGS. 1M-1T illustrate a plurality of scenarios while multi-modal gestures are unavailable. In accordance with a determination that multi-modal gestures are not available, in response to detecting a seventh input gesture, perform a command and/or operation associated with the head-wearable device 120. In some embodiments, the user 105 can connect an additional device (e.g., smart phone, additional wrist-wearable device, etc.) to reactivate multi-modal gestures. However, FIGS. 1M-1T illustrate a system where multi-modal gestures are no longer available at the system and input gestures are performed at the head-wearable device 120.

FIG. 1N illustrates a portion of the field of view of the user 105, which includes a seventh scene 108*g*. The head-wearable device 120 presents, in response to performing the sixth input gesture (e.g., the user 105 released the input gesture) the selection of a UI element (e.g., song 6). The cursor 136 shows a solid line indicating that the play 140*d* button was selected and song 6 is now playing. This is also indicated by the third visual cue 132*c* which says, "Now Playing."

FIG. 1O illustrates the user 105 performing a seventh input gesture (e.g., a navigational input gesture) at the head-wearable device 120 at an eighth point in time. At the eighth point in time, the multi-modal gestures are unavailable and the seventh input gesture at head-wearable device 120 causes the head-wearable device 120 to perform a non-multi-modal specific command and/or operation. FIG. 1O further illustrates that the seventh input gesture is performed when the user 105 uses a first phalange (e.g., the user's thumb) at a first portion 120*a* of the head-wearable device 120 (e.g., at a touch-input surface) as a directional swipe pad such that the movement of the first phalange correlates to the movement of a cursor 136 at the display of the head-wearable device 120. The directional swipe pad movements are similar to those illustrated in FIG. 1E, however the movements are performed at the head-wearable device 120 in FIG. 1O.

FIG. 1P illustrates a portion of the field of view of the user 105, which includes an eighth scene 108*h*. The head-wearable device 120 presents, within the portion of the field of view of the user 105, the user 105 listening to song 6 and that the cursor 136 is surrounding the play 140*d* button as a dotted line indicating the cursor 136 is able to move to the next UI element. Specifically, FIG. 1P illustrates the user 105 performing the seventh input gesture (e.g., the directional-pad swipe gesture at the first portion 120*a* of the head-wearable device 120), causing the cursor to move from the play 140*d* button to the skip forward 140*g* button.

FIG. 1Q illustrates the user 105 performing an eighth input gesture (e.g., a single tap input gesture with their finger (e.g., the user's pointer finger)) at the first portion 120*a* of the head-wearable device 120 at a ninth point in time. At the ninth point in time, the non-multi-modal gestures are performed at the head-wearable device 120 and cause the head-wearable device 120 to perform a specific command/operation (e.g., a navigational gesture). Specifically, the eighth input gesture causes the head-wearable device 120 to perform the selection of the audio control UI element highlighted by the cursor 136 the user 105 moved in FIG. 10.

FIG. 1R illustrates a portion of the field of view of the user 105 which includes a ninth scene 108*i*. The head-wearable device 120 presents, within the portion of the field of view of the user 105, the selection of the skip forward 140*g* audio control UI element which causes the song to change. FIG. 1R shows the cursor 136 has a solid line indicating the audio control UI element is selected.

FIG. 1S illustrates the user's hand at rest as the user 105 is currently finished performing input gestures at a tenth point in time.

FIG. 1T illustrates a portion of the field of view of the user 105 including a tenth scene 108*j*. The head-wearable device 120 presents, within the portion of the field of view of the user 105, song 6 being skipped forward by one song to song 7. FIG. 1T further illustrates that song 7 is now playing as indicated by the fourth visual cue 132*d* which says, "Now Playing." Additionally, the music UI is minimized to a size to minimally disrupt the user's view through the head-wearable device 120.

As described below in reference to FIGS. 2A-3C, a user 105 can control other audio functions such as playing/pausing a song, switching to the next or previous song, and/or or initiating a virtual assistant by performing one or more input gestures at the first portion 120*a* of the head-wearable device 120, as well as other control functions such as UI navigation and/or system control functions, depending on the availability of multi-modal gestures.

FIGS. 2A-2D illustrate example multi-modal gestures available at a head-wearable device and a wrist-wearable device, in accordance with some embodiments. As described above in reference to FIGS. 1A-IL, multi-modal gestures are available when communicatively coupled devices work in conjunction to control and/or operate one or more applications and/or processes running on at least one communicatively coupled devices. Specifically, wearable devices, such as the wrist-wearable device 110 and the head-wearable device 120, when communicatively coupled, can detect respective user inputs, and cause the performance of one or more operations and/or commands at applications and/or processes running at a particular wearable device or each of the wearable devices. In some embodiments, the one or more operations and/or commands are based on the communicatively coupled device that detects the user input and/or the ongoing applications and/or processes.

Figures 2A, 2B:
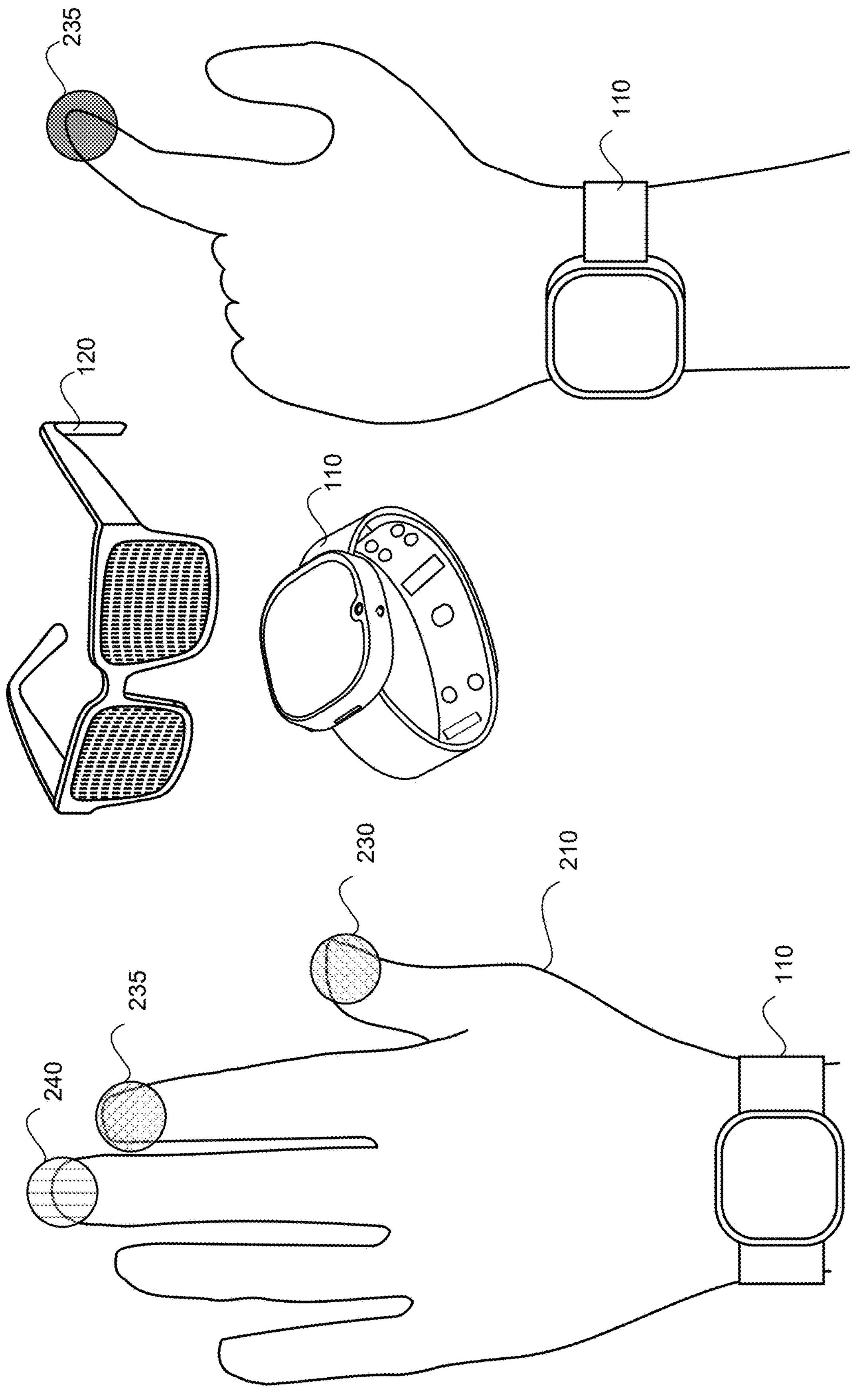
FIGS. 2A-2D illustrate an example of one or more hand gestures performed at a head-wearable device and a wrist-wearable device, in accordance with some embodiments.

FIG. 2A shows a first set of gestures available at the wrist-wearable device 110 while communicatively coupled with the head-wearable device 120 and multi-modal gestures are available. The first set of gestures available at the wrist-wearable device 110 include one or more biopotential-based gestures detected via biopotential sensors (e.g., EMG sensors 765;

FIG. 7B) of the wrist-wearable device 110. The one or more biopotential-based gestures can be hand gestures performed by a user, such as surface-contact gestures, in-air gestures, and other gestured described above. The biopotential-based gestures can include one or more input tiers. For example, a first input tier of the one or more biopotential-based gestures can include contact between a first phalange (e.g., a portion of a thumb 230 of a hand 210) and a second phalange (e.g., a portion of an index finger 235 of the hand 210) of the user, and a second input tier of the one or more biopotential-based gestures can include contact between the first phalange and a third phalange (e.g., a portion of a middle finger 240 of the hand 210) of the user. In some embodiments, one or more phalanges can be associated with respective commands and/or operations. For example, in some embodiments, the second phalange can be associated with navigation-based commands and/or operations (e.g., commands for navigating a user interface) and the third phalange can be associated with system-based commands and/or operations (e.g., commands for operating an electronics device).

The above examples are non-limiting; the skilled artisan will appreciate upon reading the descriptions that biopotential-based gestures can include contact between any two phalanges of the users or not contact between phalanges of the user's hand (e.g., a hand wave, wrist rotation, finger pointing, etc.). As described below in reference to FIG. 2D, biopotential-based gestures of each input tier cab be associated with one or more respective commands and/or operations.

FIG. 2B shows a second set of gestures available at the head-wearable device 120 while communicatively coupled with the wrist-wearable device 110 and multi-modal gestures are available. The second set of gestures available at head-wearable device 120 include one or more touch-input gestures (or surface-contact gestures) detected via one or more sensors 823A (e.g., capacitive sensors 828; FIG. 8C) of the head-wearable device 120. The one or more touch-input gestures can be hand contact patterns (e.g., single tap, doublet tap, etc.) performed by a user at a portion of the head-wearable device 120. For example, the user can use their second phalange (e.g., a portion of an index finger 235) to contact a portion of the head-wearable device 120 and cause the head-wearable device 120 to perform a command or operation. As described below in reference to FIG. 2C, touch-input gestures performed at the head-wearable device 120 can be associated with one or more respective commands and/or operations.

Figure 2C:
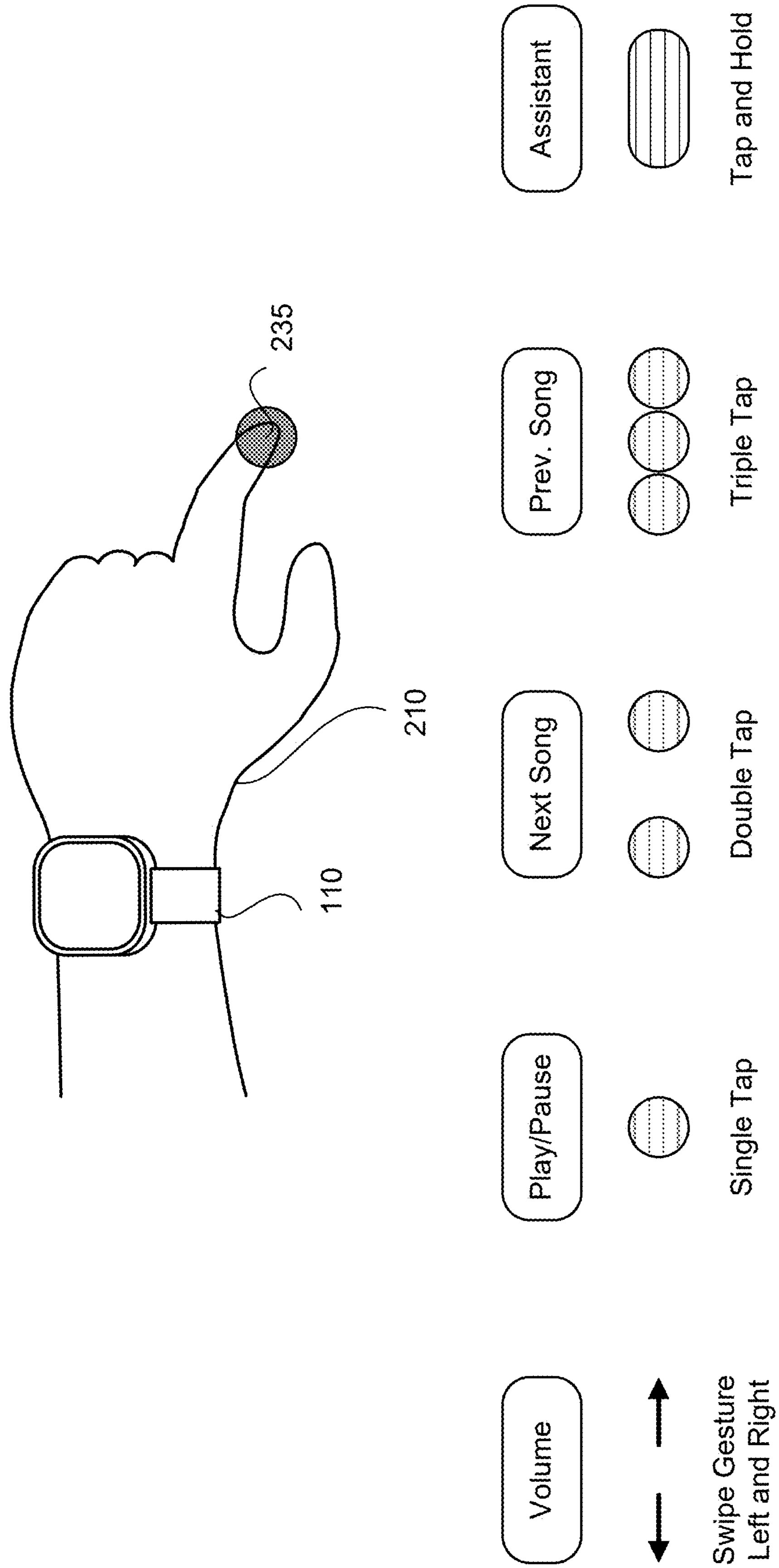

FIG. 2C shows example multi-modal gesture commands associated with the second set of gestures available at the head-wearable device 120 while communicatively coupled with the wrist-wearable device 110 and an application (e.g., a media streaming application) is ongoing. Specifically, FIG. 2C shows a first input gesture that is performed when the user swipes a portion of their index finger 235 on a portion of the head-wearable device 120 (e.g., the first portion 120*a*; FIGS. 1A-1T), a second input gesture that is performed when the user performs a single tap with the portion of their index finger 235 on the portion of the head-wearable device 120, a third input gesture that is performed when the user performs a double tap with the portion of their index finger 235 on the portion of the head-wearable device 120, a fourth input gesture that is performed when the user performs a triple tap with the portion of their index finger 235 on the portion of the head-wearable device 120, a fifth input gesture that is performed when the user performs a tap and hold with the portion of their index finger 235 on the portion of the head-wearable device 120. Each gesture is associated with a respective command. For example, the first input gesture is associated with a command for adjusting a volume of presented audio data, the second input gesture is associated with a command for pausing or playing an audio track of the media streaming application, the third input gesture is associated with a command for skipping to the next song of the media streaming application, the fourth input gesture is associated with a command for returning to the previous song of the media streaming application, and the fifth input gesture is associated with a command for initiating a virtual assistant (or initiating an audio input modality).

Figure 2D:
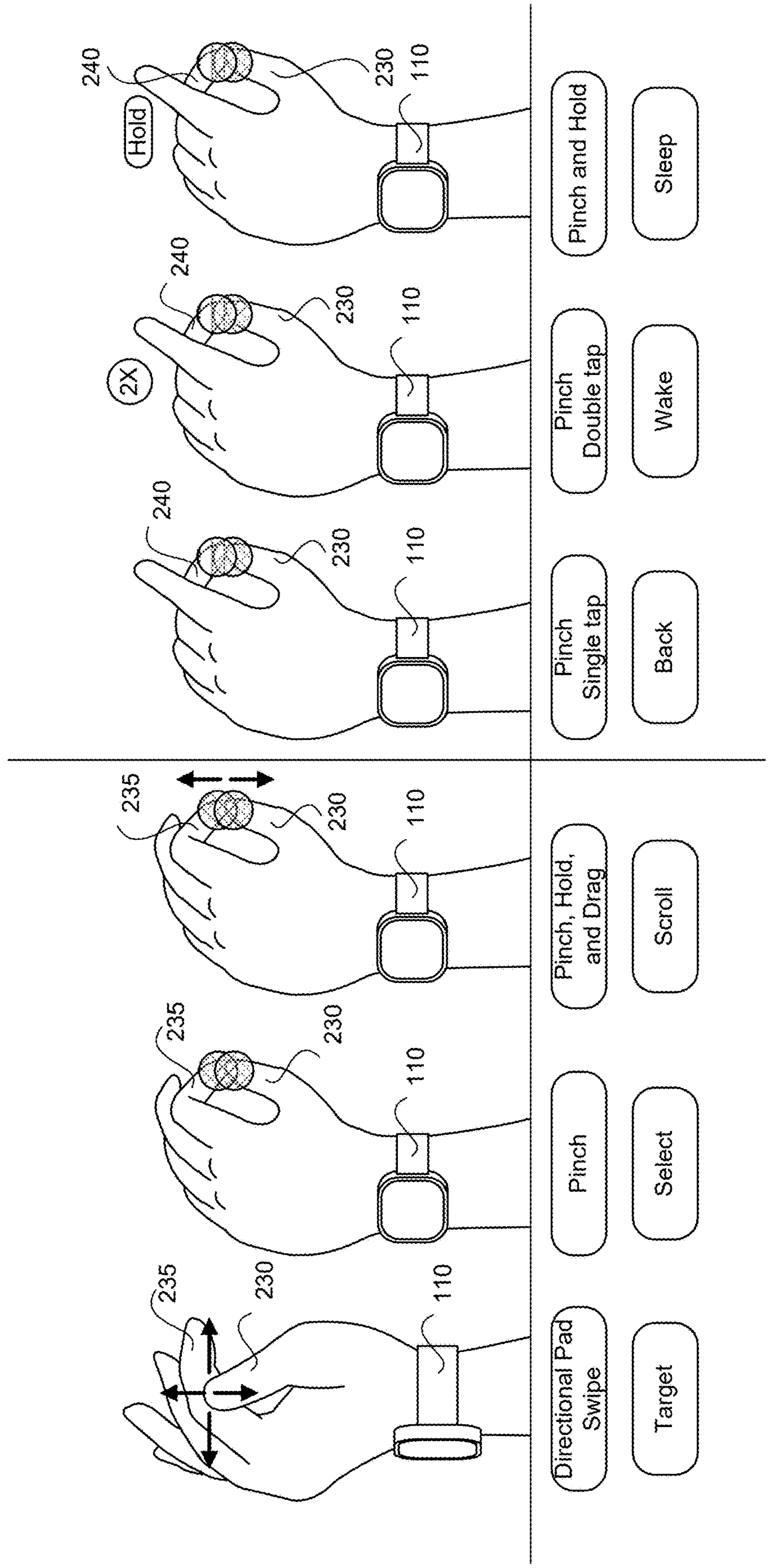

FIG. 2D shows example multi-modal gesture commands associated with the first set of gestures available at the wrist-wearable device 110 while communicatively coupled with the head-wearable device 120 and the application (e.g., the media streaming application) is ongoing. Furthermore, the input gestures illustrated in FIG. 2D are detected by one or more sensors 823A coupled with the wrist-wearable device 110 and each gesture is associated with a respective command. Specifically, FIG. 2D shows a first input gesture that is performed when the user swipes a portion of their thumb 230 on a portion of their index finger 235 enabling the index finger 235 to be used as a directional swipe pad, a second input gesture that is performed when the user performs a pinch with the portion of their index finger 235, a third input gesture that is performed when the user performs a pinch gesture, holds and moves (e.g., drags it on a table) their hand 210, a fourth input gesture that is performed when the user performs a pinch gesture using their thumb 230 and middle finger 240 and performs a single tap with their index finger 235 tapping near where the pinch gesture is being performed, a fifth input gesture that is performed when the user performs a pinch gesture using their thumb 230 and middle finger 240 and performs a double tap with their index finger 235 tapping near where the pinch gesture is being performed, and a sixth input gesture that is performed when the user performs a pinch gesture using their thumb 230 and middle finger 240 and holds the pinch gesture until the corresponding operation is complete.

Each gesture is associated with a respective command. For example, the first input gesture is associated with a command for targeting a UI element while the user is navigating the swiping gestures similar to a directional swipe pad (e.g., as shown in FIG. 1E), the second input gesture is associated with a command for selecting a UI element (e.g., as shown in FIG. 1G), the third input gesture is associated with a command for scrolling through UI elements, the fourth input gesture is associated with a command for going back in the UI, the fifth input gesture is associated with a command for waking the head-wearable device 120 or communicatively coupled device, and the sixth input gesture is associated with a command for sleeping the head-wearable device 120 or communicatively coupled device.

Figures 3A, 3B:
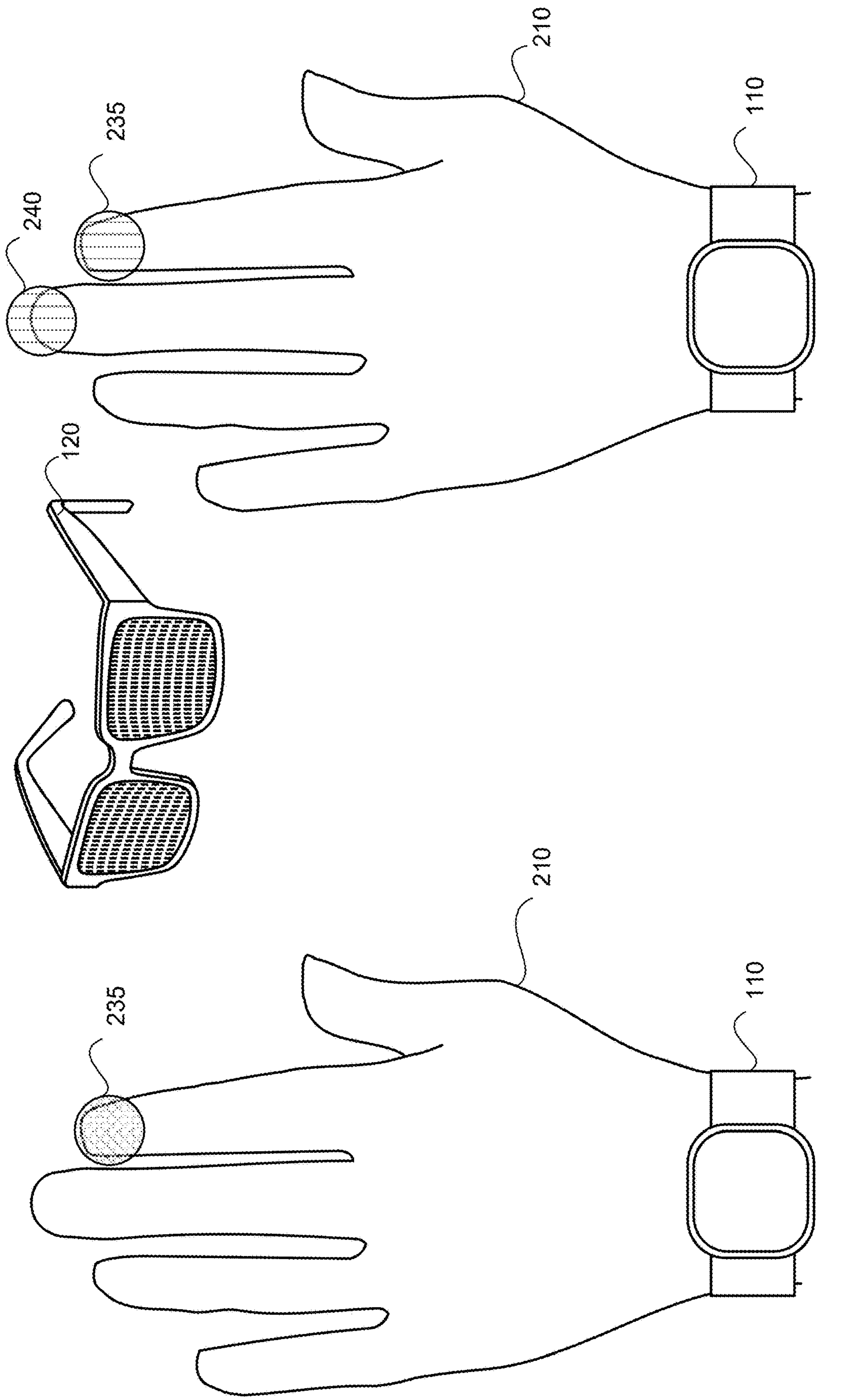
FIG. 3A-3C illustrates an example of one or more hand gestures performed at a head-wearable device, in accordance with some embodiments.
Figure 3C:
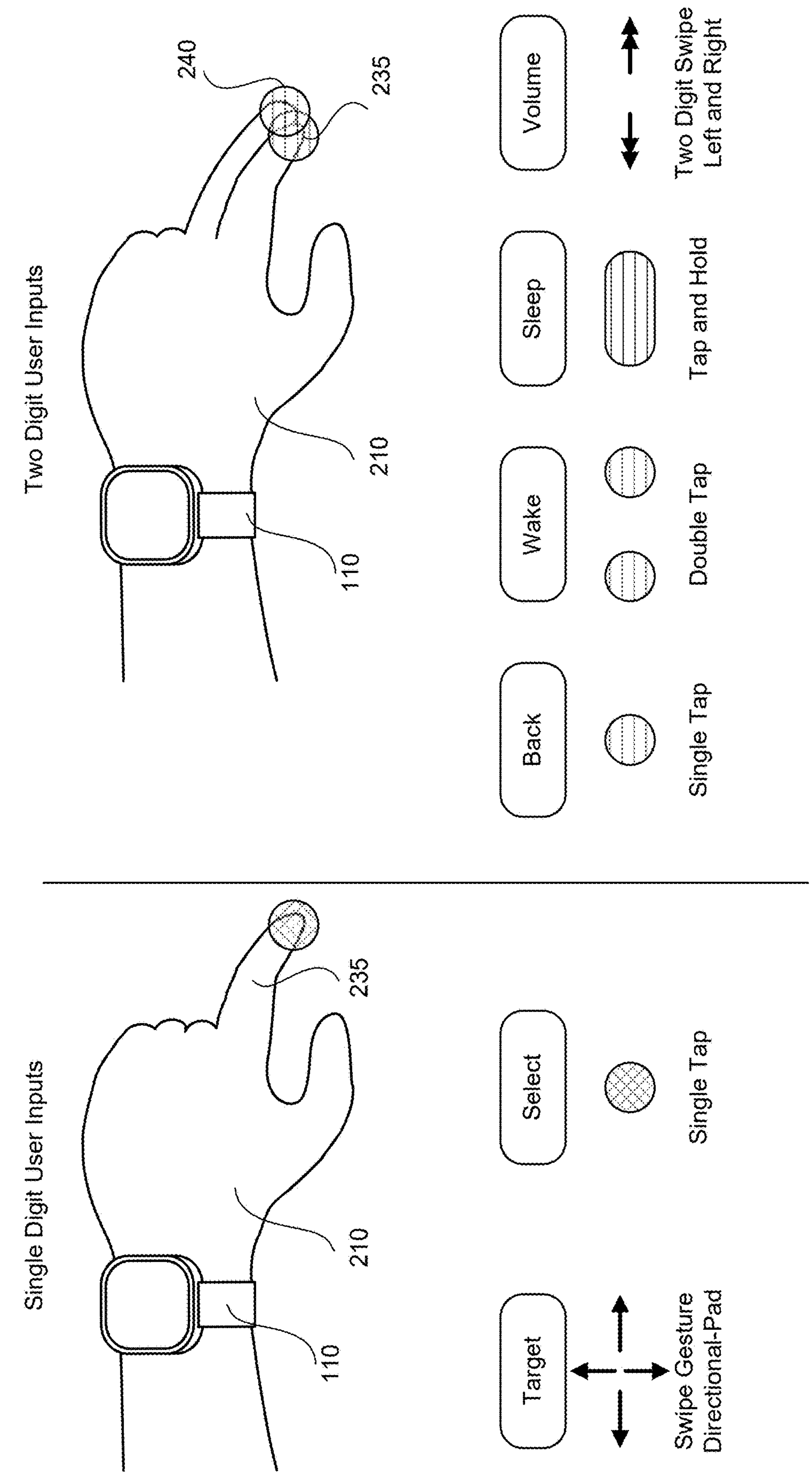

FIGS. 3A-3C illustrate example input gestures available at a head-wearable device 120 when multi-modal gestures are unavailable, in accordance with some embodiments. As described above in reference to FIGS. 1M-1T, multi-modal gestures are unavailable when the head-wearable device 120 is not communicatively coupled with another device configured to work in conjunction with head-wearable device 120 for enabling multi-modal gestures. Multi-modal gestures can become available and unavailable at different points in time and the communicatively coupled devices can transition between the different modes seamlessly. For example, when a device previously communicatively coupled with the head-wearable device 120 that enabled multi-modal gestures is disconnected due to a variety of reasons (e.g., losing battery as illustrated in FIGS. 1M-1T, moving out of range of the head-wearable device 120, etc.), the multi-modal gestures are disabled and the head-wearable device 120 detects inputs based on predefined input gestures. Specifically, while multi-modal gestures are unavailable, the head-wearable device 120, can detect respective user inputs, and cause the performance of one or more operations and/or commands at applications and/or processes running at the head-wearable device 120.

FIGS. 3A and 3B illustrate a third and fourth set of gestures, respectively, available at the head-wearable device 120 while multi-modal gestures are unavailable. The third and fourth sets of gestures available at head-wearable device 120 include one or more touch-input gestures (or surface-contact gestures) detected via one or more sensors 823A (e.g., capacitive sensors 828; FIG. 8C) of the head-wearable device 120. As described below in reference to FIG. 3C, touch-input gestures performed at the head-wearable device 120 can be associated with one or more respective commands and/or operations.

FIG. 3A illustrates a third set of gestures available at the head-wearable device 120. The one or more touch-input gestures available in the third set of gestures can be hand contact patterns (e.g., single tap, doublet tap, swiping, etc.) performed by a user 105 at a portion of the head-wearable device 120. For example, the user can use their second phalange (e.g., a portion of an index finger 235) to contact a portion of the head-wearable device 120 and cause the head-wearable device 120 to perform a command or operation (e.g., similar to the touch-input gestures described in FIG. 2B; however, as described below in reference to FIG. 3C, the commands/operations as a result of the third set of gestures differ from those described in FIG. 2B).

FIG. 3B illustrates a fourth set of gestures available at the head-wearable device 120. The one or more touch-input gestures available in the fourth set of gestures can be hand contact patterns (e.g., single tap, doublet tap, swiping, etc.) performed by a user 105 at a portion of the head-wearable device 120 using at least two phalanges (e.g., a portion of an index finger 235 of the hand 210 and a portion of a middle finger 240 of the hand 210). As described below in reference to FIG. 3C, touch-input gestures performed at the head-wearable device 120 can be associated with one or more respective commands and/or operations (e.g., system level operations).

FIG. 3C shows example commands associated with the third and fourth set of gestures available at the head-wearable device 120 while an application (e.g., a media streaming application) is ongoing. Examples of several of the commands illustrated in FIG. 3C are illustrated in FIGS. 1M-1T (e.g., swipe gesture directional-pad gesture in FIG. 1O, single tap select gesture in FIG. 1Q, etc.). Specifically, FIG. 3C shows a first input gesture that is performed when the user swipes a portion of their index finger 235 on a portion of the head-wearable device 120, a second input gesture that is performed when the user performs a single tap with the portion of their index finger 235 on the portion of the head-wearable device 120, a third input gesture that is performed when the user performs a single tap with a portion of their index finger 235 and a portion of their middle finger 240 on the portion of the head-wearable device 120, a fourth input gesture that is performed when the user performs a double tap with a portion of their index finger 235 and a portion of their middle finger 240 on the first portion **120*a* of the head-wearable device 120, fifth input gesture that is performed when the user performs a tap and hold with a portion of their index finger 235 and a portion of their middle finger 240 on the portion of the head-wearable device 120, and a sixth input gesture that is performed when the user performs a swipe with a portion of their index finger 235 and a portion of their middle finger 240 on the portion of the head-wearable device 120. Each gesture is associated with a respective command. For example, the first input gesture is associated with a command for targeting a UI element (e.g., shown in FIG. 1O), the second input gesture is associated with a command selecting a targeted UI element (e.g., FIG. 1Q), the third input gesture is associated with a command for going back in the UI, the fourth input gesture is associated with a command for waking up the head-wearable device 120, the fifth input gesture is associated with a command for putting the head-wearable device 120** to sleep, and the sixth input gesture is associated with a command for initiating a virtual assistant (or initiating an audio input modality).

While the examples provided above in reference to FIGS. 1A-3C describe audio control commands at a music streaming application, the one or more input gestures can be associated with different commands and/or operations depending on an application running on the head-wearable device, wrist-wearable device, and/or other communicatively coupled device.

Figure 4:
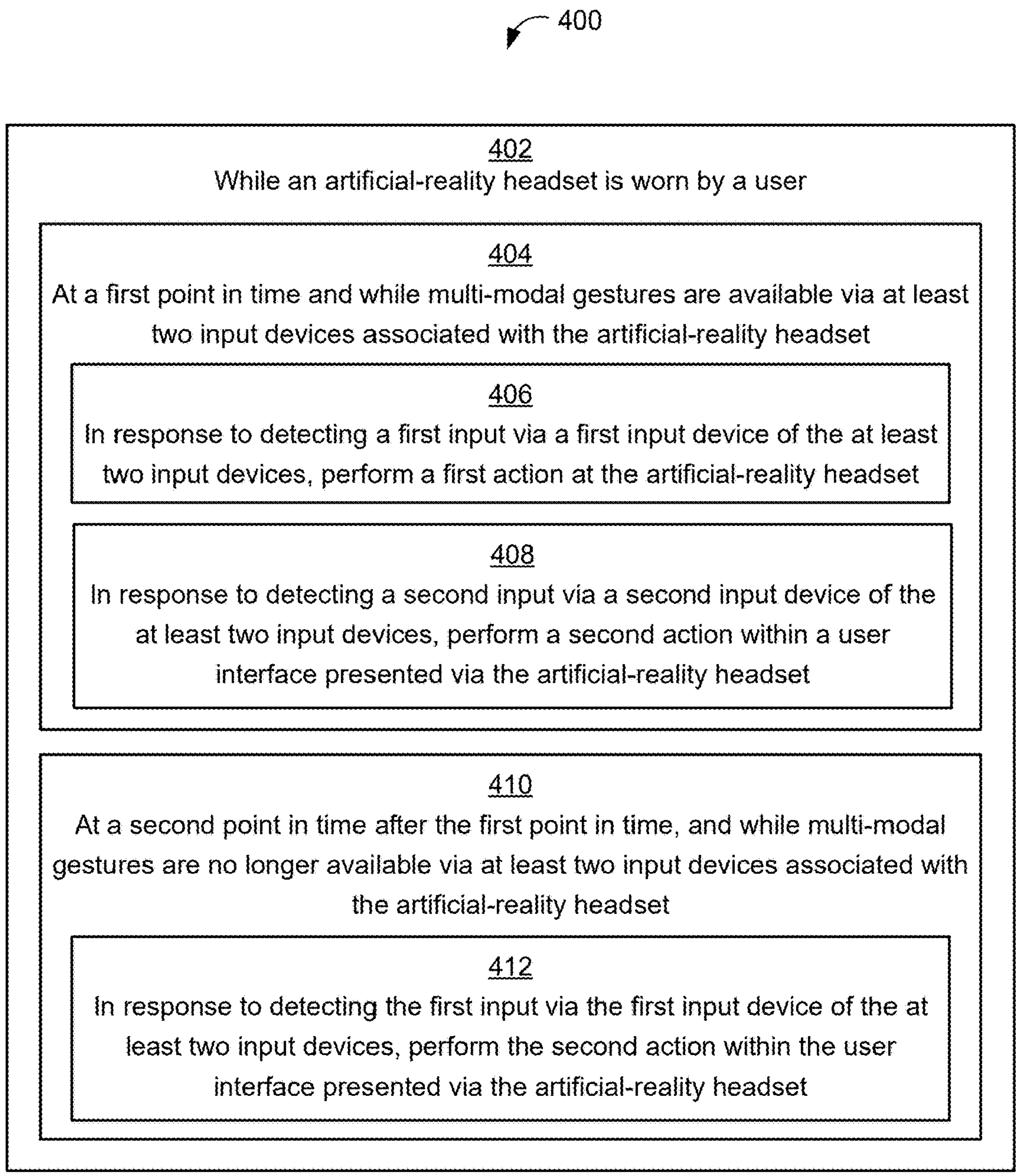
FIG. 4 shows an example method flow chart for controlling a UI using one or more actions, in accordance with some embodiments.
Figure 5A:
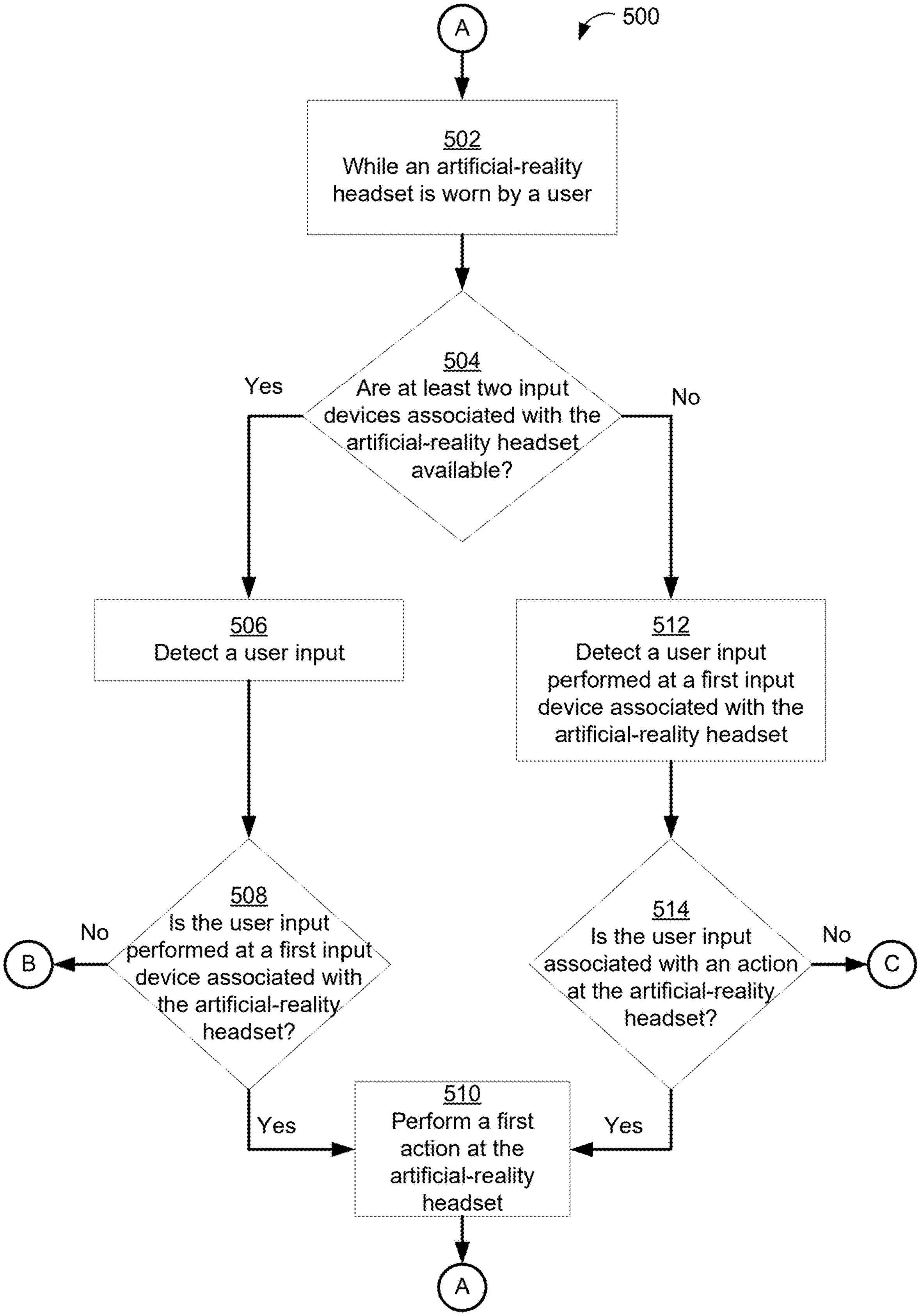
FIG. 5A-5B illustrates a flow diagram for controlling a UI using one or more actions, in accordance with some embodiments.
Figure 5B:
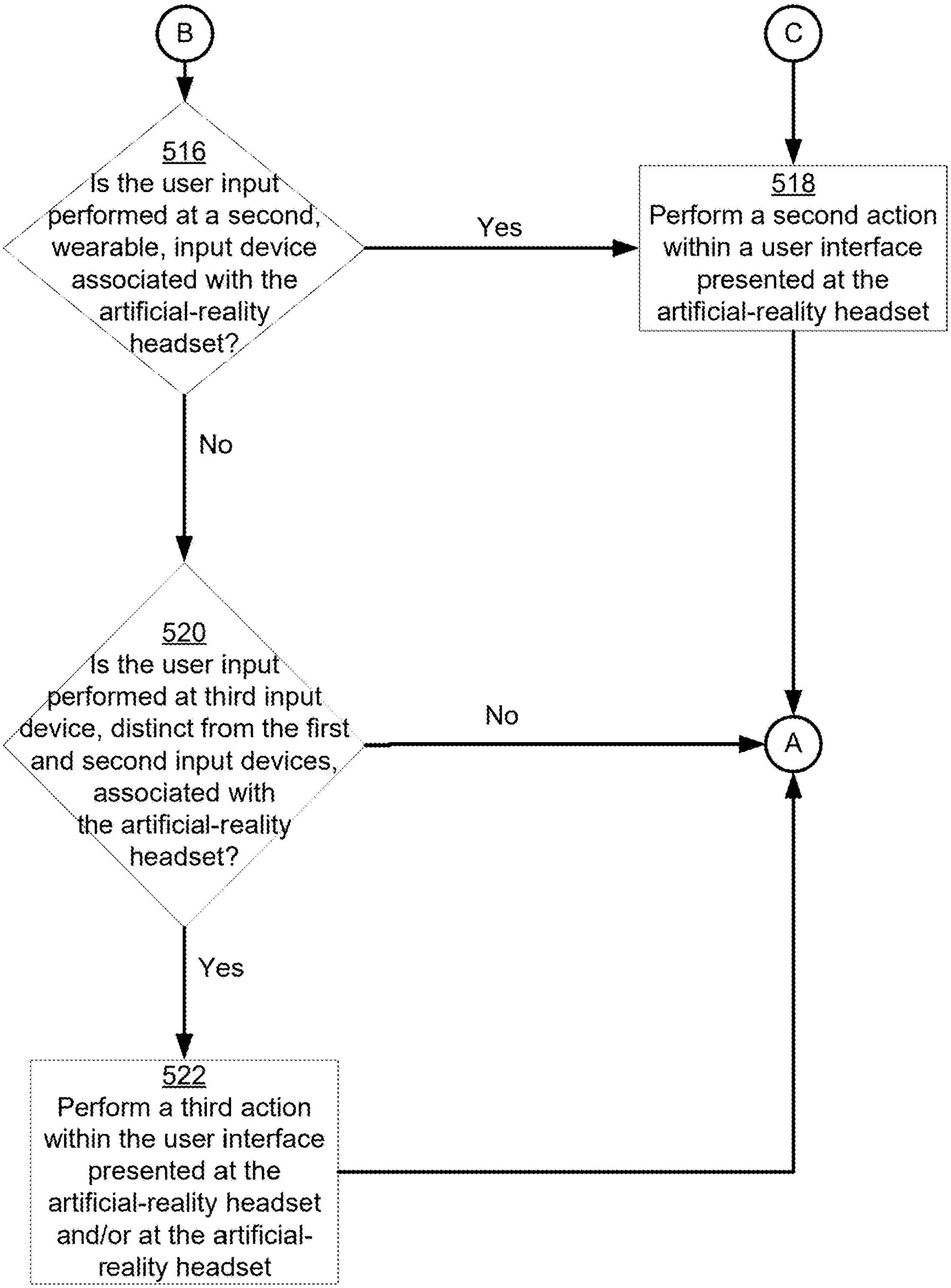

FIGS. 4-5B illustrate a flow chart and a flow diagram of a method of performing one or more commands at a head-wearable device commutatively coupled with at least one other device using one or more input gestures, in accordance with some embodiments. Operations (e.g., steps) of the methods 400 and 500 can be performed by one or more processors (e.g., central processing unit and/or MCU) of a system including one or more communicatively coupled devices such as a head-wearable device 120 and wrist-wearable device 110. At least some of the operations shown in FIGS. 4-5B correspond to instructions stored in a computer memory or computer-readable storage medium (e.g., storage, RAM, and/or memory) of a head-wearable device 120 and/or wrist-wearable device 110. Operations of the methods 400 and 500 can be performed by a single device alone or in conjunction with one or more processors and/or hardware components of another communicatively coupled device (e.g., head-wearable device 120, wrist-wearable device 110, etc.) and/or instructions stored in memory or computer-readable medium of the other device communicatively coupled to the system. In some embodiments, the various operations of the methods described herein are interchangeable and/or optional, and respective operations of the methods are performed by any of the aforementioned devices, systems, or combination of devices and/or systems. For convenience, the method operations will be described below as being performed by particular component or device, but should not be construed as limiting the performance of the operation to the particular device in all embodiments.

(A1) FIG. 4 shows a flow chart of a first method 400 of performing one or more commands at an artificial-reality headset (e.g., an instance of a head-wearable device described below in reference to FIGS. 8A-8C) commutatively coupled with at least one other device (e.g., a wrist-wearable device described below in reference to FIGS. 7A and 7B) using one or more input gestures, in accordance with some embodiments. The method 400 is performed at a head-wearable device 120 and/or a wrist-wearable device 110 worn by a user. Each of the head-wearable device 120 and the wrist-wearable device include one or more input modalities (e.g., a touch-input surface, EMG sensors 765; FIG. 7B, etc.). In some embodiments, the method 400 is further performed while an artificial-reality headset worn by a user (402).

The method 400 includes, at a first point in time while multi-modal gestures are available via at least two input devices associated with the artificial-reality headset (404), i) in (406) response to detecting a first input via a first input device (e.g., a touch-input surface including one or more capacitive sensors 828; FIG. 8C) of the at least two input devices (e.g., a head-wearable device 120, wrist-wearable device 110, etc.), performing a first action (e.g., an audio control action) at the artificial-reality headset; and ii) in (408) response to detecting a second input via a second input device (e.g., one or more EMG sensors 765; FIG. 7B) of the at least two input devices, performing a second action (e.g., user-interface control action such as the selection action illustrated in FIGS. 1E-1F) within a user interface presented via the artificial-reality headset. One or more example scenarios showing multi-modal gestures available are provided above in FIGS. 1A-1L. For example, FIG. 1A shows the user 105 performing a swipe input gesture at the head-wearable device 120 causing the head-wearable device to perform an audio control action (e.g., changing the volume). Additionally, FIGS. 1E-IF show the user 105 performing a pinch gesture detected by EMG sensors 765 coupled with the wrist-wearable device 110, which cause a selection command at the user interface.

The method also includes, at a second point in time after the first point in time while multi-modal gestures are no longer available via the at least two input devices associated with the artificial-reality headset (410), in response to detecting the first input via the first input device of the at least two input devices, performing (412) the second action within the user interface presented via the artificial-reality headset. For example, in FIGS. 10 and 1P, while multi-modal gestures are unavailable, when the user performs the same input gesture performed in FIG. 1A (while multi-modal gestures were available), the same input gesture, when performed by the user 105 at the head-wearable device causes a selection command at the user interface. In other words, the same input gestures can perform different commands and/or operations when multi-modal gestures are available or unavailable.

(A2) In some embodiments of A1, the first action includes a media control command (e.g., volume adjustment, play/pause commands, skipping the current track, going to the previous track, and/or initiating a virtual assistant). For example, as shown and described in FIG. 1A, the user 105 performs a first action (e.g., a first input gesture) at the head-wearable device 120 which causing the volume of the currently playing media to adjust (e.g., FIG. 1A illustrates the volume lowering).

(A3) In some embodiments of A1-A2, the first input device is a touch-input surface and the first input is a surface contact gesture at a portion of the artificial reality-headset. In some embodiments, the portion of the artificial reality-headset that the surface contact gesture is performed at includes a touch-input surface that detects user inputs using a capacitive sensor 828 and/or a proximity sensor 869. For example, as illustrated in FIG. 1A, the surface contact gesture is a swiping gesture performed at the touch-input surface (e.g., at the first input) of the head-wearable device 120 (e.g., the artificial reality-headset).

(A3.5) In some embodiments of A1-A2, the first input device is a capacitive sensor and the first input is a surface contact gesture at a portion of the artificial reality-headset. In some embodiments, the portion of the artificial reality-headset that the surface contact gesture is performed at includes a touch-input surface with a capacitive sensor 828. For example, as illustrated in FIG. 1A, the surface contact gesture is a swiping gesture performed at the touch-input surface (e.g., at the first input) of the head-wearable device 120 (e.g., the artificial reality-headset).

(A4) In some embodiments of A1-3, the first input is one input of a first input tier set including a first input tier and a second input tier. The first input tier of the first input tier set includes one or more inputs associated with navigation control commands and the second tier of the first input tier set includes one or more inputs associated with system control commands for the artificial-reality headset. For example, as described above in reference to FIG. 3C, the head-wearable device can detect single phalange inputs and double phalange inputs, the single phalange inputs and double phalange inputs associated with one or more respective commands or operations. In some embodiments, the one or more inputs associated with the first input tier include target selection using directional-pad swipe gestures and a select operation using a single tap gesture. For example, the directional-pad swipe gesture is illustrated in FIG. 1O where the user is navigating the UI at the head-wearable device 120 using swiping motions performed at a first portion of the head-wearable device 120. In FIG. 1Q, the user performs a select operation using a single tap gesture while the user 105 is selecting an audio control on the UI at the head-wearable device 120. In some embodiments, the one or more inputs associated with the second input tier include (i) navigating back in the UI using a single tap, (ii) performing a wake command using a double tap, (iii) performing a sleep operation by performing a tap and hold, and (iv) adjusting the volume of currently playing media by performing a two digit swipe left and right.

(A5) In some embodiments of A4, the first input tier of the first input tier set is associated with inputs performed with a single phalange of the user's hand (e.g., a portion of an index finger) and the second input tier of the first input tier set is associated with inputs performed with at least two phalanges (e.g., a portion of an index finger and a portion of a middle finger) of the user's hand. For example, one or more input gestures performed with a single phalange and one or more input gestures performed with at least two phalanges are described above in reference to FIG. 3C.

(A6) In some embodiments of A4-5, the first input tier set includes a third input tier, the third input tier of the first input tier set including one or more inputs associated with media control commands. For example, as described above in reference to FIG. 3C, the user can use at least two phalanges to perform a swipe gesture that cause the head-wearable device to adjust a volume.

(A7) In some embodiments of A6, the third input tier of the first input tier set is associated with swipe gestures performed with at least two digits of the user's hand. For example, FIG. 3C illustrates a two-digit swipe gesture that causes the volume of the currently playing media to increase or decrease.

(A8) In some embodiments of A1-7, the second action includes navigation control commands and/or a system control command for the artificial-reality headset. In some embodiments, navigation control commands are performed using input gestures sensed at the wrist-wearable device 110 including directional-pad navigation (e.g., moving left, right, down, up, and diagonal) as illustrated in FIG. 1E. In some embodiments, the system control commands are performed using input gestures also sensed at the wrist-wearable device 110 including a pinch gesture to confirm the selectin of a UI element as illustrated in FIG. 1G. Additional command gestures include causing the device to sleep, wake up, and adjust the volume of current media playing. FIG. 2D illustrates a plurality of input gestures that include navigation control commands and system control commands.

(A9) In some embodiments of A1-8, the second input device is a biopotential-signal-sensing device and the second input is an in-air hand gesture performed or intended to be performed by a user. For example, as illustrated in FIG. 1G, the second input device is a wrist-wearable device 110 and the in-air hand gesture performed is a pinch gesture which confirms the selection of a UI element. FIG. 2D illustrates additional in-air hand gestures such as the pinch, hold, and drag gesture, the pinch and single tap gesture, the pinch and double tap gesture, and the pinch and hold gesture that can be performed by the user 105 and be sensed by the wrist-wearable device 110.

(A10) In some embodiments of A1-9, the second input is one input of a second input tier set including a first input tier and a second input tier. In some embodiments, the second input tier set includes gestures sensed using biopotential sensors at the wrist-wearable device 110. The first input tier of the second input tier set includes one or more inputs associated with navigation control commands. In some embodiments, navigation control commands associated with the first input tier include directional pad navigation and object selection. For example, FIG. 1E illustrates the user 105 performing a directional pad swipe gesture to navigate a music application user interface 142. The second input tier of the second input tier set includes one or more inputs associated with system control commands for the artificial-reality headset. In some embodiments, system control commands associated with the second input tier include waking the head-wearable device 120, putting the head-wearable device 120 to sleep, or navigating backward in the user interface at the head-wearable device 120.

(A11) In some embodiments of A10, the first input tier of the second input tier set is associated with hand gestures performed using the user's first phalange (e.g., a portion of the user's thumb) and second phalange (e.g., a portion of the user's index finger) and the second input tier of the second input tier set is associated with hand gestures performed using the user's first phalange (e.g., a portion of the user's thumb) and third phalange (e.g., a portion of the middle finger). In some embodiments, the first input tier gestures performed using the user's first and second phalanges are directional pad gestures (to target); pinch gestures (to select); pinch, hold, and drag gestures (to scroll); snap gestures; single taps, double taps; etc. In some embodiments, the second input tier gestures performed using the user's first and third phalanges are pinch and single tap (to perform a system or device back operation); pinch and double tap (to wake a system or device); pinch and hold (to put a system or device to sleep); etc. FIG. 2D illustrates examples of one or more input gestures in the second input tier set performed with the first, second and third phalanges on the user's hand.

(A12) In some embodiments of A10-11, the second input tier set includes a third input tier, the third input tier of the second input tier set including one or more inputs associated with media control commands. In some embodiments, the third input tier includes a hand gesture sensed by the wrist-wearable device 110 that causes volume adjustment at the head-wearable device 120.

(A13) In some embodiments of A12, the third input tier of the second input tier set is associated with hand gestures performed using the user's first phalange (e.g., portion of the user's thumb) and fourth phalange (e.g., portion of the user's ring finger). In some embodiments, one or more of the following input gestures are performed using the user's first and fourth phalange: directional-pad gestures, pinch gestures, pinch and hold gestures, snap gestures, single taps, double taps, etc. The commands and/or operations associated with the third input tier of the second input tier set are distinct from the first and second input tiers.

(A14) In some embodiments of A1-13, while the user is performing or intends to perform the first input (e.g., a first hand gesture or an input gesture at a touch-input surface), causing the second input device to cease detecting one or more inputs. For example, in some embodiments, while the user 105 is performing a first input at the head-wearable device 120 the one or more biopotential sensors coupled to the wrist-wearable device (e.g., EMG and/or IMU sensors) are disabled. This prevents the detection of false positives between the two devices.

(A15) In some embodiments of A15, while the user is performing or intends to perform the second input, causing the first input device (e.g., a touch-input surface at a head-wearable device) to cease detecting one or more inputs (e.g., one or more input gestures performed by the user 105). In some embodiments, the second input is an in-air hand gesture sensed by one or more biopotential sensors coupled with the wrist-wearable device 110. For example, in some embodiments, while the user 105 is performing a first input at the wrist-wearable device 110 the sensors (e.g., touch-input surface, cameras sensing one or more input gestures, etc.) coupled to the head-wearable device 120 are disabled.

(A16) In some embodiments of A1-15, a determination that the multi-modal gestures are no longer available via the at least two input devices associated with the artificial-reality headset is made when the second input device (e.g., biopotential sensors coupled with the wrist-wearable device 110) of the at least two input devices is no longer communicatively coupled or detectable by the artificial-reality headset. In other words, when the wrist-wearable device 110 or other sensing device is no longer present/coupled to the head-wearable device 120, multi-modal gestures are no longer available. As described above while the multi-modal gestures are no longer available, a distinct set of input gestures are now available that allow a user to provide one or more distinct inputs using a single input device (e.g., the touch-input sensor at a head-wearable device 120). For example, a touch-input sensor (e.g., a capacitive sensor or proximity sensor) at a head-wearable device 120 is able to distinguish between single phalange hand gestures, two-phalange hand gestures, etc. FIG. 3A-3C illustrates one or more input gestures available when multi-modal gestures are no longer available. FIGS. 1M-1T also illustrate one or more input gestures performed at the head-wearable device 120 when multi-modal gestures are no longer available.

(A17) In some embodiments of A1-16, at the second point in time, the first input device is configured to detect one or more inputs of a first input tier set. In some embodiments, after the wrist-wearable device 110 is no longer communicatively coupled with the head-wearable device 120, the head-wearable device 120 is configured to detect distinct input tiers.

For example, the head-wearable device 120 is configured to classify input gestures performed by the user as being part of a particular input tier, such as a first input tier that correspond to input gestures performed using a single-phalange hand gesture and a second input tier that correspond to hand gestures performed using two-phalange hand gesture. FIGS. 2C and 3C illustrates different input gestures available at the head-wearable device.

(A18) In some embodiments of A17, the first input tier set includes the first input tier including one or more inputs associated with navigation control commands. For example, as illustrated in FIG. 1O, the user 105 performs a directional-pad swipe gesture (e.g., from the first input tier) causing the UI to navigate to an audio control 140 element (e.g., audio control elements 140*a*-140*g*). The first input tier set further includes a second input tier including one or more inputs associated with system control commands for the artificial-reality headset and a third input tier including one or more inputs associated with media control commands. FIG. 3C illustrates one or more input gestures associated with the system control commands (e.g., navigating back in the UI via a single tap input gesture, waking the head-wearable device 120 via a double tap input gesture, and putting the head-wearable device 120 to sleep via a tap and hold input gesture) and media control commands (e.g., the two-digit swipe gesture controlling the volume).

(A19) In some embodiments of A1-18, the first input device is a touch-input surface coupled with the artificial-reality headset and the second input device is a biopotential-signal-sensing device communicatively coupled with the artificial-reality headset. In some embodiments, the touch-input surface includes a capacitive sensor and/or a proximity sensor that detects one or more input gestures performed by the user 105. For example, FIG. 8C describes one or more capacitive sensors 828 coupled to the head-wearable device 120. For example, FIG. 7B describes several biopotential-signal-sensing sensors (e.g., EMG sensors 765) coupled to the wrist-wearable device 110.

(A20) In some embodiments of A1-18, the first input device is a touch-input sensor coupled with the artificial-reality headset and the second input device is an imaging device communicatively coupled with the artificial-reality headset. In some embodiments, the touch-input surface includes a capacitive sensor and/or a proximity sensor that detects one or more input gestures performed by the user 105. As described in FIG. 8C, capacitive sensors 828 and one or more imaging sensors 826 are coupled to the peripherals interface 822A at the head-wearable device 120. In some embodiments, the user 105 performs an in-air gesture hand gesture detected by one or more imaging sensors communicatively coupled with the head-wearable device 120 (e.g., a webcam, selfie camera, imaging device of the head-wearable device) causing one or more operations (e.g., volume control, UI element selection, etc.) to be performed at the head-wearable device 120. In some embodiments, the first input device and the second input device detect distinct input gestures simultaneously.

(A21) In some embodiments of A1-18, the first input device is a touch-input sensor (e.g., capacitive sensor 828) coupled with the artificial-reality headset and the second input device is an inertial measurement unit communicatively coupled with the artificial-reality headset (e.g., IMU sensor 829).

(A22) In some embodiments of A1-18, the first input device is an imaging device (e.g., imaging sensor 826, cameras 838A, etc.) communicatively coupled with the artificial-reality headset and the second input device is a biopotential-signal-sensing device (e.g., EMG sensor 827, EMG sensor 735 and/or 765 coupled with the wrist-wearable device, etc.) communicatively coupled with the artificial-reality headset.

(A23) In some embodiments of A1-18, the first input device is an imaging device (e.g., imaging sensor 826, cameras 838A, etc.) communicatively coupled with the artificial-reality headset and the second input device is an inertial measurement unit (e.g., IMU sensor 829) communicatively coupled with the artificial-reality headset.

(A24) In some embodiments of A1-23, performing the first action (e.g., an audio-control action) at the artificial-reality headset includes causing the artificial-reality headset to display a notifications hub including one or more user interface elements associate with the first action. For example, FIG. 1A illustrates the user 105 performing an input gesture at the head-wearable device causing volume manipulation and FIG. 1B illustrates the second visual cue 134 (e.g., a notification hub) that proactively shows the user 105 they are changing the volume as a result of their input gesture. In some embodiments, the wrist-wearable device 110 displays a notifications hub including one or more user interface elements associated with one or more input gestures performed by the user 105. Furthermore, the one or more input gestures performed by the user cause the head-wearable and wrist-wearable device to display distinct hubs when an additional input gesture is detected (e.g., at either the head-wearable device 120 or wrist-wearable device 110).

(A25) In some embodiments of A24, the notifications hub is an audio control hub and the first action is a media control command. For example, as illustrated in FIG. 1B, the second visual cue 134 illustrates the result of the user 105 altering an audio control characteristic and that the input gesture performed by the user in FIG. 1A (e.g., first action) is configured to control a media characteristic (e.g., changing the volume).

(A26) In some embodiments of A25, the audio control hub is presented in place of a system information hub. In some embodiments, the user 105 one or more system information notifications such as battery life, signal strength and notifications are displayed along with the audio control data.

(A27) In some embodiments of A1-26, the performing the first action (e.g., an audio-control action; the swipe gesture in FIG. 1A) at the artificial-reality headset includes causing the artificial-reality headset (or the wrist-wearable device) to present an audio notification based on the first action. In some embodiments, the user 105 performing the swipe gesture at the head-wearable deice 120 to change the volume causes the system to notify the user 105 by a virtual assistant or one or more sound effects of the volume level. For example, the one or more sound effects could include a distinct sound when the user 105 is at the lowest volume level and a different distinct sound when the user 105 is at the highest volume level. In some embodiments, audio cues are available when the displays are off and/or disabled. For example, if the displays are inactive the user 105 is able to get feedback on the volume level via audio cues without relying solely on visual cues.

(A28) In some embodiments of A1-27, wherein causing the artificial-reality headset to perform an artificial-reality headset specific command includes initiating a virtual assistant, and the method further comprises initiating a microphone of the artificial-reality headset and/or the second input device (e.g., wrist-wearable device 110), obtaining an audio data via the microphone, and in response to detecting of one or more user input commands from the audio data, causing the second input device and/or the artificial-reality headset to perform the one or more user input commands. In some embodiments, a user 105 performs an input gesture to activate a virtual assistant to enable voice commands to cause the artificial-reality headset to perform one or more operations. All operations performed in FIGS. 1A-1T are available via voice command.

(B1) In accordance with some embodiments, a system that includes one or more of a wrist wearable device, a head-wearable device, and/or a handheld intermediary processing device, and the system is configured to perform operations corresponding to any of A1-A28.

(C1) In accordance with some embodiments, a non-transitory computer readable storage medium including instructions that, when executed by a computing device in communication with a wrist wearable device, a head-wearable device, and/or a handheld intermediary processing device, cause the computer device to perform operations corresponding to any of A1-A28.

(D1) In accordance with some embodiments, a means on a wrist-wearable device, a head-wearable device, and/or a handheld intermediary processing device for performing or causing performance of the method of any of A1-A28.

FIG. 5A-5B illustrates a flow diagram of a second method 500 of performing one or more commands at an artificial-reality headset (e.g., an instance of a head-wearable device described below in reference to FIGS. 8A-8C) commutatively coupled with at least one other device (e.g., a wrist-wearable device described below in reference to FIGS. 7A and 7B) using one or more input gestures, in accordance with some embodiments. The method 500 includes, while (502) a user wears the artificial-reality headset (e.g., the head-wearable device 120), determine if (504) at least two input devices associated with the artificial-reality headset are available. The method 500 includes, in accordance with a determination that at least two input devices associated with the artificial-reality headset are available ("yes" at operation 504), detecting (506) a user input. For example, as illustrated in FIGS. 1A-1L, a head-wearable device 120 and wrist-wearable device 110 are at least two input devices communicatively coupled and available to detect input gestures performed by a user 105.

The second method 500 further includes determining (508) if the user input performed at a first input device is associated with the artificial-reality headset. The second method 500 includes, in accordance with a determination that the user input is performed at a first input device associated with the artificial-reality headset ("yes" at operation 508), perform (510) a first action at the artificial-reality headset and return to operation 502. For example, as shown in FIG. 1A, the user 105 performs a swipe gesture (e.g., the user input) at the touch-input surface (e.g., first input device) at the head-wearable device causing the volume of the currently playing media to lower.

Alternatively, the second method 500 includes, in accordance with a determination that the user input is not performed at a first input device associated with the artificial-reality headset ("no" at operation 508), determining (516) whether the user input was performed at a second, wearable, input device associated with the artificial-reality headset. For example, biopotential sensors (e.g., EMG sensors 765; FIG. 7B) are a second input device associated with the artificial-reality headset, as illustrated in FIGS. 1A-1L. The second method 500 includes, in accordance with a determination that the user input was performed at a second, wearable, input device associated with the artificial-reality headset ("yes" at operation 516), performing (518) a second action within a user interface presented at the artificial-reality headset and return to operation 502. For example, FIG. 1I-1J illustrate the user performing a pinch, hold, and drag input gesture detected by one or more EMG sensors 765 at the wrist-wearable device 110 causing a scrolling action (e.g., an example of a second action) at the UI of the head-wearable device 120 allowing the user 105 to scroll through a plurality of songs.

Returning to operation (516), the second method 500 includes, in accordance with a determination that the user input was not performed at a second, wearable, input device associated with the artificial-reality headset ("no" at operation 516), determining (520) whether the user input was performed at a third input device, distinct from the first and second input devices, associated with the artificial-reality headset. The second method 500 includes, in accordance with a determination that the user input was performed at a third input device, distinct from the first and second input devices, associated with the artificial-reality headset ("yes" at operation 520), performing (522) a third action within the user interface presented at the artificial-reality headset and/or at the artificial-reality headset and return to operation 502. In some embodiments, a third device (e.g., such as a smart phone or other communicatively coupled device) detects a user input such as pressing a button at the device causing an action such as volume adjustment at the head-wearable device 120. Alternatively, the second method 500 further includes, in accordance with a determination that the user input was not performed at a third input device, distinct from the first and second input devices, associated with the artificial-reality headset ("no" at operation 520), returning to operation 502.

Returning to operation (504), the second method 500 includes, in accordance with a determination that at least two input devices are not associated with the artificial-reality headset ("no" at operation 504), then the second method 500 further includes detecting (512) a user input is performed at a first input device associated with the artificial-reality headset. For example, FIGS. 1M-1T illustrate when multi-modal gestures are unavailable and the input device at the head-wearable device 120 is available.

The second method 500 further includes determining (514) whether the user input is associated with an action at the artificial-reality headset. The second method 500 includes, in accordance with a determination that the user input is associated with an action at the artificial-reality headset ("yes" at operation 514), performing (510) a first action at the artificial-reality headset and returning to operation 502. FIG. 1O illustrates the user 105 performing swipe input gestures at the touch-input surface at the head-wearable device 120 that cause navigation gestures (e.g., the first action) moving the point of focus in the UI from the play 140*d* button to the skip forward 140*g* button.

Alternatively, the second method 500 includes, in accordance with a determination that the user input is not associated with an action at the artificial-reality headset ("no" at operation 514), performing (518) a second action within a user interface presented at the artificial-reality headset and returning to operation 502. For example, FIG. 1Q shows the user performing a single tap input gesture at the touch-input surface at the head-wearable device 120 causing a select operation in the UI presented at the head-wearable device 120.

The devices described above are further detailed below, including systems, wrist-wearable devices, headset devices, and smart textile-based garments. Specific operations described above may occur as a result of specific hardware, such hardware is described in further detail below. The devices described below are not limiting and features on these devices can be removed or additional features can be added to these devices. The different devices can include one or more analogous hardware components. For brevity, analogous devices and components are described below. Any differences in the devices and components are described below in their respective sections.

As described herein, a processor (e.g., a central processing unit (CPU) or microcontroller unit (MCU)), is an electronic component that is responsible for executing instructions and controlling the operation of an electronic device (e.g., a wrist-wearable device 700, a head-wearable device, an HIPD 900, a smart textile-based garment, or other computer system). There are various types of processors that may be used interchangeably or specifically required by embodiments described herein. For example, a processor may be (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing and/or customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include (i) microcontrollers, including small, low-power controllers that are commonly used in embedded systems and Internet of Things (IoT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs. As described herein, a graphics module is a component or software module that is designed to handle graphical operations and/or processes, and can include a hardware module and/or a software module.

As described herein, memory refers to electronic components in a computer or electronic device that store data and instructions for the processor to access and manipulate. The devices described herein can include volatile and non-volatile memory. Examples of memory can include (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware and/or boot loaders); (iii) flash memory, magnetic disk storage devices, optical disk storage devices, other non-volatile solid state storage devices, which can be configured to store data in electronic devices (e.g., universal serial bus (USB) drives, memory cards, and/or solid-state drives (SSDs)); and (iv) cache memory configured to temporarily store frequently accessed data and instructions. Memory, as described herein, can include structured data (e.g., SQL databases, MongoDB databases, GraphQL data, or JSON data). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, a power system of an electronic device is configured to convert incoming electrical power into a form that can be used to operate the device. A power system can include various components, including (i) a power source, which can be an alternating current (AC) adapter or a direct current (DC) adapter power supply; (ii) a charger input that can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include (i) USB and/or micro-USB interfaces configured for connecting devices to an electronic device; (ii) Bluetooth interfaces configured to allow devices to communicate with each other, including Bluetooth low energy (BLE); (iii) near-field communication (NFC) interfaces configured to be short-range wireless interfaces for operations such as access control; (iv) POGO pins, which may be small, spring-loaded pins configured to provide a charging interface; (v) wireless charging interfaces; (vi) global-position system (GPS) interfaces; (vii) Wi-Fi interfaces for providing a connection between a device and a wireless network; and (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface) and/or the proximity of other devices or objects; and (vii) light sensors (e.g., ToF sensors, infrared light sensors, or visible light sensors), and/or sensors for sensing data from the user or the user's environment. As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiogramar EKG) sensors configured to measure electrical activity of the heart to diagnose heart problems; (iii) electromyography (EMG) sensors configured to measure the electrical activity of muscles and diagnose neuromuscular disorders; (iv) electrooculography (EOG) sensors configured to measure the electrical activity of eye muscles to detect eye movement and diagnose eye disorders.

As described herein, an application stored in memory of an electronic device (e.g., software) includes instructions stored in the memory. Examples of such applications include (i) games; (ii) word processors; (iii) messaging applications; (iv) media-streaming applications; (v) financial applications; (vi) calendars; (vii) clocks; (viii) web browsers; (ix) social media applications, (x) camera applications, (xi) web-based applications; (xii) health applications; (xiii) artificial-reality (AR) applications, and/or any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, or Bluetooth). In some embodiments, a communication interface can refer to a software layer that enables different software programs to communicate with each other (e.g., application programming interfaces (APIs) and protocols such as HTTP and TCP/IP).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example AR Systems 6A-6C-2

Figure 6A:
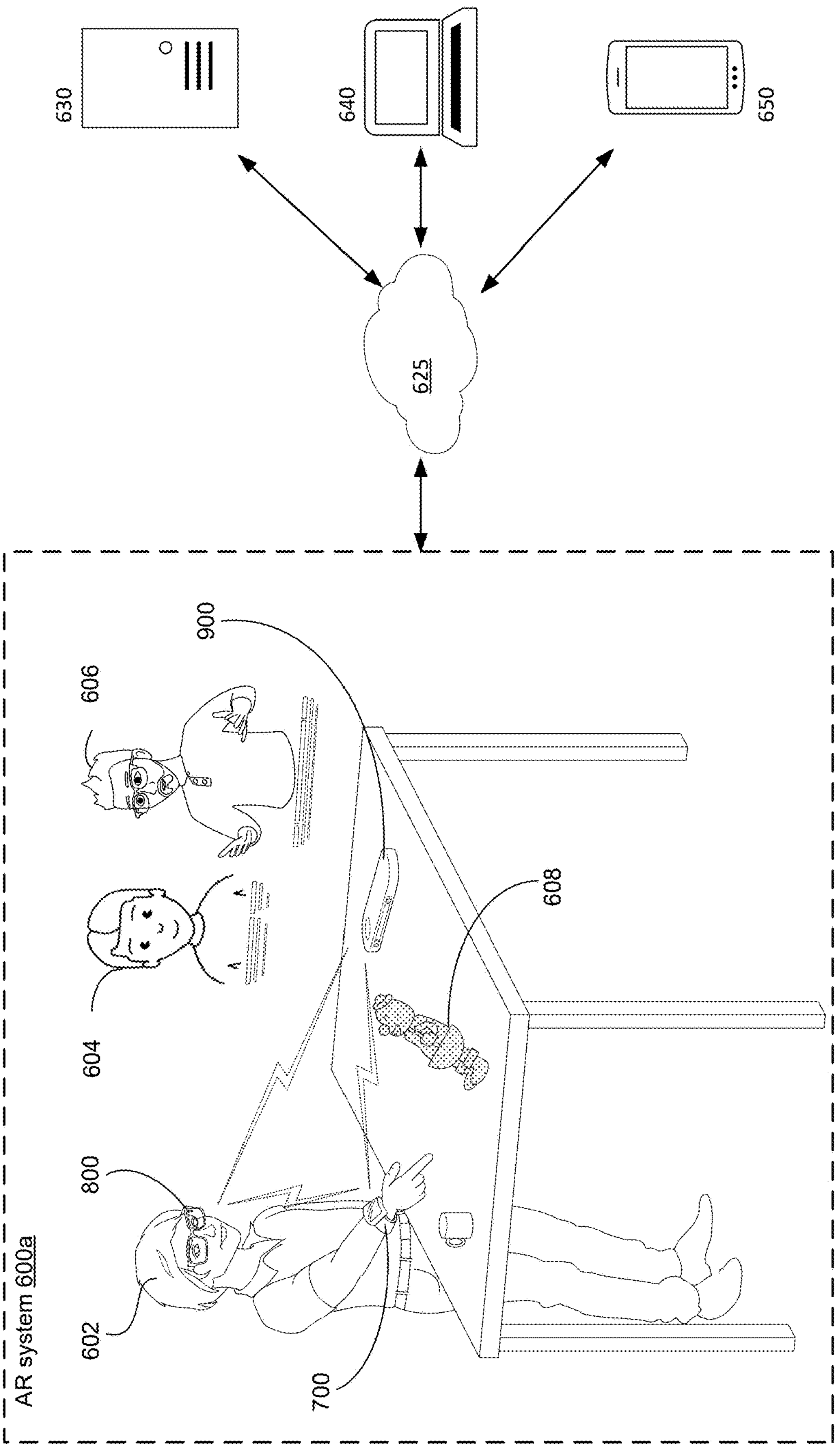
Figure 6B:
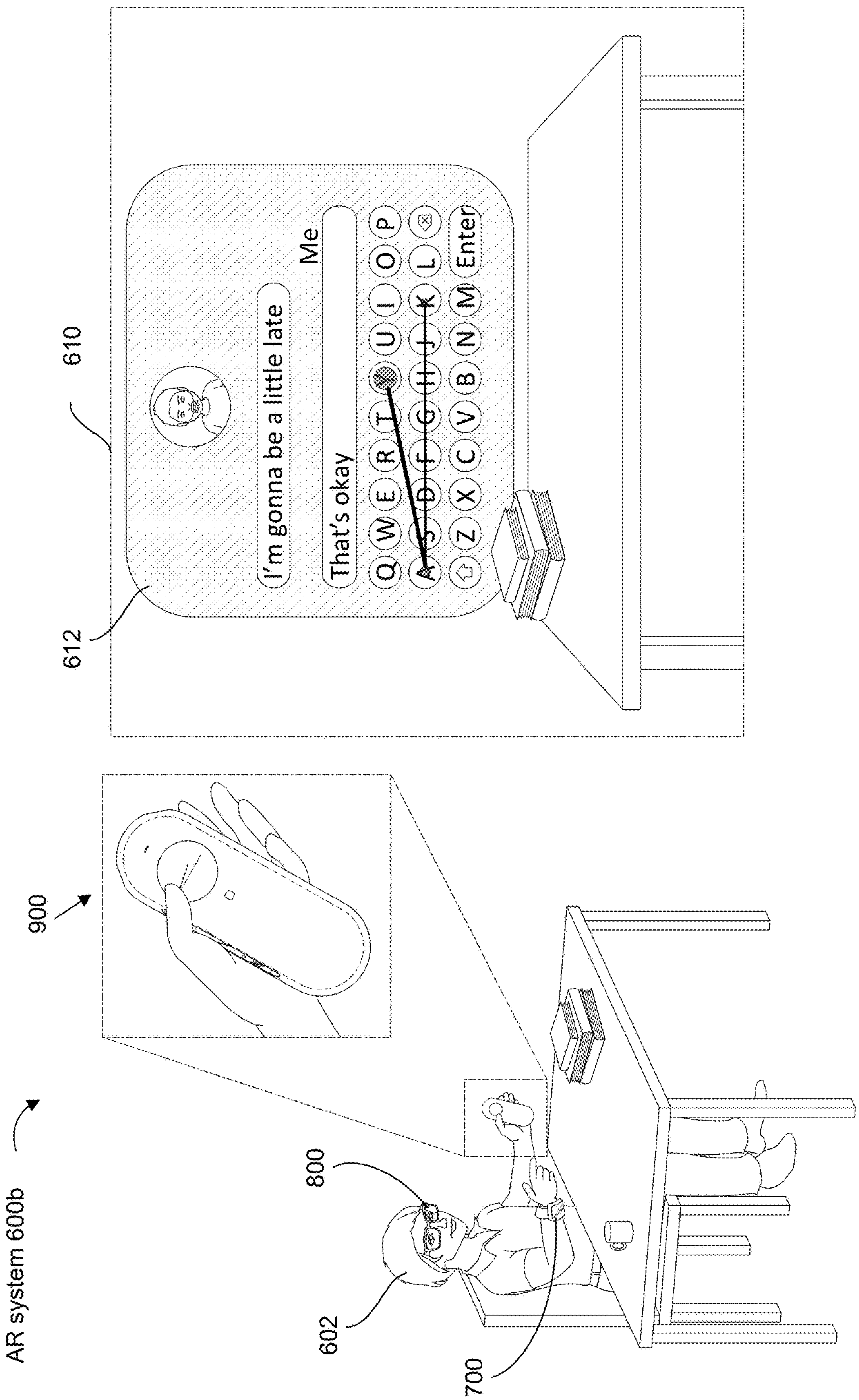
Figures 1, 6C:
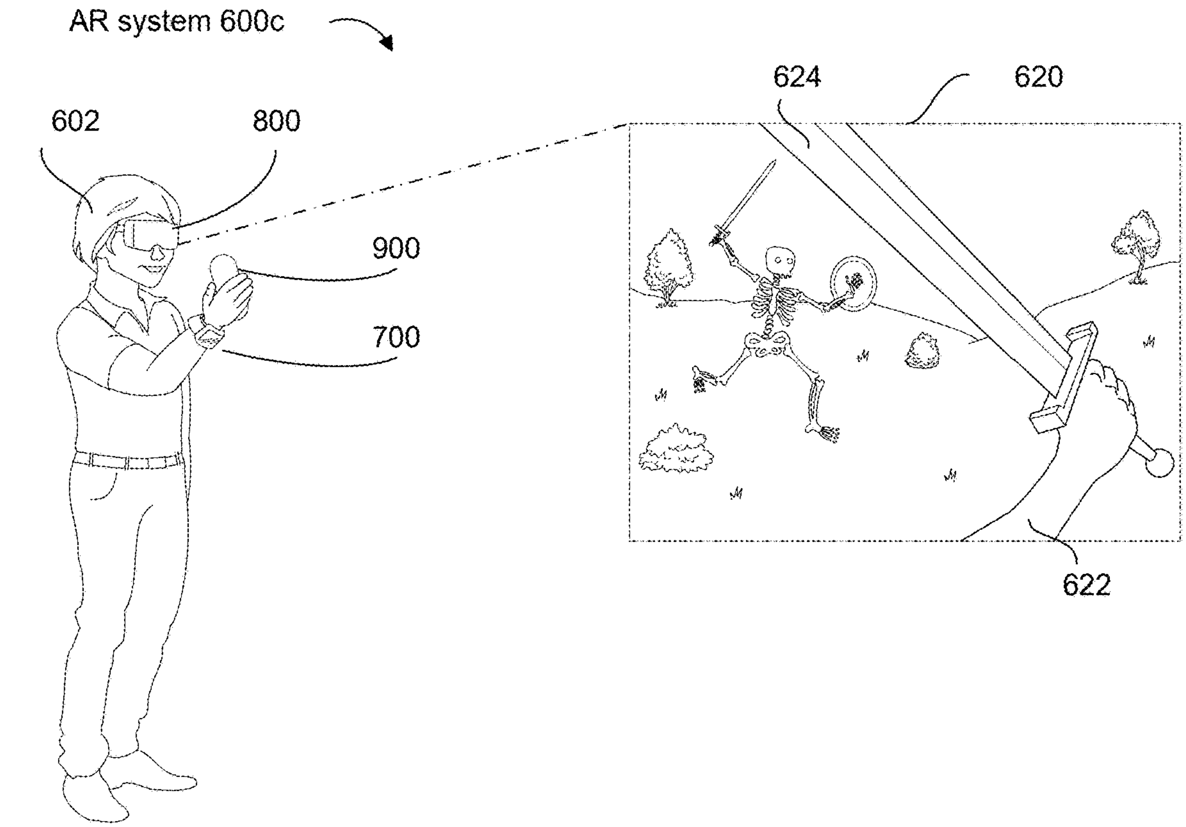
Figures 2, 6C:
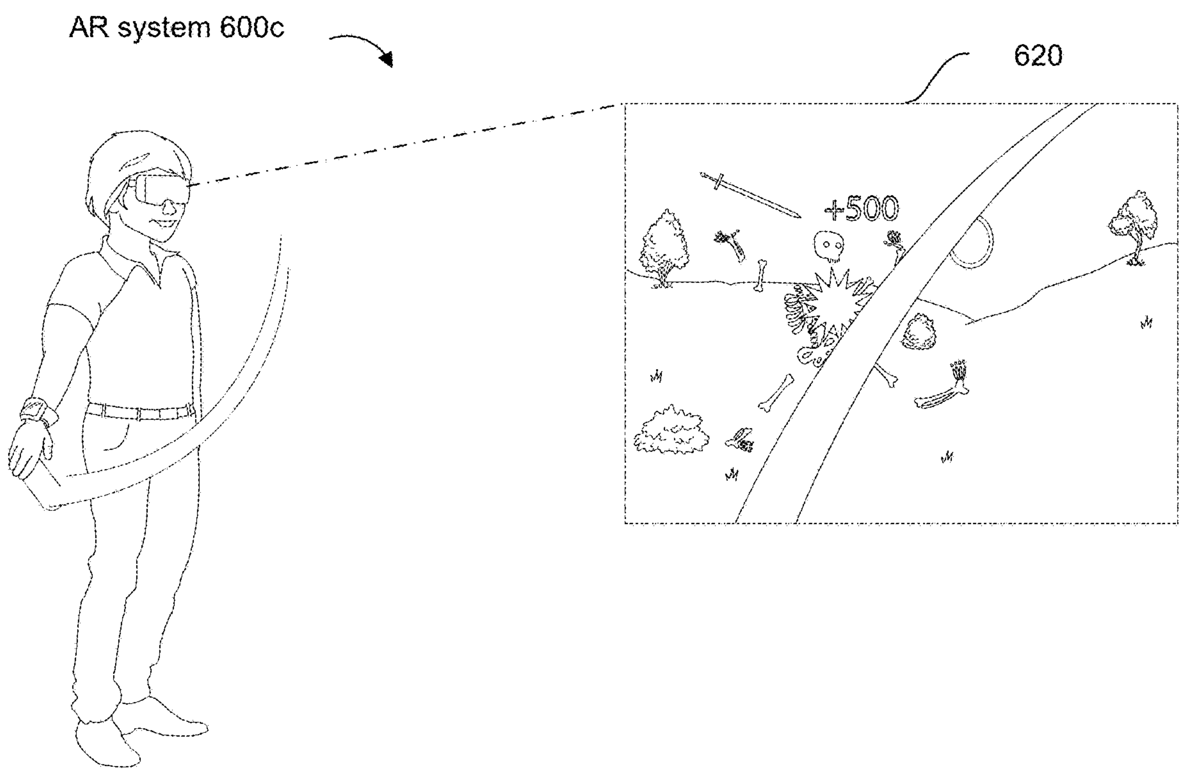

FIGS. 6A, 6B, 6C-1, and 6C-2 illustrate example AR systems, in accordance with some embodiments. FIG. 6A shows a first AR system 600*a* and first example user interactions using a wrist-wearable device 700, a head-wearable device (e.g., AR device 800), and/or a handheld intermediary processing device (HIPD) 900. FIG. 6B shows a second AR system 600*b* and second example user interactions using a wrist-wearable device 700, AR device 800, and/or an HIPD 900. FIGS. 6C-1 and 6C-2 show a third AR system 600*c* and third example user interactions using a wrist-wearable device 700, a head-wearable device (e.g., virtual-reality (VR) device 810), and/or an HIPD 900.

The wrist-wearable device 700 and its constituent components are described below in reference to FIGS. 7A-7B, the head-wearable devices and their constituent components are described below in reference to FIGS. 8A-8D, and the HIPD 900 and its constituent components are described below in reference to FIGS. 9A-9B. The wrist-wearable device 700, the head-wearable devices, and/or the HIPD 900 can communicatively couple via a network 625 (e.g., cellular, near field, Wi-Fi, personal area network, or wireless LAN). Additionally, the wrist-wearable device 700, the head-wearable devices, and/or the HIPD 900 can also communicatively couple with one or more servers 630, computers 640 (e.g., laptops or computers), mobile devices 650 (e.g., smartphones or tablets), and/or other electronic devices via the network 625 (e.g., cellular, near field, Wi-Fi, personal area network, or wireless LAN).

Turning to FIG. 6A, a user 602 is shown wearing the wrist-wearable device 700 and the AR device 800, and having the HIPD 900 on their desk. The wrist-wearable device 700, the AR device 800, and the HIPD 900 facilitate user interaction with an AR environment. In particular, as shown by the first AR system 600*a*, the wrist-wearable device 700, the AR device 800, and/or the HIPD 900 cause presentation of one or more avatars 604, digital representations of contacts 606, and virtual objects 608. As discussed below, the user 602 can interact with the one or more avatars 604, digital representations of the contacts 606, and virtual objects 608 via the wrist-wearable device 700, the AR device 800, and/or the HIPD 900.

The user 602 can use any of the wrist-wearable device 700, the AR device 800, and/or the HIPD 900 to provide user inputs. For example, the user 602 can perform one or more hand gestures that are detected by the wrist-wearable device 700 (e.g., using one or more EMG sensors and/or IMUs, described below in reference to FIGS. 7A-7B) and/or AR device 800 (e.g., using one or more image sensors or cameras, described below in reference to FIGS. 8A-8B) to provide a user input. Alternatively, or additionally, the user 602 can provide a user input via one or more touch surfaces of the wrist-wearable device 700, the AR device 800, and/or the HIPD 900, and/or voice commands captured by a microphone of the wrist-wearable device 700, the AR device 800, and/or the HIPD 900. In some embodiments, the wrist-wearable device 700, the AR device 800, and/or the HIPD 900 include a digital assistant to help the user in providing a user input (e.g., completing a sequence of operations, suggesting different operations or commands, providing reminders, or confirming a command). In some embodiments, the user 602 can provide a user input via one or more facial gestures and/or facial expressions. For example, cameras of the wrist-wearable device 700, the AR device 800, and/or the HIPD 900 can track the user 602's eyes for navigating a user interface.

The wrist-wearable device 700, the AR device 800, and/or the HIPD 900 can operate alone or in conjunction to allow the user 602 to interact with the AR environment. In some embodiments, the HIPD 900 is configured to operate as a central hub or control center for the wrist-wearable device 700, the AR device 800, and/or another communicatively coupled device. For example, the user 602 can provide an input to interact with the AR environment at any of the wrist-wearable device 700, the AR device 800, and/or the HIPD 900, and the HIPD 900 can identify one or more back-end and front-end tasks to cause the performance of the requested interaction and distribute instructions to cause the performance of the one or more back-end and front-end tasks at the wrist-wearable device 700, the AR device 800, and/or the HIPD 900. In some embodiments, a back-end task is a background-processing task that is not perceptible by the user (e.g., rendering content, decompression, or compression), and a front-end task is a user-facing task that is perceptible to the user (e.g., presenting information to the user or providing feedback to the user). As described below in reference to FIGS. 9A-9B, the HIPD 900 can perform the back-end tasks and provide the wrist-wearable device 700 and/or the AR device 800 operational data corresponding to the performed back-end tasks such that the wrist-wearable device 700 and/or the AR device 800 can perform the front-end tasks. In this way, the HIPD 900, which has more computational resources and greater thermal headroom than the wrist-wearable device 700 and/or the AR device 800, performs computationally intensive tasks and reduces the computer resource utilization and/or power usage of the wrist-wearable device 700 and/or the AR device 800.

In the example shown by the first AR system 600*a*, the HIPD 900 identifies one or more back-end tasks and front-end tasks associated with a user request to initiate an AR video call with one or more other users (represented by the avatar 604 and the digital representation of the contact 606) and distributes instructions to cause the performance of the one or more back-end tasks and front-end tasks. In particular, the HIPD 900 performs back-end tasks for processing and/or rendering image data (and other data) associated with the AR video call and provides operational data associated with the performed back-end tasks to the AR device 800 such that the AR device 800 performs front-end tasks for presenting the AR video call (e.g., presenting the avatar 604 and the digital representation of the contact 606).

In some embodiments, the HIPD 900 can operate as a focal or anchor point for causing the presentation of information. This allows the user 602 to be generally aware of where information is presented. For example, as shown in the first AR system 600*a*, the avatar 604 and the digital representation of the contact 606 are presented above the HIPD 900. In particular, the HIPD 900 and the AR device 800 operate in conjunction to determine a location for presenting the avatar 604 and the digital representation of the contact 606. In some embodiments, information can be presented within a predetermined distance from the HIPD 900 (e.g., within five meters). For example, as shown in the first AR system 600*a*, virtual object 608 is presented on the desk some distance from the HIPD 900. Similar to the above example, the HIPD 900 and the AR device 800 can operate in conjunction to determine a location for presenting the virtual object 608. Alternatively, in some embodiments, presentation of information is not bound by the HIPD 900. More specifically, the avatar 604, the digital representation of the contact 606, and the virtual object 608 do not have to be presented within a predetermined distance of the HIPD 900.

User inputs provided at the wrist-wearable device 700, the AR device 800, and/or the HIPD 900 are coordinated such that the user can use any device to initiate, continue, and/or complete an operation. For example, the user 602 can provide a user input to the AR device 800 to cause the AR device 800 to present the virtual object 608 and, while the virtual object 608 is presented by the AR device 800, the user 602 can provide one or more hand gestures via the wrist-wearable device 700 to interact and/or manipulate the virtual object 608.

FIG. 6B shows the user 602 wearing the wrist-wearable device 700 and the AR device 800, and holding the HIPD 900. In the second AR system 600*b*, the wrist-wearable device 700, the AR device 800, and/or the HIPD 900 are used to receive and/or provide one or more messages to a contact of the user 602. In particular, the wrist-wearable device 700, the AR device 800, and/or the HIPD 900 detect and coordinate one or more user inputs to initiate a messaging application and prepare a response to a received message via the messaging application.

In some embodiments, the user 602 initiates, via a user input, an application on the wrist-wearable device 700, the AR device 800, and/or the HIPD 900 that causes the application to initiate on at least one device. For example, in the second AR system 600*b*, the user 602 performs a hand gesture associated with a command for initiating a messaging application (represented by messaging user interface 612), the wrist-wearable device 700 detects the hand gesture, and, based on a determination that the user 602 is wearing AR device 800, causes the AR device 800 to present a messaging user interface 612 of the messaging application. The AR device 800 can present the messaging user interface 612 to the user 602 via its display (e.g., as shown by user 602's field of view 610). In some embodiments, the application is initiated and can be run on the device (e.g., the wrist-wearable device 700, the AR device 800, and/or the HIPD 900) that detects the user input to initiate the application, and the device provides another device operational data to cause the presentation of the messaging application. For example, the wrist-wearable device 700 can detect the user input to initiate a messaging application, initiate and run the messaging application, and provide operational data to the AR device 800 and/or the HIPD 900 to cause presentation of the messaging application. Alternatively, the application can be initiated and run at a device other than the device that detected the user input. For example, the wrist-wearable device 700 can detect the hand gesture associated with initiating the messaging application and cause the HIPD 900 to run the messaging application and coordinate the presentation of the messaging application.

Further, the user 602 can provide a user input provided at the wrist-wearable device 700, the AR device 800, and/or the HIPD 900 to continue and/or complete an operation initiated at another device. For example, after initiating the messaging application via the wrist-wearable device 700 and while the AR device 800 presents the messaging user interface 612, the user 602 can provide an input at the HIPD 900 to prepare a response (e.g., shown by the swipe gesture performed on the HIPD 900). The user 602's gestures performed on the HIPD 900 can be provided and/or displayed on another device. For example, the user 602's swipe gestures performed on the HIPD 900 are displayed on a virtual keyboard of the messaging user interface 612 displayed by the AR device 800.

In some embodiments, the wrist-wearable device 700, the AR device 800, the HIPD 900, and/or other communicatively coupled devices can present one or more notifications to the user 602. The notification can be an indication of a new message, an incoming call, an application update, a status update, etc. The user 602 can select the notification via the wrist-wearable device 700, the AR device 800, or the HIPD 900 and cause presentation of an application or operation associated with the notification on at least one device. For example, the user 602 can receive a notification that a message was received at the wrist-wearable device 700, the AR device 800, the HIPD 900, and/or other communicatively coupled device and provide a user input at the wrist-wearable device 700, the AR device 800, and/or the HIPD 900 to review the notification, and the device detecting the user input can cause an application associated with the notification to be initiated and/or presented at the wrist-wearable device 700, the AR device 800, and/or the HIPD 900.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 800 can present to the user 602 game application data and the HIPD 900 can use a controller to provide inputs to the game. Similarly, the user 602 can use the wrist-wearable device 700 to initiate a camera of the AR device 800, and the user can use the wrist-wearable device 700, the AR device 800, and/or the HIPD 900 to manipulate the image capture (e.g., zoom in or out or apply filters) and capture image data.

Turning to FIGS. 6C-1 and 6C-2, the user 602 is shown wearing the wrist-wearable device 700 and a VR device 810, and holding the HIPD 900. In the third AR system 600*c*, the wrist-wearable device 700, the VR device 810, and/or the HIPD 900 are used to interact within an AR environment, such as a VR game or other AR application. While the VR device 810 presents a representation of a VR game (e.g., first AR game environment 620) to the user 602, the wrist-wearable device 700, the VR device 810, and/or the HIPD 900 detect and coordinate one or more user inputs to allow the user 602 to interact with the VR game.

In some embodiments, the user 602 can provide a user input via the wrist-wearable device 700, the VR device 810, and/or the HIPD 900 that causes an action in a corresponding AR environment. For example, the user 602 in the third AR system 600*c* (shown in FIG. 6C-1) raises the HIPD 900 to prepare for a swing in the first AR game environment 620. The VR device 810, responsive to the user 602 raising the HIPD 900, causes the AR representation of the user 622 to perform a similar action (e.g., raise a virtual object, such as a virtual sword 624). In some embodiments, each device uses respective sensor data and/or image data to detect the user input and provide an accurate representation of the user 602's motion. For example, imaging sensors 954 (e.g., SLAM cameras or other cameras discussed below in FIGS. 9A and 9B) of the HIPD 900 can be used to detect a position of the 900 relative to the user 602's body such that the virtual object can be positioned appropriately within the first AR game environment 620; sensor data from the wrist-wearable device 700 can be used to detect a velocity at which the user 602 raises the HIPD 900 such that the AR representation of the user 622 and the virtual sword 624 are synchronized with the user 602's movements; and image sensors 826 (FIGS. 8A-8C) of the VR device 810 can be used to represent the user 602's body, boundary conditions, or real-world objects within the first AR game environment 620.

In FIG. 6C-2, the user 602 performs a downward swing while holding the HIPD 900. The user 602's downward swing is detected by the wrist-wearable device 700, the VR device 810, and/or the HIPD 900 and a corresponding action is performed in the first AR game environment 620. In some embodiments, the data captured by each device is used to improve the user's experience within the AR environment. For example, sensor data of the wrist-wearable device 700 can be used to determine a speed and/or force at which the downward swing is performed and image sensors of the HIPD 900 and/or the VR device 810 can be used to determine a location of the swing and how it should be represented in the first AR game environment 620, which, in turn, can be used as inputs for the AR environment (e.g., game mechanics, which can use detected speed, force, locations, and/or aspects of the user 602's actions to classify a user's inputs (e.g., user performs a light strike, hard strike, critical strike, glancing strike, miss) or calculate an output (e.g., amount of damage)).

While the wrist-wearable device 700, the VR device 810, and/or the HIPD 900 are described as detecting user inputs, in some embodiments, user inputs are detected at a single device (with the single device being responsible for distributing signals to the other devices for performing the user input). For example, the HIPD 900 can operate an application for generating the first AR game environment 620 and provide the VR device 810 with corresponding data for causing the presentation of the first AR game environment 620, as well as detect the 602's movements (while holding the HIPD 900) to cause the performance of corresponding actions within the first AR game environment 620. Additionally or alternatively, in some embodiments, operational data (e.g., sensor data, image data, application data, device data, and/or other data) of one or more devices is provide to a single device (e.g., the HIPD 900) to process the operational data and cause respective devices to perform an action associated with processed operational data.

Having discussed example AR systems, devices for interacting with such AR systems, and other computing systems more generally, devices and components will now be discussed in greater detail below. Some definitions of devices and components that can be included in some or all of the example devices discussed below are defined here for ease of reference. A skilled artisan will appreciate that certain types of the components described below may be more suitable for a particular set of devices and less suitable for a different set of devices. But subsequent references to the components defined here should be considered to be encompassed by the definitions provided.

In some embodiments discussed below, example devices and systems, including electronic devices and systems, will be discussed. Such example devices and systems are not intended to be limiting, and one of skill in the art will understand that alternative devices and systems to the example devices and systems described herein may be used to perform the operations and construct the systems and devices that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices and/or a subset of components of one or more electronic devices, which facilitates communication, and/or data processing, and/or data transfer between the respective electronic devices and/or electronic components.

Example Wrist-Wearable Devices

Figure 7A:
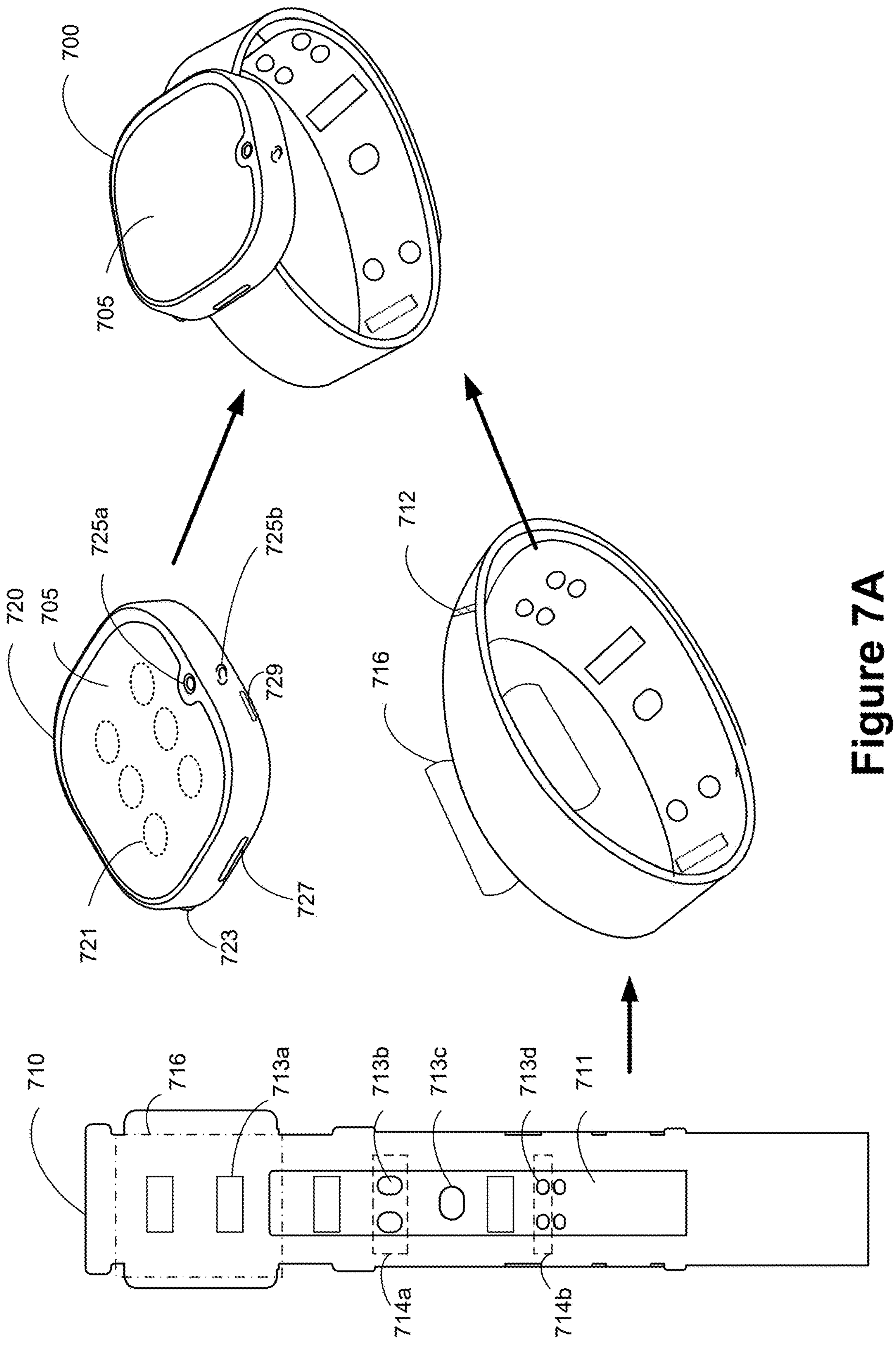
FIGS. 7A-7B illustrate an example wrist-wearable device 700, in accordance with some embodiments.
Figure 7B:
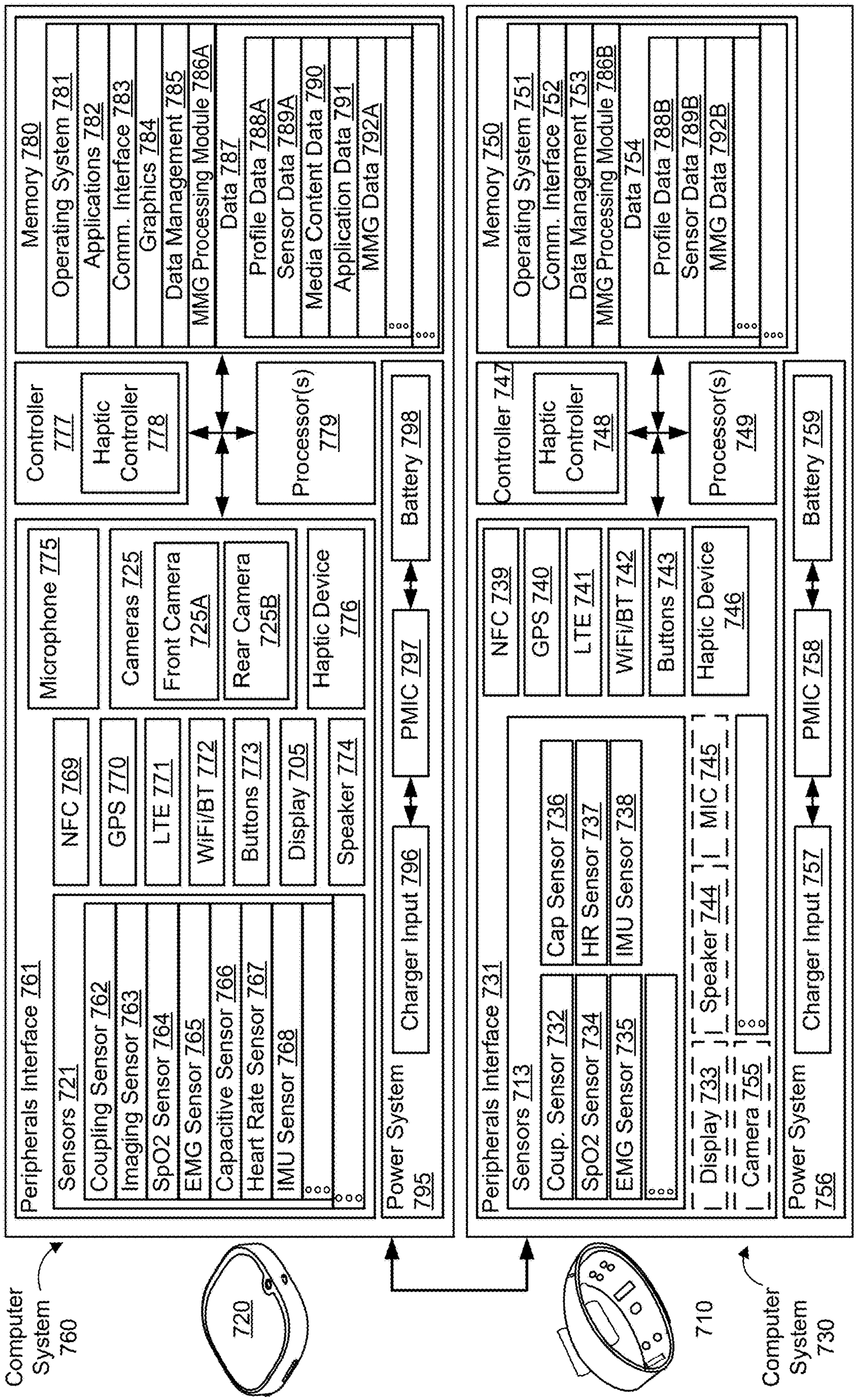

FIGS. 7A and 7B illustrate an example wrist-wearable device 700, in accordance with some embodiments. The wrist-wearable device 700 is an instance of the wrist-wearable device 110 described in reference to FIGS. 1A-3C herein, such that the wrist-wearable device 700 should be understood to have the features of the wrist-wearable device 700 and vice versa. FIG. 7A illustrates components of the wrist-wearable device 700, which can be used individually or in combination, including combinations that include other electronic devices and/or electronic components.

FIG. 7A shows a wearable band 710 and a watch body 720 (or capsule) being coupled, as discussed below, to form the wrist-wearable device 700. The wrist-wearable device 700 can perform various functions and/or operations associated with navigating through user interfaces and selectively opening applications, as well as the functions and/or operations described above with reference to FIGS. 1A-3C.

As will be described in more detail below, operations executed by the wrist-wearable device 700 can include (i) presenting content to a user (e.g., displaying visual content via a display 705); (ii) detecting (e.g., sensing) user input (e.g., sensing a touch on peripheral button 723 and/or at a touch screen of the display 705, a hand gesture detected by sensors (e.g., biopotential sensors)); (iii) sensing biometric data via one or more sensors 713 (e.g., neuromuscular signals, heart rate, temperature, or sleep); messaging (e.g., text, speech, or video); image capture via one or more imaging devices or cameras 725; wireless communications (e.g., cellular, near field, Wi-Fi, or personal area network); location determination; financial transactions; providing haptic feedback; alarms; notifications; biometric authentication; health monitoring; and/or sleep monitoring.

The above-example functions can be executed independently in the watch body 720, independently in the wearable band 710, and/or via an electronic communication between the watch body 720 and the wearable band 710. In some embodiments, functions can be executed on the wrist-wearable device 700 while an AR environment is being presented (e.g., via one of the AR systems 600*a* to 600*d*). As the skilled artisan will appreciate upon reading the descriptions provided herein, the novel wearable devices described herein can be used with other types of AR environments.

The wearable band 710 can be configured to be worn by a user such that an inner (or inside) surface of the wearable structure 711 of the wearable band 710 is in contact with the user's skin. When worn by a user, sensors 713 contact the user's skin. The sensors 713 can sense biometric data such as a user's heart rate, saturated oxygen level, temperature, sweat level, neuromuscular-signal sensors, or a combination thereof. The sensors 713 can also sense data about a user's environment, including a user's motion, altitude, location, orientation, gait, acceleration, position, or a combination thereof. In some embodiments, the sensors 713 are configured to track a position and/or motion of the wearable band 710. The one or more sensors 713 can include any of the sensors defined above and/or discussed below with respect to FIG. 7B.

The one or more sensors 713 can be distributed on an inside and/or an outside surface of the wearable band 710. In some embodiments, the one or more sensors 713 are uniformly spaced along the wearable band 710. Alternatively, in some embodiments, the one or more sensors 713 are positioned at distinct points along the wearable band 710. As shown in FIG. 7A, the one or more sensors 713 can be the same or distinct. For example, in some embodiments, the one or more sensors 713 can be shaped as a pill (e.g., sensor 713*a*), an oval, a circle a square, an oblong (e.g., sensor 713*c*), and/or any other shape that maintains contact with the user's skin (e.g., such that neuromuscular signal and/or other biometric data can be accurately measured at the user's skin). In some embodiments, the one or more sensors 713 are aligned to form pairs of sensors (e.g., for sensing neuromuscular signals based on differential sensing within each respective sensor). For example, sensor 713*b* is aligned with an adjacent sensor to form sensor pair 714*a*, and sensor 713*d* is aligned with an adjacent sensor to form sensor pair 714*b*. In some embodiments, the wearable band 710 does not have a sensor pair. Alternatively, in some embodiments, the wearable band 710 has a predetermined number of sensor pairs (one pair of sensors, three pairs of sensors, four pairs of sensors, six pairs of sensors, or sixteen pairs of sensors).

The wearable band 710 can include any suitable number of sensors 713. In some embodiments, the amount, and arrangements of sensors 713 depend on the particular application for which the wearable band 710 is used. For instance, a wearable band 710 configured as an armband, wristband, or chest-band may include a plurality of sensors 713 with a different number of sensors 713 and different arrangement for each use case, such as medical use cases, compared to gaming or general day-to-day use cases.

In accordance with some embodiments, the wearable band 710 further includes an electrical ground electrode and a shielding electrode. The electrical ground and shielding electrodes, like the sensors 713, can be distributed on the inside surface of the wearable band 710 such that they contact a portion of the user's skin. For example, the electrical ground and shielding electrodes can be at an inside surface of coupling mechanism 716 or an inside surface of a wearable structure 711. The electrical ground and shielding electrodes can be formed and/or use the same components as the sensors 713. In some embodiments, the wearable band 710 includes more than one electrical ground electrode and more than one shielding electrode.

The sensors 713 can be formed as part of the wearable structure 711 of the wearable band 710. In some embodiments, the sensors 713 are flush or substantially flush with the wearable structure 711 such that they do not extend beyond the surface of the wearable structure 711. While flush with the wearable structure 711, the sensors 713 are still configured to contact the user's skin (e.g., via a skin-contacting surface). Alternatively, in some embodiments, the sensors 713 extend beyond the wearable structure 711 a predetermined distance (e.g., 0.1 mm to 2 mm) to make contact and depress into the user's skin. In some embodiments, the sensors 713 are coupled to an actuator (not shown) configured to adjust an extension height (e.g., a distance from the surface of the wearable structure 711) of the sensors 713 such that the sensors 713 make contact and depress into the user's skin. In some embodiments, the actuators adjust the extension height between 0.01 mm to 1.2 mm. This allows the user to customize the positioning of the sensors 713 to improve the overall comfort of the wearable band 710 when worn while still allowing the sensors 713 to contact the user's skin. In some embodiments, the sensors 713 are indistinguishable from the wearable structure 711 when worn by the user.

The wearable structure 711 can be formed of an elastic material, elastomers, etc., configured to be stretched and fitted to be worn by the user. In some embodiments, the wearable structure 711 is a textile or woven fabric. As described above, the sensors 713 can be formed as part of a wearable structure 711. For example, the sensors 713 can be molded into the wearable structure 711 or be integrated into a woven fabric (e.g., the sensors 713 can be sewn into the fabric and mimic the pliability of fabric (e.g., the sensors 713 can be constructed from a series of woven strands of fabric)).

The wearable structure 711 can include flexible electronic connectors that interconnect the sensors 713, the electronic circuitry, and/or other electronic components (described below in reference to FIG. 7B) that are enclosed in the wearable band 710. In some embodiments, the flexible electronic connectors are configured to interconnect the sensors 713, the electronic circuitry, and/or other electronic components of the wearable band 710 with respective sensors and/or other electronic components of another electronic device (e.g., watch body 720). The flexible electronic connectors are configured to move with the wearable structure 711 such that the user adjustment to the wearable structure 711 (e.g., resizing, pulling, or folding) does not stress or strain the electrical coupling of components of the wearable band 710.

As described above, the wearable band 710 is configured to be worn by a user. In particular, the wearable band 710 can be shaped or otherwise manipulated to be worn by a user. For example, the wearable band 710 can be shaped to have a substantially circular shape such that it can be configured to be worn on the user's lower arm or wrist. Alternatively, the wearable band 710 can be shaped to be worn on another body part of the user, such as the user's upper arm (e.g., around a bicep), forearm, chest, legs, etc. The wearable band 710 can include a retaining mechanism 712 (e.g., a buckle or a hook and loop fastener) for securing the wearable band 710 to the user's wrist or other body part. While the wearable band 710 is worn by the user, the sensors 713 sense data (referred to as sensor data) from the user's skin. In particular, the sensors 713 of the wearable band 710 obtain (e.g., sense and record) neuromuscular signals.

The sensed data (e.g., sensed neuromuscular signals) can be used to detect and/or determine the user's intention to perform certain motor actions. In particular, the sensors 713 sense and record neuromuscular signals from the user as the user performs muscular activations (e.g., movements or gestures). The detected and/or determined motor action (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 705 of the wrist-wearable device 700 and/or can be transmitted to a device responsible for rendering an AR environment (e.g., a head-mounted display) to perform an action in an associated AR environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 713 can be used to provide a user with an enhanced interaction with a physical object (e.g., devices communicatively coupled with the wearable band 710) and/or a virtual object in an AR application generated by an AR system (e.g., user interface objects presented on the display 705 or another computing device (e.g., a smartphone)).

In some embodiments, the wearable band 710 includes one or more haptic devices 746 (FIG. 7B; e.g., a vibratory haptic actuator) that are configured to provide haptic feedback (e.g., a cutaneous and/or kinesthetic sensation) to the user's skin. The sensors 713 and/or the haptic devices 746 can be configured to operate in conjunction with multiple applications including, without limitation, health monitoring, social media, games, and AR (e.g., the applications associated with AR).

The wearable band 710 can also include a coupling mechanism 716 (e.g., a cradle or a shape of the coupling mechanism can correspond to the shape of the watch body 720 of the wrist-wearable device 700) for detachably coupling a capsule (e.g., a computing unit) or watch body 720 (via a coupling surface of the watch body 720) to the wearable band 710. In particular, the coupling mechanism 716 can be configured to receive a coupling surface proximate to the bottom side of the watch body 720 (e.g., a side opposite to a front side of the watch body 720 where the display 705 is located), such that a user can push the watch body 720 downward into the coupling mechanism 716 to attach the watch body 720 to the coupling mechanism 716. In some embodiments, the coupling mechanism 716 can be configured to receive a top side of the watch body 720 (e.g., a side proximate to the front side of the watch body 720 where the display 705 is located) that is pushed upward into the cradle, as opposed to being pushed downward into the coupling mechanism 716. In some embodiments, the coupling mechanism 716 is an integrated component of the wearable band 710 such that the wearable band 710 and the coupling mechanism 716 are a single unitary structure. In some embodiments, the coupling mechanism 716 is a type of frame or shell that allows the watch body 720 coupling surface to be retained within or on the wearable band 710 coupling mechanism 716 (e.g., a cradle, a tracker band, a support base, or a clasp).

The coupling mechanism 716 can allow for the watch body 720 to be detachably coupled to the wearable band 710 through a friction fit, a magnetic coupling, a rotation-based connector, a shear-pin coupler, a retention spring, one or more magnets, a clip, a pin shaft, a hook-and-loop fastener, or a combination thereof. A user can perform any type of motion to couple the watch body 720 to the wearable band 710 and to decouple the watch body 720 from the wearable band 710. For example, a user can twist, slide, turn, push, pull, or rotate the watch body 720 relative to the wearable band 710, or a combination thereof, to attach the watch body 720 to the wearable band 710 and to detach the watch body 720 from the wearable band 710. Alternatively, as discussed below, in some embodiments, the watch body 720 can be decoupled from the wearable band 710 by actuation of the release mechanism 729.

The wearable band 710 can be coupled with a watch body 720 to increase the functionality of the wearable band 710 (e.g., converting the wearable band 710 into a wrist-wearable device 700, adding an additional computing unit and/or battery to increase computational resources and/or a battery life of the wearable band 710, or adding additional sensors to improve sensed data). As described above, the wearable band 710 (and the coupling mechanism 716) is configured to operate independently (e.g., execute functions independently) from watch body 720. For example, the coupling mechanism 716 can include one or more sensors 713 that contact a user's skin when the wearable band 710 is worn by the user and provide sensor data for determining control commands.

A user can detach the watch body 720 (or capsule) from the wearable band 710 in order to reduce the encumbrance of the wrist-wearable device 700 to the user. For embodiments in which the watch body 720 is removable, the watch body 720 can be referred to as a removable structure, such that in these embodiments the wrist-wearable device 700 includes a wearable portion (e.g., the wearable band 710) and a removable structure (the watch body 720).

Turning to the watch body 720, the watch body 720 can have a substantially rectangular or circular shape. The watch body 720 is configured to be worn by the user on their wrist or on another body part. More specifically, the watch body 720 is sized to be easily carried by the user, attached on a portion of the user's clothing, and/or coupled to the wearable band 710 (forming the wrist-wearable device 700). As described above, the watch body 720 can have a shape corresponding to the coupling mechanism 716 of the wearable band 710. In some embodiments, the watch body 720 includes a single release mechanism 729 or multiple release mechanisms (e.g., two release mechanisms 729 positioned on opposing sides of the watch body 720, such as spring-loaded buttons) for decoupling the watch body 720 and the wearable band 710. The release mechanism 729 can include, without limitation, a button, a knob, a plunger, a handle, a lever, a fastener, a clasp, a dial, a latch, or a combination thereof.

A user can actuate the release mechanism 729 by pushing, turning, lifting, depressing, shifting, or performing other actions on the release mechanism 729. Actuation of the release mechanism 729 can release (e.g., decouple) the watch body 720 from the coupling mechanism 716 of the wearable band 710, allowing the user to use the watch body

720 independently from wearable band 710 and vice versa. For example, decoupling the watch body 720 from the wearable band 710 can allow the user to capture images using rear-facing camera 725*b*. Although the coupling mechanism 716 is shown positioned at a corner of watch body 720, the release mechanism 729 can be positioned anywhere on watch body 720 that is convenient for the user to actuate. In addition, in some embodiments, the wearable band 710 can also include a respective release mechanism for decoupling the watch body 720 from the coupling mechanism 716. In some embodiments, the release mechanism 729 is optional and the watch body 720 can be decoupled from the coupling mechanism 716, as described above (e.g., via twisting or rotating).

The watch body 720 can include one or more peripheral buttons 723 and 727 for performing various operations at the watch body 720. For example, the peripheral buttons 723 and 727 can be used to turn on or wake (e.g., transition from a sleep state to an active state) the display 705, unlock the watch body 720, increase or decrease volume, increase, or decrease brightness, interact with one or more applications, interact with one or more user interfaces. Additionally, or alternatively, in some embodiments, the display 705 operates as a touch screen and allows the user to provide one or more inputs for interacting with the watch body 720.

In some embodiments, the watch body 720 includes one or more sensors 721. The sensors 721 of the watch body 720 can be the same or distinct from the sensors 713 of the wearable band 710. The sensors 721 of the watch body 720 can be distributed on an inside and/or an outside surface of the watch body 720. In some embodiments, the sensors 721 are configured to contact a user's skin when the watch body 720 is worn by the user. For example, the sensors 721 can be placed on the bottom side of the watch body 720 and the coupling mechanism 716 can be a cradle with an opening that allows the bottom side of the watch body 720 to directly contact the user's skin. Alternatively, in some embodiments, the watch body 720 does not include sensors that are configured to contact the user's skin (e.g., including sensors internal and/or external to the watch body 720 that are configured to sense data of the watch body 720 and the watch body 720's surrounding environment). In some embodiments, the sensors 713 are configured to track a position and/or motion of the watch body 720.

The watch body 720 and the wearable band 710 can share data using a wired communication method (e.g., a Universal Asynchronous Receiver/Transmitter (UART) or a USB transceiver) and/or a wireless communication method (e.g., near-field communication or Bluetooth). For example, the watch body 720 and the wearable band 710 can share data sensed by the sensors 713 and 721, as well as application- and device-specific information (e.g., active and/or available applications), output devices (e.g., display or speakers), and/or input devices (e.g., touch screens, microphones, or imaging sensors).

In some embodiments, the watch body 720 can include, without limitation, a front-facing camera 725*a* and/or a rear-facing camera 725*b*, sensors 721 (e.g., a biometric sensor, an IMU sensor, a heart rate sensor, a saturated oxygen sensor, a neuromuscular-signal sensor, an altimeter sensor, a temperature sensor, a bioimpedance sensor, a pedometer sensor, an optical sensor (e.g., FIG. 7B; imaging sensor 763), a touch sensor, a sweat sensor). In some embodiments, the watch body 720 can include one or more haptic devices 776 (FIG. 7B; a vibratory haptic actuator) that is configured to provide haptic feedback (e.g., a cutaneous and/or kinesthetic sensation) to the user. The sensors 721 and/or the haptic device 776 can also be configured to operate in conjunction with multiple applications, including, without limitation, health-monitoring applications, social media applications, game applications, and AR applications (e.g., the applications associated with AR).

As described above, the watch body 720 and the wearable band 710, when coupled, can form the wrist-wearable device 700. When coupled, the watch body 720 and wearable band 710 operate as a single device to execute functions (e.g., operations, detections, or communications) described herein. In some embodiments, each device is provided with particular instructions for performing the one or more operations of the wrist-wearable device 700. For example, in accordance with a determination that the watch body 720 does not include neuromuscular-signal sensors, the wearable band 710 can include alternative instructions for performing associated instructions (e.g., providing sensed neuromuscular-signal data to the watch body 720 via a different electronic device). Operations of the wrist-wearable device 700 can be performed by the watch body 720 alone or in conjunction with the wearable band 710 (e.g., via respective processors and/or hardware components) and vice versa. In some embodiments, operations of the wrist-wearable device 700, the watch body 720, and/or the wearable band 710 can be performed in conjunction with one or more processors and/or hardware components of another communicatively coupled device (e.g., FIGS. 9A-9B; the HIPD 900).

As described below with reference to the block diagram of FIG. 7B, the wearable band 710 and/or the watch body 720 can each include independent resources required to independently execute functions. For example, the wearable band 710 and/or the watch body 720 can each include a power source (e.g., a battery), a memory, data storage, a processor (e.g., a CPU), communications, a light source, and/or input/output devices.

FIG. 7B shows block diagrams of a computing system 730 corresponding to the wearable band 710 and a computing system 760 corresponding to the watch body 720, according to some embodiments. A computing system of the wrist-wearable device 700 includes a combination of components of the wearable band computing system 730 and the watch body computing system 760, in accordance with some embodiments.

The watch body 720 and/or the wearable band 710 can include one or more components shown in watch body computing system 760. In some embodiments, a single integrated circuit includes all or a substantial portion of the components of the watch body computing system 760 that are included in a single integrated circuit. Alternatively, in some embodiments, components of the watch body computing system 760 are included in a plurality of integrated circuits that are communicatively coupled. In some embodiments, the watch body computing system 760 is configured to couple (e.g., via a wired or wireless connection) with the wearable band computing system 730, which allows the computing systems to share components, distribute tasks, and/or perform other operations described herein (individually or as a single device).

The watch body computing system 760 can include one or more processors 779, a controller 777, a peripherals interface 761, a power system 795, and memory (e.g., a memory 780), each of which are defined above and described in more detail below.

The power system 795 can include a charger input 796, a power-management integrated circuit (PMIC) 797, and a battery 798, each of which are defined above. In some embodiments, a watch body 720 and a wearable band 710 can have respective charger inputs (e.g., charger inputs 796 and 757), respective batteries (e.g., batteries 798 and 759), and can share power with each other (e.g., the watch body 720 can power and/or charge the wearable band 710 and vice versa). Although watch body 720 and/or the wearable band 710 can include respective charger inputs, a single charger input can charge both devices when coupled. The watch body 720 and the wearable band 710 can receive a charge using a variety of techniques. In some embodiments, the watch body 720 and the wearable band 710 can use a wired charging assembly (e.g., power cords) to receive the charge. Alternatively, or in addition, the watch body 720 and/or the wearable band 710 can be configured for wireless charging. For example, a portable charging device can be designed to mate with a portion of watch body 720 and/or wearable band 710 and wirelessly deliver usable power to a battery of watch body 720 and/or wearable band 710. The watch body 720 and the wearable band 710 can have independent power systems (e.g., power system 795 and 756) to enable each to operate independently. The watch body 720 and wearable band 710 can also share power (e.g., one can charge the other) via respective PMICs (e.g., PMICs 797 and 758) that can share power over power and ground conductors and/or over wireless charging antennas.

In some embodiments, the peripherals interface 761 can include one or more sensors 721, many of which listed below are defined above. The sensors 721 can include one or more coupling sensors 762 for detecting when the watch body 720 is coupled with another electronic device (e.g., a wearable band 710). The sensors 721 can include imaging sensors 763 (one or more of the cameras 725 and/or separate imaging sensors 763 (e.g., thermal-imaging sensors)). In some embodiments, the sensors 721 include one or more SpO2 sensors 764. In some embodiments, the sensors 721 include one or more biopotential-signal sensors (e.g., EMG sensors 765, which may be disposed on a user-facing portion of the watch body 720 and/or the wearable band 710). In some embodiments, the sensors 721 include one or more capacitive sensors 766. In some embodiments, the sensors 721 include one or more heart rate sensors 767. In some embodiments, the sensors 721 include one or more IMUs 768. In some embodiments, one or more IMUs 768 can be configured to detect movement of a user's hand or other location that the watch body 720 is placed or held.

In some embodiments, the peripherals interface 761 includes an NFC component 769, a GPS component 770, a long-term evolution (LTE) component 771, and/or a Wi-Fi and/or Bluetooth communication component 772. In some embodiments, the peripherals interface 761 includes one or more buttons 773 (e.g., the peripheral buttons 723 and 727 in FIG. 7A), which, when selected by a user, cause operations to be performed at the watch body 720. In some embodiments, the peripherals interface 761 includes one or more indicators, such as a light-emitting diode (LED), to provide a user with visual indicators (e.g., message received, low battery, an active microphone, and/or a camera).

The watch body 720 can include at least one display 705 for displaying visual representations of information or data to the user, including user-interface elements and/or three-dimensional (3D) virtual objects. The display can also include a touch screen for inputting user inputs, such as touch gestures, swipe gestures, and the like. The watch body 720 can include at least one speaker 774 and at least one microphone 775 for providing audio signals to the user and receiving audio input from the user. The user can provide user inputs through the microphone 775 and can also receive audio output from the speaker 774 as part of a haptic event provided by the haptic controller 778. The watch body 720 can include at least one camera 725, including a front-facing camera 725*a* and a rear-facing camera 725*b*. The cameras 725 can include ultra-wide-angle cameras, wide-angle cameras, fish-eye cameras, spherical cameras, telephoto cameras, depth-sensing cameras, or other types of cameras.

The watch body computing system 760 can include one or more haptic controllers 778 and associated componentry (e.g., haptic devices 776) for providing haptic events at the watch body 720 (e.g., a vibrating sensation or audio output in response to an event at the watch body 720). The haptic controllers 778 can communicate with one or more haptic devices 776, such as electroacoustic devices, including a speaker of the one or more speakers 774 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 778 can provide haptic events to respective haptic actuators that are capable of being sensed by a user of the watch body 720. In some embodiments, the one or more haptic controllers 778 can receive input signals from an application of the applications 782.

In some embodiments, the computer system 730 and/or the computer system 760 can include memory 780, which can be controlled by a memory controller of the one or more controllers 777 and/or one or more processors 779. In some embodiments, software components stored in the memory 780 include one or more applications 782 configured to perform operations at the watch body 720. In some embodiments, the one or more applications 782 include games, word processors, messaging applications, calling applications, web browsers, social media applications, media streaming applications, financial applications, calendars, clocks, etc. In some embodiments, software components stored in the memory 780 include one or more communication interface modules 783 as defined above. In some embodiments, software components stored in the memory 780 include one or more graphics modules 784 for rendering, encoding, and/or decoding audio and/or visual data; and one or more data management modules 785 for collecting, organizing, and/or providing access to the data 787 stored in memory 780. In some embodiments, software components stored in the memory 780 include a multi-modal gesture (MMG) processing module 786A, which is configured to perform the features described above in reference to FIGS. 1A-3C. For example, the MMG processing module includes processing one or more of the input gestures performed by the user 105 as described above in FIGS. 1A-3C. In some embodiments, the gestures processed by the MMG processing module include in-air hand gestures, touch gestures performed at another communicatively coupled device (e.g., the user 105 touching the watch body 720 of the wrist-wearable device 700), inputs performed using one or more buttons at the head-wearable device 120 and/or the wrist-wearable device 110 (e.g., at the watch body 720 of the wrist wearable device, etc.). In some embodiments, one or more of applications 782 and/or one or more modules can work in conjunction with one another to perform various tasks at the watch body 720.

In some embodiments, software components stored in the memory 780 can include one or more operating systems 781 (e.g., a Linux-based operating system, an Android operating system, etc.). The memory 780 can also include data 787. The data 787 can include profile data 788A, sensor data

789A, media content data 790, application data 791, and MMG data 792A, which stores data related to the performance of the features described above in reference to FIGS. 1A-3C. The MMG data 792A further represents data collected by the MMG processing module 786A.

It should be appreciated that the watch body computing system 760 is an example of a computing system within the watch body 720, and that the watch body 720 can have more or fewer components than shown in the watch body computing system 760, combine two or more components, and/or have a different configuration and/or arrangement of the components. The various components shown in watch body computing system 760 are implemented in hardware, software, firmware, or a combination thereof, including one or more signal processing and/or application-specific integrated circuits.

Turning to the wearable band computing system 730, one or more components that can be included in the wearable band 710 are shown. The wearable band computing system 730 can include more or fewer components than shown in the watch body computing system 760, combine two or more components, and/or have a different configuration and/or arrangement of some or all of the components. In some embodiments, all, or a substantial portion of the components of the wearable band computing system 730 are included in a single integrated circuit. Alternatively, in some embodiments, components of the wearable band computing system 730 are included in a plurality of integrated circuits that are communicatively coupled. As described above, in some embodiments, the wearable band computing system 730 is configured to couple (e.g., via a wired or wireless connection) with the watch body computing system 760, which allows the computing systems to share components, distribute tasks, and/or perform other operations described herein (individually or as a single device).

The wearable band computing system 730, similar to the watch body computing system 760, can include one or more processors 749, one or more controllers 747 (including one or more haptics controller 748), a peripherals interface 731 that can include one or more sensors 713 and other peripheral devices, power source (e.g., a power system 756), and memory (e.g., a memory 750) that includes an operating system (e.g., an operating system 751), data (e.g., data 754 including profile data 788B, sensor data 789B, MMG data 792B, etc.), and one or more modules (e.g., a communications interface module 752, a data management module 753, a MMG processing module 786B, etc.).

The one or more sensors 713 can be analogous to sensors 721 of the computer system 760 in light of the definitions above. For example, sensors 713 can include one or more coupling sensors 732, one or more SpO2 sensors 734, one or more EMG sensors 735, one or more capacitive sensors 736, one or more heart rate sensors 737, and one or more IMU sensors 738.

The peripherals interface 731 can also include other components analogous to those included in the peripheral interface 761 of the computer system 760, including an NFC component 739, a GPS component 740, an LTE component 741, a Wi-Fi and/or Bluetooth communication component 742, and/or one or more haptic devices 776 as described above in reference to peripherals interface 761. In some embodiments, the peripherals interface 731 includes one or more buttons 743, a display 733, a speaker 744, a microphone 745, and a camera 755. In some embodiments, the peripherals interface 731 includes one or more indicators, such as an LED.

It should be appreciated that the wearable band computing system 730 is an example of a computing system within the wearable band 710, and that the wearable band 710 can have more or fewer components than shown in the wearable band computing system 730, combine two or more components, and/or have a different configuration and/or arrangement of the components. The various components shown in wearable band computing system 730 can be implemented in one or a combination of hardware, software, and firmware, including one or more signal processing and/or application-specific integrated circuits.

The wrist-wearable device 700 with respect to FIG. 7A is an example of the wearable band 710 and the watch body 720 coupled, so the wrist-wearable device 700 will be understood to include the components shown and described for the wearable band computing system 730 and the watch body computing system 760. In some embodiments, wrist-wearable device 700 has a split architecture (e.g., a split mechanical architecture or a split electrical architecture) between the watch body 720 and the wearable band 710. In other words, all of the components shown in the wearable band computing system 730 and the watch body computing system 760 can be housed or otherwise disposed in a combined wrist-wearable device 700 (e.g., a watch device), or within individual components of the watch body 720, wearable band 710, and/or portions thereof (e.g., a coupling mechanism 716 of the wearable band 710).

The techniques described above can be used with any device for sensing neuromuscular signals, including the arm-wearable devices of FIG. 7A-7B, but could also be used with other types of wearable devices for sensing neuromuscular signals (such as body-wearable or head-wearable devices that might have neuromuscular sensors closer to the brain or spinal column).

In some embodiments, a wrist-wearable device 700 can be used in conjunction with a head-wearable device described below (e.g., AR device 800 and VR device 810) and/or an HIPD 900, and the wrist-wearable device 700 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). Having thus described example wrist-wearable device, attention will now be turned to example head-wearable devices, such AR device 800 and VR device 810.

Example Head-Wearable Devices

FIGS. 8A, 8B-1, 8B-2, and 8C show example head-wearable devices, in accordance with some embodiments. Head-wearable devices can include, but are not limited to, AR devices 800 (e.g., AR or smart eyewear devices, such as smart glasses, smart monocles, smart contacts, etc.), VR devices 810 (e.g., VR headsets or head-mounted displays (HMDs)), or other ocularly coupled devices. The AR devices 800 and the VR devices 810 are instances of the head-wearable device 120 described in reference to FIGS. 1A-1T herein, such that the head-wearable device should be understood to have the features of the AR devices 800 and/or the VR devices 810 and vice versa. The AR devices 800 and the VR devices 810 can perform various functions and/or operations associated with navigating through user interfaces and selectively opening applications, as well as the functions and/or operations described above with reference to FIGS. 1A-1T and 4-5B.

In some embodiments, an AR system (e.g., FIGS. 6A-6D-2; AR systems 600*a*-600*d*) includes an AR device 800 (as shown in FIG. 8A) and/or VR device 810 (as shown in FIGS. 8B-1-B-2). In some embodiments, the AR device 800 and the VR device 810 can include one or more analogous components (e.g., components for presenting interactive AR environments, such as processors, memory, and/or presentation devices, including one or more displays and/or one or more waveguides), some of which are described in more detail with respect to FIG. 8C. The head-wearable devices can use display projectors (e.g., display projector assemblies 807A and 807B) and/or waveguides for projecting representations of data to a user. Some embodiments of head-wearable devices do not include displays.

FIG. 8A shows an example visual depiction of the AR device 800 (e.g., which may also be described herein as augmented-reality glasses and/or smart glasses). The AR device 800 can work in conjunction with additional electronic components that are not shown in FIGS. 8A, such as a wearable accessory device and/or an intermediary processing device, in electronic communication or otherwise configured to be used in conjunction with the AR device 800. In some embodiments, the wearable accessory device and/or the intermediary processing device may be configured to couple with the AR device 800 via a coupling mechanism in electronic communication with a coupling sensor 824, where the coupling sensor 824 can detect when an electronic device becomes physically or electronically coupled with the AR device 800. In some embodiments, the AR device 800 can be configured to couple to a housing (e.g., a portion of frame 804 or temple arms 805), which may include one or more additional coupling mechanisms configured to couple with additional accessory devices. The components shown in FIG. 8A can be implemented in hardware, software, firmware, or a combination thereof, including one or more signal-processing components and/or application-specific integrated circuits (ASICs).

The AR device 800 includes mechanical glasses components, including a frame 804 configured to hold one or more lenses (e.g., one or both lenses 806-1 and 806-2). One of ordinary skill in the art will appreciate that the AR device 800 can include additional mechanical components, such as hinges configured to allow portions of the frame 804 of the AR device 800 to be folded and unfolded, a bridge configured to span the gap between the lenses 806-1 and 806-2 and rest on the user's nose, nose pads configured to rest on the bridge of the nose and provide support for the AR device 800, earpieces configured to rest on the user's ears and provide additional support for the AR device 800, temple arms 805 configured to extend from the hinges to the earpieces of the AR device 800, and the like. One of ordinary skill in the art will further appreciate that some examples of the AR device 800 can include none of the mechanical components described herein. For example, smart contact lenses configured to present AR to users may not include any components of the AR device 800.

The lenses 806-1 and 806-2 can be individual displays or display devices (e.g., a waveguide for projected representations). The lenses 806-1 and 806-2 may act together or independently to present an image or series of images to a user. In some embodiments, the lenses 806-1 and 806-2 can operate in conjunction with one or more display projector assemblies 807A and 807B to present image data to a user. While the AR device 800 includes two displays, embodiments of this disclosure may be implemented in AR devices with a single near-eye display (NED) or more than two NEDs.

The AR device 800 includes electronic components, many of which will be described in more detail below with respect to FIG. 8C. Some example electronic components are illustrated in FIG. 8A, including sensors 823-1, 823-2, 823-3, 823-4, 823-5, and 823-6, which can be distributed along a substantial portion of the frame 804 of the AR device 800. The different types of sensors are described below in reference to FIG. 8C. The AR device 800 also includes a left camera 839A and a right camera 839B, which are located on different sides of the frame 804. And the eyewear device includes one or more processors 848A and 848B (e.g., an integral microprocessor, such as an ASIC) that is embedded into a portion of the frame 804.

Figures 1, 8B:
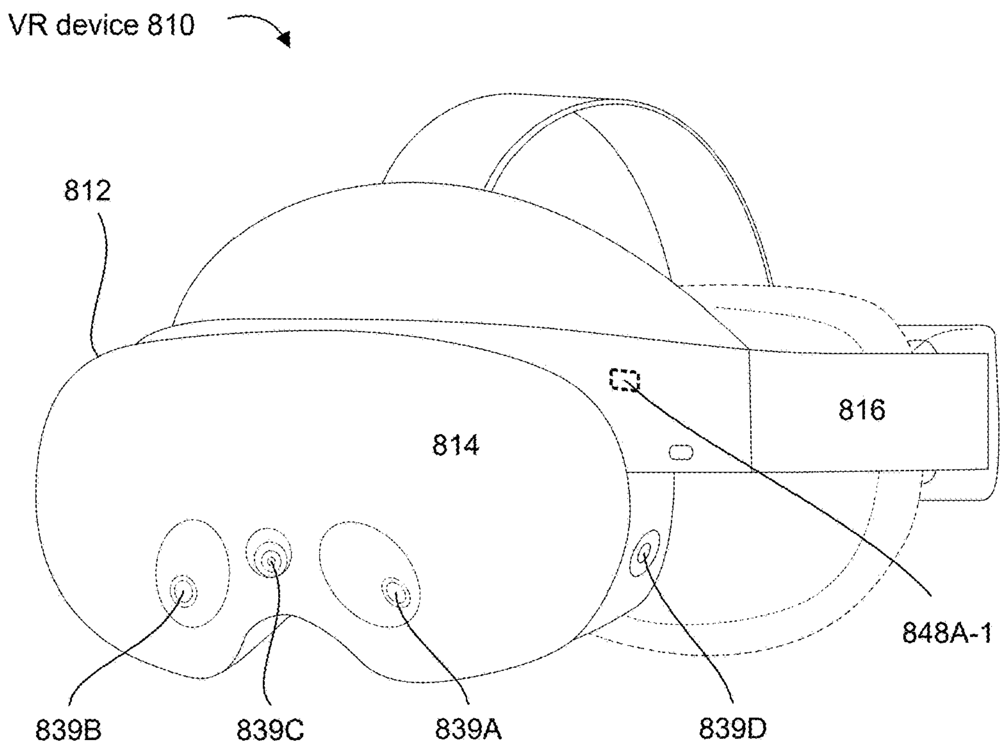
Figures 2, 8B:
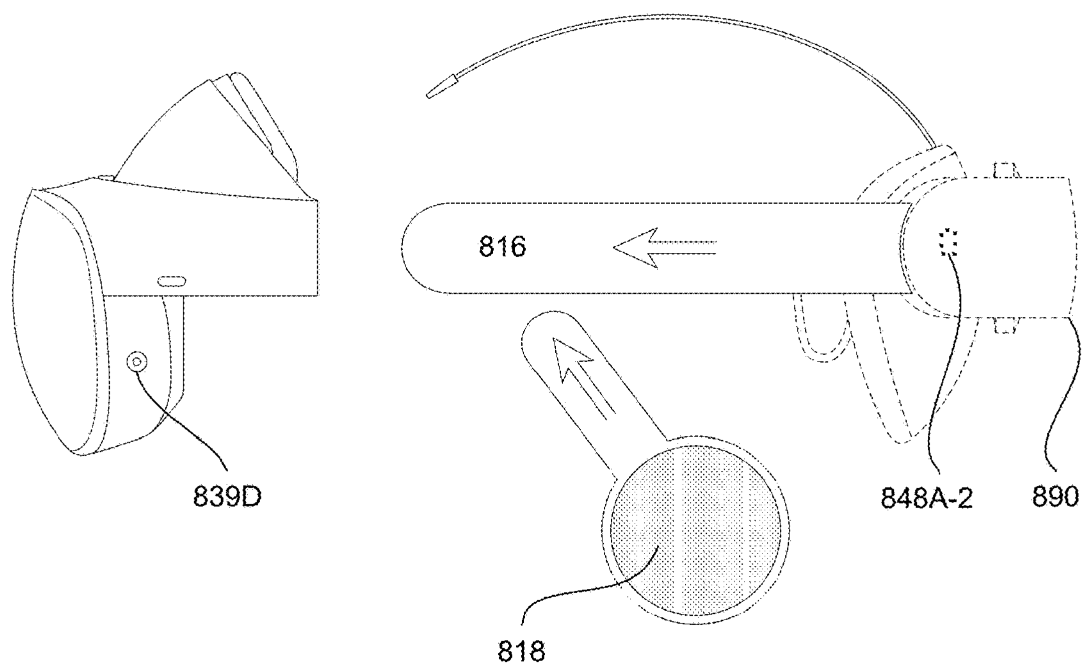
Figure 8C:
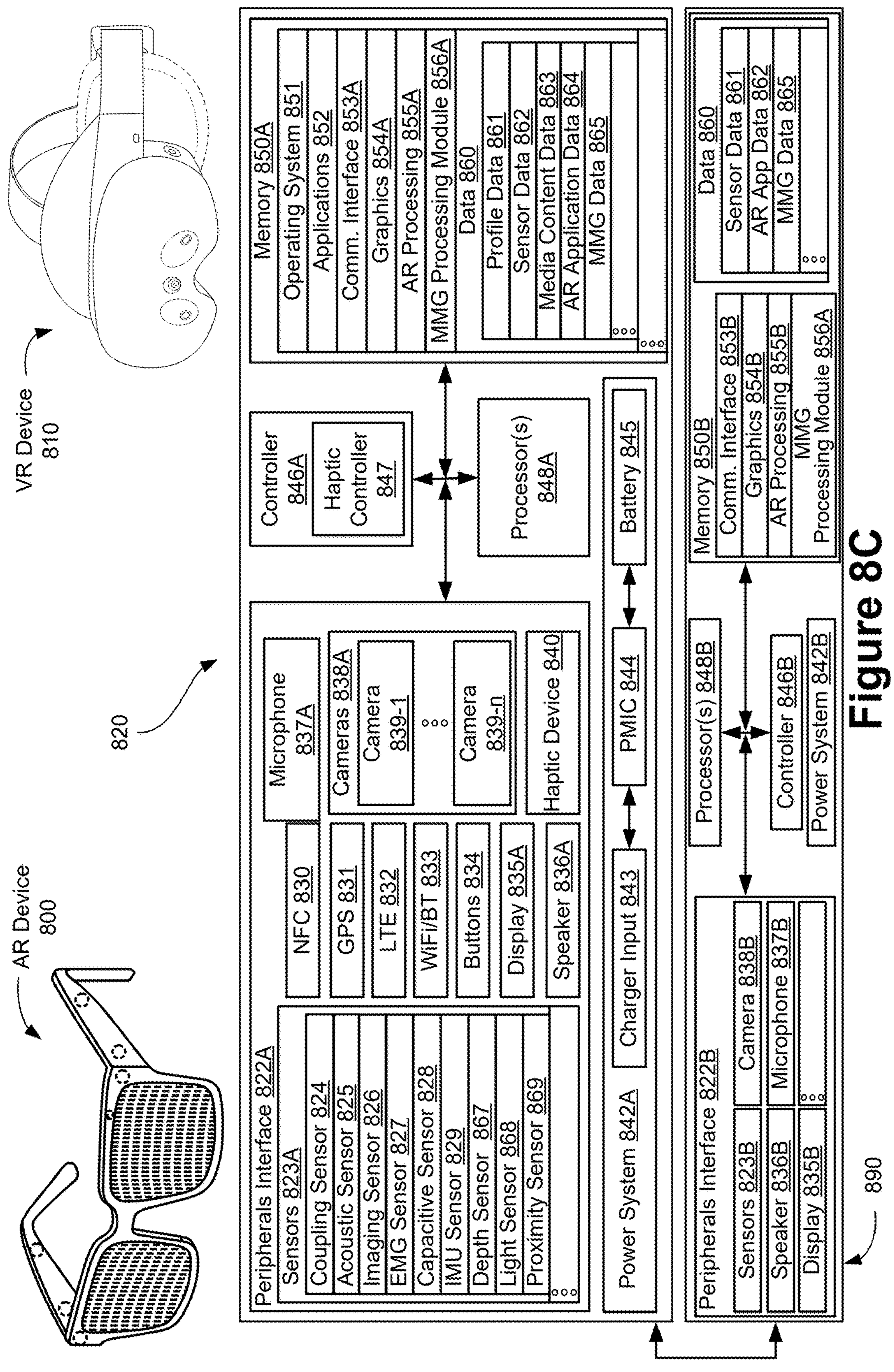

FIGS. 8B-1 and 8B-2 show an example visual depiction of the VR device 810 (e.g., a head-mounted display (HMD) 812, also referred to herein as an AR headset, a head-wearable device, or a VR headset). The HMD 812 includes a front body 814 and a frame 816 (e.g., a strap or band) shaped to fit around a user's head. In some embodiments, the front body 814 and/or the frame 816 includes one or more electronic elements for facilitating presentation of and/or interactions with an AR and/or VR system (e.g., displays, processors (e.g., processor 848A-1), IMUs, tracking emitters or detectors, or sensors). In some embodiments, the HMD 812 includes output audio transducers (e.g., an audio transducer 818-1), as shown in FIG. 8B-2. In some embodiments, one or more components, such as the output audio transducer(s) 818 and the frame 816, can be configured to attach and detach (e.g., are detachably attachable) to the HMD 812 (e.g., a portion or all of the frame 816 and/or the output audio transducer 818), as shown in FIG. 8B-2. In some embodiments, coupling a detachable component to the HMD 812 causes the detachable component to come into electronic communication with the HMD 812. The VR device 810 includes electronic components, many of which will be described in more detail below with respect to FIG. 8C.

FIGS. 8B-1 and 8B-2 also show that the VR device 810 having one or more cameras, such as the left camera 839A and the right camera 839B, which can be analogous to the left and right cameras on the frame 804 of the AR device 800. In some embodiments, the VR device 810 includes one or more additional cameras (e.g., cameras 839C and 839D), which can be configured to augment image data obtained by the cameras 839A and 839B by providing more information. For example, the camera 839C can be used to supply color information that is not discerned by cameras 839A and 839B. In some embodiments, one or more of the cameras 839A to 839D can include an optional IR (infrared) cut filter configured to remove IR light from being received at the respective camera sensors.

The VR device 810 can include a housing 890 storing one or more components of the VR device 810 and/or additional components of the VR device 810. The housing 890 can be a modular electronic device configured to couple with the VR device 810 (or an AR device 800) and supplement and/or extend the capabilities of the VR device 810 (or an AR device 800). For example, the housing 890 can include additional sensors, cameras, power sources, and processors (e.g., processor 848A-2) to improve and/or increase the functionality of the VR device 810. Examples of the different components included in the housing 890 are described below in reference to FIG. 8C.

Alternatively, or in addition, in some embodiments, the head-wearable device, such as the VR device 810 and/or the AR device 800, includes, or is communicatively coupled to, another external device (e.g., a paired device), such as an HIPD 9 (discussed below in reference to FIGS. 9A-9B) and/or an optional neckband. The optional neckband can couple to the head-wearable device via one or more connectors (e.g., wired, or wireless connectors). The head-wearable device and the neckband can operate independently without any wired or wireless connection between them. In some embodiments, the components of the head-wearable device and the neckband are located on one or more additional peripheral devices paired with the head-wearable device, the neckband, or some combination thereof. Furthermore, the neckband is intended to represent any suitable type or form of paired device. Thus, the following discussion of neckbands may also apply to various other paired devices, such as smartwatches, smartphones, wrist bands, other wearable devices, hand-held controllers, tablet computers, or laptop computers.

In some situations, pairing external devices, such as an intermediary processing device (e.g., an HIPD device 900, an optional neckband, and/or a wearable accessory device) with the head-wearable devices (e.g., an AR device 800 and/or a VR device 810) enables the head-wearable devices to achieve a similar form factor of a pair of glasses while still providing sufficient battery and computational power for expanded capabilities. Some, or all, of the battery power, computational resources, and/or additional features of the head-wearable devices can be provided by a paired device or shared between a paired device and the head-wearable devices, thus reducing the weight, heat profile, and form factor of the head-wearable device overall while allowing the head-wearable device to retain its desired functionality. For example, the intermediary processing device (e.g., the HIPD 900) can allow components that would otherwise be included in a head-wearable device to be included in the intermediary processing device (and/or a wearable device or accessory device), thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computational capacity than might otherwise have been possible on the head-wearable devices, standing alone. Because weight carried in the intermediary processing device can be less invasive to a user than weight carried in the head-wearable devices, a user may tolerate wearing a lighter eyewear device and carrying or wearing the paired device for greater lengths of time than the user would tolerate wearing a heavier eyewear device standing alone, thereby enabling an AR environment to be incorporated more fully into a user's day-to-day activities.

In some embodiments, the intermediary processing device is communicatively coupled with the head-wearable device and/or to other devices. The other devices may provide certain functions (e.g., tracking, localizing, depth mapping, processing, and/or storage) to the head-wearable device. In some embodiments, the intermediary processing device includes a controller and a power source. In some embodiments, sensors of the intermediary processing device are configured to sense additional data that can be shared with the head-wearable devices in an electronic format (analog or digital).

The controller of the intermediary processing device processes information generated by the sensors on the intermediary processing device and/or the head-wearable devices. The intermediary processing device, such as an HIPD 900, can process information generated by one or more of its sensors and/or information provided by other communicatively coupled devices. For example, a head-wearable device can include an IMU, and the intermediary processing device (a neckband and/or an HIPD 900) can compute all inertial and spatial calculations from the IMUs located on the head-wearable device. Additional examples of processing performed by a communicatively coupled device, such as the HIPD 900, are provided below in reference to FIGS. 9A and 9B.

AR systems may include a variety of types of visual feedback mechanisms. For example, display devices in the AR devices 800 and/or the VR devices 810 may include one or more liquid-crystal displays (LCDs), light emitting diode (LED) displays, organic LED (OLED) displays, and/or any other suitable type of display screen. AR systems may include a single display screen for both eyes or may provide a display screen for each eye, which may allow for additional flexibility for varifocal adjustments or for correcting a refractive error associated with the user's vision. Some AR systems also include optical subsystems having one or more lenses (e.g., conventional concave or convex lenses, Fresnel lenses, or adjustable liquid lenses) through which a user may view a display screen. In addition to or instead of using display screens, some AR systems include one or more projection systems. For example, display devices in the AR device 800 and/or the VR device 810 may include micro-LED projectors that project light (e.g., using a waveguide) into display devices, such as clear combiner lenses that allow ambient light to pass through. The display devices may refract the projected light toward a user's pupil and may enable a user to simultaneously view both AR content and the real world. AR systems may also be configured with any other suitable type or form of image projection system. As noted, some AR systems may, instead of blending an artificial reality with actual reality, substantially replace one or more of a user's sensory perceptions of the real world with a virtual experience.

While the example head-wearable devices are respectively described herein as the AR device 800 and the VR device 810, either or both of the example head-wearable devices described herein can be configured to present fully immersive VR scenes presented in substantially all of a user's field of view, additionally or alternatively to, subtler augmented-reality scenes that are presented within a portion, less than all, of the user's field of view.

In some embodiments, the AR device 800 and/or the VR device 810 can include haptic feedback systems. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback can be implemented using motors, piezoelectric actuators, fluidic systems, and/or a variety of other types of feedback mechanisms. The haptic feedback systems may be implemented independently of other AR devices, within other AR devices, and/or in conjunction with other AR devices (e.g., wrist-wearable devices that may be incorporated into headwear, gloves, body suits, handheld controllers, environmental devices (e.g., chairs or floormats), and/or any other type of device or system, such as a wrist-wearable device 700, an HIPD 900, smart textile-based garment), and/or other devices described herein.

FIG. 8C illustrates a computing system 820 and an optional housing 890, each of which shows components that can be included in a head-wearable device (e.g., the AR device 800 and/or the VR device 810). In some embodiments, more or fewer components can be included in the optional housing 890 depending on practical restraints of the respective head-wearable device being described. Additionally or alternatively, the optional housing 890 can include additional components to expand and/or augment the functionality of a head-wearable device.

In some embodiments, the computing system 820 and/or the optional housing 890 can include one or more peripheral interfaces 822A and 822B, one or more power systems 842A and 842B (including charger input 843, PMIC 844, and battery 845), one or more controllers 846A and 846B (including one or more haptic controllers 847), one or more processors 848A and 848B (as defined above, including any of the examples provided), and memory 850A and 850B, which can all be in electronic communication with each other. For example, the one or more processors 848A and/or 848B can be configured to execute instructions stored in the memory 850A and/or 850B, which can cause a controller of the one or more controllers 846A and/or 846B to cause operations to be performed at one or more peripheral devices of the peripherals interfaces 822A and/or 822B. In some embodiments, each operation described can occur based on electrical power provided by the power system 842A and/or 842B.

In some embodiments, the peripherals interface 822A can include one or more devices configured to be part of the computing system 820, many of which have been defined above and/or described with respect to wrist-wearable devices shown in FIGS. 7A and 7B. For example, the peripherals interface can include one or more sensors 823A. Some example sensors include one or more coupling sensors 824, one or more acoustic sensors 825, one or more imaging sensors 826, one or more EMG sensors 827, one or more capacitive sensors 828, and/or one or more IMU sensor 829. In some embodiments, the sensors 823A further include depth sensors 867, light sensors 868, and/or any other types of sensors defined above or described with respect to any other embodiments discussed herein.

In some embodiments, the peripherals interface can include one or more additional peripheral devices, including one or more NFC devices 830, one or more GPS devices 831, one or more LTE devices 832, one or more Wi-Fi and/or Bluetooth devices 833, one or more buttons 834 (e.g., including buttons that are slidable or otherwise adjustable), one or more displays 835A, one or more speakers 836A, one or more microphones 837A, one or more cameras 838A (e.g., including the first camera 839-1 through nth camera 839-*n*, which are analogous to the left camera 839A and/or the right camera 839B), one or more haptic devices 840, and/or any other types of peripheral devices defined above or described with respect to any other embodiments discussed herein.

The head-wearable devices can include a variety of types of visual feedback mechanisms (e.g., presentation devices). For example, display devices in the AR device 800 and/or the VR device 810 can include one or more liquid-crystal displays (LCDs), light emitting diode (LED) displays, organic LED (OLED) displays, micro-LEDs, and/or any other suitable types of display screens. The head-wearable devices can include a single display screen (e.g., configured to be seen by both eyes) and/or can provide separate display screens for each eye, which can allow for additional flexibility for varifocal adjustments and/or for correcting a refractive error associated with the user's vision. Some embodiments of the head-wearable devices also include optical subsystems having one or more lenses (e.g., conventional concave or convex lenses, Fresnel lenses, or adjustable liquid lenses) through which a user can view a display screen. For example, respective displays 835A can be coupled to each of the lenses 806-1 and 806-2 of the AR device 800. The displays 835A coupled to each of the lenses 806-1 and 806-2 can act together or independently to present an image or series of images to a user. In some embodiments, the AR device 800 and/or the VR device 810 includes a single display 835A (e.g., a near-eye display) or more than two displays 835A.

In some embodiments, a first set of one or more displays 835A can be used to present an augmented-reality environment, and a second set of one or more display devices 835A can be used to present a VR environment. In some embodiments, one or more waveguides are used in conjunction with presenting AR content to the user of the AR device 800 and/or the VR device 810 (e.g., as a means of delivering light from a display projector assembly and/or one or more displays 835A to the user's eyes). In some embodiments, one or more waveguides are fully or partially integrated into the AR device 800 and/or the VR device 810. Additionally, or alternatively, to display screens, some AR systems include one or more projection systems. For example, display devices in the AR device 800 and/or the VR device 810 can include micro-LED projectors that project light (e.g., using a waveguide) into display devices, such as clear combiner lenses that allow ambient light to pass through. The display devices can refract the projected light toward a user's pupil and can enable a user to simultaneously view both AR content and the real world. The head-wearable devices can also be configured with any other suitable type or form of image projection system. In some embodiments, one or more waveguides are provided, additionally or alternatively, to the one or more display(s) 835A.

In some embodiments of the head-wearable devices, ambient light and/or a real-world live view (e.g., a live feed of the surrounding environment that a user would normally see) can be passed through a display element of a respective head-wearable device presenting aspects of the AR system. In some embodiments, ambient light and/or the real-world live view can be passed through a portion, less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable devices, and an amount of ambient light and/or the real-world live view (e.g., 15%-50% of the ambient light and/or the real-world live view) can be passed through the user interface element, such that the user can distinguish at least a portion of the physical environment over which the user interface element is being displayed.

The head-wearable devices can include one or more external displays 835A for presenting information to users. For example, an external display 835A can be used to show a current battery level, network activity (e.g., connected, disconnected), current activity (e.g., playing a game, in a call, in a meeting, or watching a movie), and/or other relevant information. In some embodiments, the external displays 835A can be used to communicate with others. For example, a user of the head-wearable device can cause the external displays 835A to present a "do not disturb" notification. The external displays 835A can also be used by the user to share any information captured by the one or more components of the peripherals interface 822A and/or generated by the head-wearable device (e.g., during operation and/or performance of one or more applications).

The memory 850A can include instructions and/or data executable by one or more processors 848A (and/or processors 848B of the housing 890) and/or a memory controller of the one or more controllers 846A (and/or controller 846B of the housing 890). The memory 850A can include one or more operating systems 851, one or more applications 852, one or more communication interface modules 853A, one or more graphics modules 854A, one or more AR processing modules 855A, MMG processing module 856A for configured to process one or more input gestures performed by the user 105 detected by the one or more sensors 823A at the head-wearable device 120, and/or any other types of modules or components defined above or described with respect to any other embodiments discussed herein.

The data 860 stored in memory 850A can be used in conjunction with one or more of the applications and/or programs discussed above. The data 860 can include profile data 861, sensor data 862, media content data 863, AR application data 864, MMG data 865 representing the one or more input gestures performed by the user 105 detected at the head-wearable device 120 and/or another communicatively coupled device; and/or any other types of data defined above or described with respect to any other embodiments discussed herein.

In some embodiments, the controller 846A of the head-wearable devices processes information generated by the sensors 823A on the head-wearable devices and/or another component of the head-wearable devices and/or communicatively coupled with the head-wearable devices (e.g., components of the housing 890, such as components of peripherals interface 822B). For example, the controller 846A can process information from the acoustic sensors 825 and/or image sensors 826. For each detected sound, the controller 846A can perform a direction of arrival (DOA) estimation to estimate a direction from which the detected sound arrived at a head-wearable device. As one or more of the acoustic sensors 825 detect sounds, the controller 846A can populate an audio data set with the information (e.g., represented by sensor data 862).

In some embodiments, a physical electronic connector can convey information between the head-wearable devices and another electronic device, and/or between one or more processors 848A of the head-wearable devices and the controller 846A. The information can be in the form of optical data, electrical data, wireless data, or any other transmittable data form. Moving the processing of information generated by the head-wearable devices to an intermediary processing device can reduce weight and heat in the eyewear device, making it more comfortable and safer for a user. In some embodiments, an optional accessory device (e.g., an electronic neckband or an HIPD 900) is coupled to the head-wearable devices via one or more connectors. The connectors can be wired or wireless connectors and can include electrical and/or non-electrical (e.g., structural) components. In some embodiments, the head-wearable devices and the accessory device can operate independently without any wired or wireless connection between them.

The head-wearable devices can include various types of computer vision components and subsystems. For example, the AR device 800 and/or the VR device 810 can include one or more optical sensors such as two-dimensional (2D) or three-dimensional (3D) cameras, ToF depth sensors, single-beam or sweeping laser rangefinders, 3D LiDAR sensors, and/or any other suitable type or form of optical sensor. A head-wearable device can process data from one or more of these sensors to identify a location of a user and/or aspects of the user's real-world physical surroundings, including the locations of real-world objects within the real-world physical surroundings. In some embodiments, the methods described herein are used to map the real world, to provide a user with context about real-world surroundings, and/or to generate interactable virtual objects (which can be replicas or digital twins of real-world objects that can be interacted with an AR environment), among a variety of other functions. For example, FIGS. 8B-1 and 8B-2 show the VR device 810 having cameras 839A-839D, which can be used to provide depth information for creating a voxel field and a 2D mesh to provide object information to the user to avoid collisions.

The optional housing 890 can include analogous components to those describe above with respect to the computing system 820. For example, the optional housing 890 can include a respective peripherals interface 822B, including more or fewer components to those described above with respect to the peripherals interface 822A. As described above, the components of the optional housing 890 can be used to augment and/or expand on the functionality of the head-wearable devices. For example, the optional housing 890 can include respective sensors 823B, speakers 836B, displays 835B, microphones 837B, cameras 838B, and/or other components to capture and/or present data. Similarly, the optional housing 890 can include one or more processors 848B, controllers 846B, and/or memory 850B (including respective communication interface modules 853B, one or more graphics modules 854B, one or more AR processing modules 855B, input gesture processing module 856A) that can be used individually and/or in conjunction with the components of the computing system 820.

The techniques described above in FIGS. 8A-8C can be used with different head-wearable devices. In some embodiments, the head-wearable devices (e.g., the AR device 800 and/or the VR device 810) can be used in conjunction with one or more wearable devices such as a wrist-wearable device 700 (or components thereof). Having thus described example the head-wearable devices, attention will now be turned to example handheld intermediary processing devices, such as HIPD 900.

Example Handheld Intermediary Processing Devices

Figure 9A:
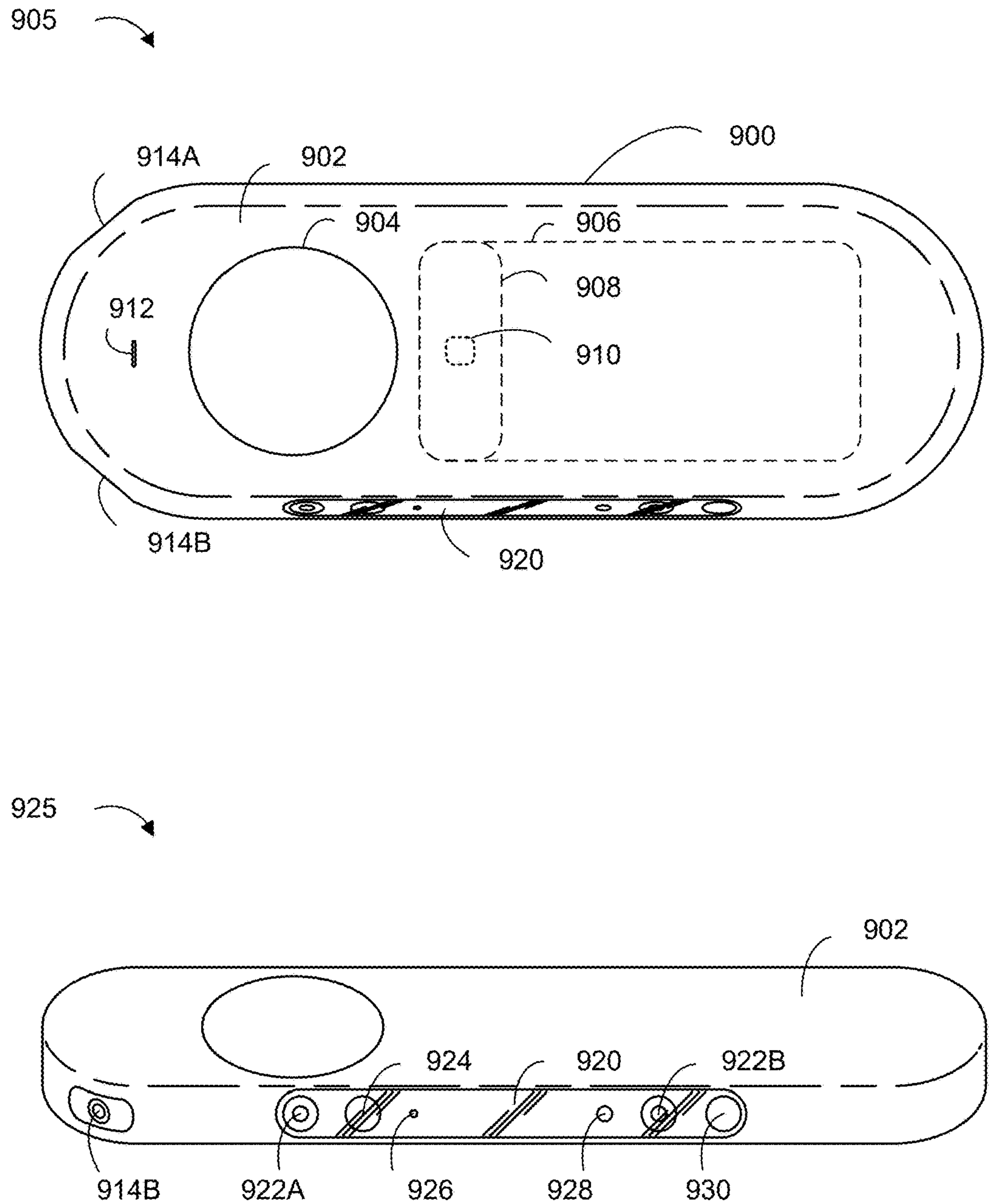
FIGS. 9A-9B illustrate an example handheld intermediary processing device, in accordance with some embodiments.
Figure 9B:
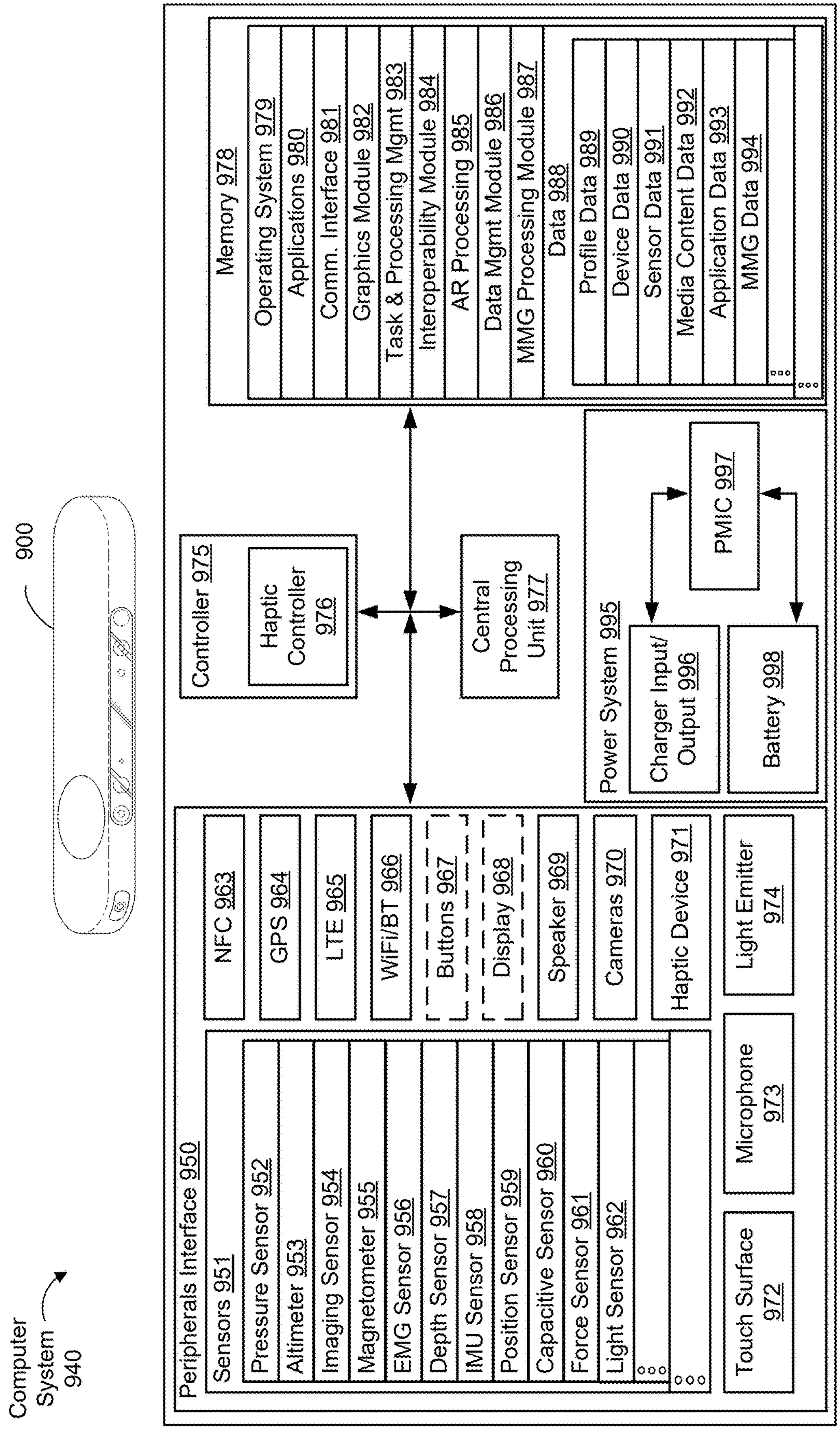

FIGS. 9A and 9B illustrate an example handheld intermediary processing device (HIPD) 900, in accordance with some embodiments. FIGS. 1A-1T can include an instance of the HIPD 900 that receives, and processes one or more input gestures performed by the user 105, such that the HIPD 900 should be understood to have the features described with respect to any intermediary device defined above or otherwise described herein, and vice versa. The HIPD 900 can perform various functions and/or operations associated with navigating through user interfaces and selectively opening applications, as well as the functions and/or operations described above with reference to FIGS. 1A-3C. For example, in FIG. 1E the user 105 performs a directional-pad swipe gesture detected by one or more sensors coupled with the wrist-wearable device 110. The HIPD 900 can receive the input gesture data, process the input gesture data using the MMG processing module 987, and cause the performance of an operation at the head-wearable device 120 or wrist-wearable device 110 in accordance with a determination that the input gesture data corresponds with an operation.

FIG. 9A shows a top view 905 and a side view 925 of the HIPD 900. The HIPD 900 is configured to communicatively couple with one or more wearable devices (or other electronic devices) associated with a user. For example, the HIPD 900 is configured to communicatively couple with a user's wrist-wearable device 700 (or components thereof, such as the watch body 720 and the wearable band 710), AR device 800, and/or VR device 810. The HIPD 900 can be configured to be held by a user (e.g., as a handheld controller), carried on the user's person (e.g., in their pocket or in their bag), placed in proximity of the user (e.g., placed on their desk while seated at their desk or on a charging dock), and/or placed at or within a predetermined distance from a wearable device or other electronic device (e.g., where, in some embodiments, the predetermined distance is the maximum distance (e.g., 10 meters) at which the HIPD 900 can successfully be communicatively coupled with an electronic device, such as a wearable device).

The HIPD 900 can perform various functions independently and/or in conjunction with one or more wearable devices (e.g., wrist-wearable device 700, AR device 800, and/or VR device 810). The HIPD 900 is configured to increase and/or improve the functionality of communicatively coupled devices, such as the wearable devices. The HIPD 900 is configured to perform one or more functions or operations associated with interacting with user interfaces and applications of communicatively coupled devices, interacting with an AR environment, interacting with a VR environment, and/or operating as a human-machine interface controller, as well as functions and/or operations described above with reference to FIGS. 1A-3C. Additionally, as will be described in more detail below, functionality and/or operations of the HIPD 900 can include, without limitation, task offloading and/or handoffs, thermals offloading and/or handoffs, 6 degrees of freedom (6DoF) raycasting and/or gaming (e.g., using imaging devices or cameras 914A and 914B, which can be used for simultaneous localization and mapping (SLAM), and/or with other image processing techniques), portable charging; messaging, image capturing via one or more imaging devices or cameras (e.g., cameras 922A and 922B), sensing user input (e.g., sensing a touch on a multitouch input surface 902), wireless communications and/or interlining (e.g., cellular, near field, Wi-Fi, or personal area network), location determination, financial transactions, providing haptic feedback, alarms, notifications, biometric authentication, health monitoring, sleep monitoring. The above-example functions can be executed independently in the HIPD 900 and/or in communication between the HIPD 900 and another wearable device described herein. In some embodiments, functions can be executed on the HIPD 900 in conjunction with an AR environment. As the skilled artisan will appreciate upon reading the descriptions provided herein, the novel HIPD 900 described herein can be used with any type of suitable AR environment.

While the HIPD 900 is communicatively coupled with a wearable device and/or other electronic device, the HIPD 900 is configured to perform one or more operations initiated at the wearable device and/or the other electronic device. In particular, one or more operations of the wearable device and/or the other electronic device can be offloaded to the HIPD 900 to be performed. The HIPD 900 performs one or more operations of the wearable device and/or the other electronic device and provides data corresponding to the completed operations to the wearable device and/or the other electronic device. For example, a user can initiate a video stream using the AR device 800 and back-end tasks associated with performing the video stream (e.g., video rendering) can be offloaded to the HIPD 900, which the HIPD 900 performs and provides corresponding data to the AR device 800 to perform remaining front-end tasks associated with the video stream (e.g., presenting the rendered video data via a display of the AR device 800). In this way, the HIPD 900, which has more computational resources and greater thermal headroom than a wearable device can perform computationally intensive tasks for the wearable device, improving performance of an operation performed by the wearable device.

The HIPD 900 includes a multi-touch input surface 902 on a first side (e.g., a front surface) that is configured to detect one or more user inputs. In particular, the multi-touch input surface 902 can detect single-tap inputs, multi-tap inputs, swipe gestures and/or inputs, force-based and/or pressure-based touch inputs, held taps, and the like. The multi-touch input surface 902 is configured to detect capacitive touch inputs and/or force (and/or pressure) touch inputs. The multi-touch input surface 902 includes a first touch-input surface 904 defined by a surface depression, and a second touch-input surface 906 defined by a substantially planar portion. The first touch-input surface 904 can be disposed adjacent to the second touch-input surface 906. In some embodiments, the first touch-input surface 904 and the second touch-input surface 906 can be different dimensions, shapes, and/or cover different portions of the multi-touch input surface 902. For example, the first touch-input surface 904 can be substantially circular and the second touch-input surface 906 is substantially rectangular. In some embodiments, the surface depression of the multi-touch input surface 902 is configured to guide user handling of the HIPD 900. In particular, the surface depression is configured such that the user holds the HIPD 900 upright when held in a single hand (e.g., such that the using imaging devices or cameras 914A and 914B are pointed toward a ceiling or the sky). Additionally, the surface depression is configured such that the user's thumb rests within the first touch-input surface 904.

In some embodiments, the different touch-input surfaces include a plurality of touch-input zones. For example, the second touch-input surface 906 includes at least a first touch-input zone 908 within a second touch-input zone 906 and a third touch-input zone 910 within the first touch-input zone 908. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the first touch-input zone 908 causes the HIPD 900 to perform a first command and a user input detected within the second touch-input zone 906 causes the HIPD 900 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the first touch-input zone 908 can be configured to detect force touch inputs (e.g., a magnitude at which the user presses down) and capacitive touch inputs, and the second touch-input zone 906 can be configured to detect capacitive touch inputs.

The HIPD 900 includes one or more sensors 951 for sensing data used in the performance of one or more operations and/or functions. For example, the HIPD 900 can include an IMU that is used in conjunction with cameras 914A and 914B for 3-dimensional object manipulation (e.g., enlarging, moving, destroying, etc. an object) in an AR or VR environment. Non-limiting examples of the sensors 951 included in the HIPD 900 include a light sensor, a magnetometer, a depth sensor, a pressure sensor, and a force sensor. Additional examples of the sensors 951 are provided below in reference to FIG. 9B.

The HIPD 900 can include one or more light indicators 912 to provide one or more notifications to the user. In some embodiments, the light indicators are LEDs or other types of illumination devices. The light indicators 912 can operate as a privacy light to notify the user and/or others near the user that an imaging device and/or microphone are active. In some embodiments, a light indicator is positioned adjacent to one or more touch-input surfaces. For example, a light indicator can be positioned around the first touch-input surface 904. The light indicators can be illuminated in different colors and/or patterns to provide the user with one or more notifications and/or information about the device. For example, a light indicator positioned around the first touch-input surface 904 can flash when the user receives a notification (e.g., a message), change red when the HIPD 900 is out of power, operate as a progress bar (e.g., a light ring that is closed when a task is completed (e.g., 0% to 100%)), operates as a volume indicator, etc.).

In some embodiments, the HIPD 900 includes one or more additional sensors on another surface. For example, as shown FIG. 9A, HIPD 900 includes a set of one or more sensors (e.g., sensor set 920) on an edge of the HIPD 900. The sensor set 920, when positioned on an edge of the of the HIPD 900, can be be positioned at a predetermined tilt angle (e.g., 26 degrees), which allows the sensor set 920 to be angled toward the user when placed on a desk or other flat surface. Alternatively, in some embodiments, the sensor set 920 is positioned on a surface opposite the multi-touch input surface 902 (e.g., a back surface). The one or more sensors of the sensor set 920 are discussed in detail below.

The side view 925 of the of the HIPD 900 shows the sensor set 920 and camera 914B. The sensor set 920 includes one or more cameras 922A and 922B, a depth projector 924, an ambient light sensor 928, and a depth receiver 930. In some embodiments, the sensor set 920 includes a light indicator 926. The light indicator 926 can operate as a privacy indicator to let the user and/or those around them know that a camera and/or microphone is active. The sensor set 920 is configured to capture a user's facial expression such that the user can puppet a custom avatar (e.g., showing emotions, such as smiles, laughter, etc., on the avatar or a digital representation of the user). The sensor set 920 can be configured as a side stereo red-green-blue (RGB) system, a rear indirect time-of-flight (iToF) system, or a rear stereo RGB system. As the skilled artisan will appreciate upon reading the descriptions provided herein, the novel HIPD 900 described herein can use different sensor set 920 configurations and/or sensor set 920 placement.

In some embodiments, the HIPD 900 includes one or more haptic devices 971 (FIG. 9B; e.g., a vibratory haptic actuator) that are configured to provide haptic feedback (e.g., kinesthetic sensation). The sensors 951, and/or the haptic devices 971 can be configured to operate in conjunction with multiple applications and/or communicatively coupled devices including, without limitation, a wearable device, health monitoring applications, social media applications, game applications, and artificial reality applications (e.g., the applications associated with artificial reality).

The HIPD 900 is configured to operate without a display. However, in optional embodiments, the HIPD 900 can include a display 968 (FIG. 9B). The HIPD 900 can also income one or more optional peripheral buttons 967 (FIG. 9B). For example, the peripheral buttons 967 can be used to turn on or turn off the HIPD 900. Further, the HIPD 900 housing can be formed of polymers and/or elastomer elastomers. The HIPD 900 can be configured to have a non-slip surface to allow the HIPD 900 to be placed on a surface without requiring a user to watch over the HIPD 900. In other words, the HIPD 900 is designed such that it would not easily slide off surfaces. In some embodiments, the HIPD 900 include one or magnets to couple the HIPD 900 to another surface. This allows the user to mount the HIPD 900 to different surfaces and provide the user with greater flexibility in use of the HIPD 900.

As described above, the HIPD 900 can distribute and/or provide instructions for performing the one or more tasks at the HIPD 900 and/or a communicatively coupled device. For example, the HIPD 900 can identify one or more back-end tasks to be performed by the HIPD 900 and one or more front-end tasks to be performed by a communicatively coupled device. While the HIPD 900 is configured to offload and/or handoff tasks of a communicatively coupled device, the HIPD 900 can perform both back-end and front-end tasks (e.g., via one or more processors, such as CPU 977; FIG. 9B). The HIPD 900 can, without limitation, can be used to perform augmenting calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 900 can perform the above operations alone or in conjunction with a wearable device (or other communicatively coupled electronic device).

FIG. 9B shows block diagrams of a computing system 940 of the HIPD 900, in accordance with some embodiments. The HIPD 900, described in detail above, can include one or more components shown in HIPD computing system 940. The HIPD 900 will be understood to include the components shown and described below for the HIPD computing system 940. In some embodiments, all, or a substantial portion of the components of the HIPD computing system 940 are included in a single integrated circuit. Alternatively, in some embodiments, components of the HIPD computing system 940 are included in a plurality of integrated circuits that are communicatively coupled.

The HIPD computing system 940 can include a processor (e.g., a CPU 977, a GPU, and/or a CPU with integrated graphics), a controller 975, a peripherals interface 950 that includes one or more sensors 951 and other peripheral devices, a power source (e.g., a power system 995), and memory (e.g., a memory 978) that includes an operating system (e.g., an operating system 979), data (e.g., data 988), one or more applications (e.g., applications 980), and one or more modules (e.g., a communications interface module 981, a graphics module 982, a task and processing management module 983, an interoperability module 984, an AR processing module 985, a data management module 986, a MMG processing module 987, etc.). The MMG processing module 987 is configured to process one or more input gestures detected by a communicatively coupled device such as the head-wearable device 120 and/or the wrist-wearable device 110. After processing the input gesture at the MMG processing module 987 and in accordance with at determination that the input gesture corresponds with one or more operations, performing one or more operations at the head-wearable device 120 or the wrist-wearable device 110. The HIPD computing system 940 further includes a power system 995 that includes a charger input and output 996, a PMIC 997, and a battery 998, all of which are defined above.

In some embodiments, the peripherals interface 950 can include one or more sensors 951. The sensors 951 can include analogous sensors to those described above in reference to FIG. 7B. For example, the sensors 951 can include imaging sensors 954, (optional) EMG sensors 956, IMUs 958, and capacitive sensors 960. In some embodiments, the sensors 951 can include one or more pressure sensor 952 for sensing pressure data, an altimeter 953 for sensing an altitude of the HIPD 900, a magnetometer 955 for sensing a magnetic field, a depth sensor 957 (or a time-of flight sensor) for determining a difference between the camera and the subject of an image, a position sensor 959 (e.g., a flexible position sensor) for sensing a relative displacement or position change of a portion of the HIPD 900, a force sensor 961 for sensing a force applied to a portion of the HIPD 900, and a light sensor 962 (e.g., an ambient light sensor) for detecting an amount of lighting. The sensors 951 can include one or more sensors not shown in FIG. 9B.

Analogous to the peripherals described above in reference to FIGS. 7B, the peripherals interface 950 can also include an NFC component 963, a GPS component 964, an LTE component 965, a Wi-Fi and/or Bluetooth communication component 966, a speaker 969, a haptic device 971, and a microphone 973. As described above in reference to FIG. 9A, the HIPD 900 can optionally include a display 968 and/or one or more buttons 967. The peripherals interface 950 can further include one or more cameras 970, touch surfaces 972, and/or one or more light emitters 974. The multi-touch input surface 902 described above in reference to FIG. 9A is an example of touch surface 972. The light emitters 974 can be one or more LEDs, lasers, etc. and can be used to project or present information to a user. For example, the light emitters 974 can include light indicators 912 and 926 described above in reference to FIG. 9A. The cameras 970 (e.g., cameras 914A, 914B, 922A, and 922B described above in FIG. 9A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 970 can be used for SLAM; 6 DoF ray casting, gaming, object manipulation, and/or other rendering; facial recognition and facial expression recognition, etc.

Similar to the watch body computing system 760 and the watch band computing system 730 described above in reference to FIG. 7B, the HIPD computing system 940 can include one or more haptic controllers 976 and associated componentry (e.g., haptic devices 971) for providing haptic events at the HIPD 900.

Memory 978 can include high-speed random-access memory and/or non-volatile memory, such as one or more magnetic disk storage devices, flash memory devices, or other non-volatile solid-state memory devices. Access to the memory 978 by other components of the HIPD 900, such as the one or more processors and the peripherals interface 950, can be controlled by a memory controller of the controllers 975.

In some embodiments, software components stored in the memory 978 include one or more operating systems 979, one or more applications 980, one or more communication interface modules 981, one or more graphics modules 982, one or more data management modules 985, which are analogous to the software components described above in reference to FIG. 7B. The software components stored in the memory 978 can also include a MMG processing module 987, which is configured to perform the features described above in reference to FIGS. 1A-3C. The MMG processing module 987 includes the features described above with respect to the MMG processing modules in FIGS. 7B and 8C.

In some embodiments, software components stored in the memory 978 include a task and processing management module 983 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 983 uses data 988 (e.g., device data 990) to distribute the one or more front-end and/or back-end tasks based on communicatively coupled devices' computing resources, available power, thermal headroom, ongoing operations, and/or other factors. For example, the task and processing management module 983 can cause the performance of one or more back-end tasks (of an operation performed at communicatively coupled AR device 800) at the HIPD 900 in accordance with a determination that the operation is utilizing a predetermined amount (e.g., at least 70%) of computing resources available at the AR device 800.

In some embodiments, software components stored in the memory 978 include an interoperability module 984 for exchanging and utilizing information received and/or provided to distinct communicatively coupled devices. The interoperability module 984 allows for different systems, devices, and/or applications to connect and communicate in a coordinated way without user input. In some embodiments, software components stored in the memory 978 include an AR module 985 that is configured to process signals based at least on sensor data for use in an AR and/or VR environment. For example, the AR processing module 985 can be used for 3D object manipulation, gesture recognition, facial and facial expression, recognition, etc.

The memory 978 can also include data 988, including structured data. In some embodiments, the data 988 can include profile data 989, device data 990 (including device data of one or more devices communicatively coupled with the HIPD 900, such as device type, hardware, software, configurations, etc.), sensor data 991, media content data 992, application data 993, and MMG data 994, which stores data related to the performance of the features described above in reference to FIGS. 1A-3C.

It should be appreciated that the HIPD computing system 940 is an example of a computing system within the HIPD 900, and that the HIPD 900 can have more or fewer components than shown in the HIPD computing system 940, combine two or more components, and/or have a different configuration and/or arrangement of the components. The various components shown in HIPD computing system 940 are implemented in hardware, software, firmware, or a combination thereof, including one or more signal processing and/or application-specific integrated circuits.

The techniques described above in FIG. 9A-9B can be used with any device used as a human-machine interface controller. In some embodiments, an HIPD 900 can be used in conjunction with one or more wearable device such as a head-wearable device (e.g., AR device 800 and VR device 810) and/or a wrist-wearable device 700 (or components thereof). Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt in or opt out of any data collection at any time. Further, users are given the option to request the removal of any collected data.

It will be understood that, although the terms "first," "second," etc., may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A non-transitory computer-readable storage medium comprising instructions which, when executed by one or more processors, causes the one or more processors to:

while an artificial-reality headset is worn by a user:

at a first point in time and while multi-modal gestures are available via at least two input devices associated with the artificial-reality headset:

in response to detecting a first input via a first input device of the at least two input devices, perform a first action at the artificial-reality headset, wherein the first input is one input of a first input tier set including (i) a first input tier including one or more inputs associated with navigation control commands, and the first input tier is associated with inputs performed with a single digit of a hand of the user, or (ii) a second input tier including one or more other inputs associated with system control commands for the artificial-reality headset, and the second input tier is associated with inputs performed with at least two digits of the hand of the user;

in response to detecting a second input via a second input device of the at least two input devices, perform a second action within a user interface presented via the artificial-reality headset; and at a second point in time, after the first point in time, and while multi-modal gestures are no longer available via the at least two input devices associated with the artificial-reality headset:

in response to detecting the first input via the first input device of the at least two input devices, perform the second action within the user interface presented via the artificial-reality headset.

2. The non-transitory computer-readable storage medium of claim 1, wherein the first input tier set includes a third input tier, the third input tier of the first input tier set including one or more inputs associated with media control commands.

3. The non-transitory computer-readable storage medium of claim 2, wherein the third input tier of the first input tier set is associated with swipe gestures performed with at least two digits of a hand of the user.

4. The non-transitory computer-readable storage medium of claim 1, wherein the second action includes navigation control commands and/or a system control command for the artificial-reality headset.

5. The non-transitory computer-readable storage medium of claim 1, wherein:

the second input is one input of a second input tier set including a first input tier and a second input tier, the first input tier of the second input tier set is associated with hand gestures performed using a first digit and a second digit of a hand of the user, and the second input tier of the second input tier set is associated with hand gestures performed using the first digit and a third digit of the user.

6. The non-transitory computer-readable storage medium of claim 5, wherein:

the second input tier set includes a third input tier associated with hand gestures performed using the first digit and a fourth digit of the user.

7. The non-transitory computer-readable storage medium of claim 1, wherein the multi-modal gestures are no longer available via the at least two input devices at the second point in time in accordance with a determination that the second input device is no longer communicatively coupled to or detectable by the artificial-reality headset.

8. The non-transitory computer-readable storage medium of claim 1, wherein the at least two input devices include (i) a touch-input surface of the artificial-reality headset including one or more capacitive touch sensors and/or one or more proximity sensors, and (ii) a biopotential-signal-sensing device including one or more biopotential-signal-sensing sensors.

9. A method, comprising:

while an artificial-reality headset is worn by a user:

at a first point in time and while multi-modal gestures are available via at least two input devices associated with the artificial-reality headset:

in response to detecting a first input via a first input device of the at least two input devices, performing a first action at the artificial-reality headset, wherein the first input is one input of a first input tier set including (i) a first input tier including one or more inputs associated with navigation control commands, and the first input tier is associated with inputs performed with a single digit of a hand of the user, or (ii) a second input tier including one or more other inputs associated with system control commands for the artificial-reality headset, and the second input tier is associated with inputs performed with at least two digits of the hand of the user;

in response to detecting a second input via a second input device of the at least two input devices, performing a second action within a user interface presented via the artificial-reality headset; and at a second point in time, after the first point in time, and while multi-modal gestures are no longer available via the at least two input devices associated with the artificial-reality headset:

in response to detecting the first input via the first input device of the at least two input devices, performing the second action within the user interface presented via the artificial-reality headset.

10. The method of claim 9, wherein the first input tier set includes a third input tier, the third input tier of the first input tier set including one or more inputs associated with media control commands.

11. The method of claim 10, wherein the third input tier of the first input tier set is associated with swipe gestures performed with at least two digits of a hand of the user.

12. The method of claim 9, wherein the multi-modal gestures are no longer available via the at least two input devices at the second point in time in accordance with a determination that the second input device is no longer communicatively coupled to or detectable by the artificial-reality headset.

13. The method of claim 9, wherein the at least two input devices include (i) a touch-input surface of the artificial-reality headset including one or more capacitive touch sensors and/or one or more proximity sensors, and (ii) a biopotential-signal-sensing device including one or more biopotential-signal-sensing sensors.

14. The method of claim 9, wherein:

the second input is one input of a second input tier set including a first input tier and a second input tier, the first input tier of the second input tier set is associated with hand gestures performed using a first digit and a second digit of a hand of the user, and the second input tier of the second input tier set is associated with hand gestures performed using the first digit and a third digit of the user.

15. An artificial-reality headset, comprising:

one or more processors; and memory, comprising instructions which, when executed by the one or more processors, cause the one or more processors to:

while the artificial-reality headset is worn by a user:

at a first point in time and while multi-modal gestures are available via at least two input devices associated with the artificial-reality headset:

in response to detecting a first input via a first input device of the at least two input devices, perform a first action at the artificial-reality headset, wherein the first input is one input of a first input tier set including (i) a first input tier including one or more inputs associated with navigation control commands, and the first input tier is associated with inputs performed with a single digit of a hand of the user, or (ii) a second input tier including one or more other inputs associated with system control commands for the artificial-reality headset, and the second input tier is associated with inputs performed with at least two digits of the hand of the user;

in response to detecting a second input via a second input device of the at least two input devices, perform a second action within a user interface presented via the artificial-reality headset; and at a second point in time, after the first point in time, and while multi- modal gestures are no longer available via the at least two input devices associated with the artificial-reality headset:

in response to detecting the first input via the first input device of the at least two input devices, perform the second action within the user interface presented via the artificial-reality headset.

16. The artificial-reality headset of claim 15, wherein the first input tier set includes a third input tier, the third input tier of the first input tier set including one or more inputs associated with media control commands.

17. The method of claim 14, wherein:

the second input tier set includes a third input tier associated with hand gestures performed using the first digit and a fourth digit of the user.

18. The artificial-reality headset of claim 15, wherein the multi-modal gestures are no longer available via the at least two input devices at the second point in time in accordance with a determination that the second input device is no longer communicatively coupled to or detectable by the artificial-reality headset.

19. The artificial-reality headset of claim 15, wherein the at least two input devices include (i) a touch-input surface of the artificial-reality headset including one or more capacitive touch sensors and/or one or more proximity sensors, and (ii) a biopotential-signal-sensing device including one or more biopotential-signal-sensing sensors.

20. The artificial-reality headset of claim 15, wherein:

the second input is one input of a second input tier set including a first input tier and a second input tier, the first input tier of the second input tier set is associated with hand gestures performed using a first digit and a second digit of a hand of the user, and the second input tier of the second input tier set is associated with hand gestures performed using the first digit and a third digit of the user.

* * * * *